United States Patent [19]

Quiogue et al.

[11] 3,986,091

[45] Oct. 12, 1976

[54] CARRIER POSITIONING SYSTEM

[75] Inventors: Virgilio J. Quiogue, Northville; Cornelius Eldert, Ypsilanti; John L. Worst, Belleville, all of Mich.

[73] Assignee: Burroughs Corporation, Detroit, Mich.

[22] Filed: Nov. 15, 1974

[21] Appl. No.: 524,201

[52] U.S. Cl. .............................. 318/594; 318/603; 318/681

[51] Int. Cl.[2] .............................. G05B 11/18

[58] Field of Search ............ 318/594, 561, 681, 603

[56] References Cited

UNITED STATES PATENTS

| | | | |
|---|---|---|---|
| 3,206,665 | 9/1965 | Burlingham | 318/603 X |
| 3,209,338 | 9/1965 | Romvari | 318/561 X |
| 3,306,416 | 2/1967 | Dahlin et al. | 318/594 X |
| 3,427,520 | 2/1969 | Oppendahl | 318/681 X |
| 3,668,500 | 6/1972 | Kosem | 318/594 X |
| 3,670,228 | 6/1972 | Crosby | 318/594 |
| 3,710,222 | 1/1973 | Dummermuth | 318/594 X |
| 3,721,882 | 3/1973 | Helms | 318/594 |
| 3,731,177 | 5/1973 | Commander et al. | 318/561 X |
| 3,835,360 | 9/1974 | Kiwiet | 318/594 X |

OTHER PUBLICATIONS

B368,397, Jan. 1975, MacWade et al., 318/561.

*Primary Examiner*—B. Dobeck

*Attorney, Agent, or Firm*—Leon E. Redman; Charles P. Padgett, Jr.; Carl Fissell, Jr.

[57] ABSTRACT

An apparatus for positioning a carrier means along a line of print in either of two directions. The carrier means is positioned by a D.C. motor which is driven by a pair of current driver circuits, one of which controls the flow of drive current in a forward direction and the other of which controls the flow of current in the reverse direction. The motor is capable of driving the carrier means at a first predetermined high speed when it is determined that the desired destination carrier position is more than a predetermined number of carrier positions from the present carrier position and at a second predetermined low speed when the desired destination carrier position is less than or equal to a predetermined number of carrier positions from the present carrier position. An electronic tachometer means operates to maintain a relatively constant speed while operating in the predetermined high speed state and while operating in the predetermined low speed state. Logic means, including a state machine, operates to insure a smooth and rapid transition from the high speed state to the low speed state so that said carrier means is accurately positioned at the desired destination carrier position in a smooth and efficient manner without damage to machine parts or excessive noise.

15 Claims, 20 Drawing Figures

| FIG. 14A. | FIG. 14B. |
|---|---|

CARRIER POSITIONING SYSTEM

RELATED APPLICATIONS

This application is related to application Ser. No. 485,006 which was filed on July 1, 1974 by V. J. Quiogue et al for a Logic System For Print Ball Tilt Control and to application Ser. No. 514,133 which was filed on Oct. 11, 1974 by Robert J. Reynolds for a Digital Logic And Servo System For Print Head Rotate Control, both of these applications being assigned to the assignee of the present invention. The present application represents a significant advance over the invention set forth in U.S. Pat. No. 3,554,347 which issued on Jan. 12, 1971 to Cornelius C. Perkins for a System For Automatically Setting A Position Counter To Effect Agreement With The Position Of A Traveling Printing Element, said patent also being assigned to the assignee of the present invention.

BACKGROUND OF THE INVENTION

This invention relates to an apparatus for positioning a carrier means, and more specifically, to a system for controlling the positioning of a carrier means along a line of print in either of two directions in a rapid, efficient, and error-free manner in order that the carrier means is positioned at a desired destination position as smoothly and efficiently as possible.

The prior art teaches many systems for positioning a carrier means along the line of print in either a forward or a reverse direction. Many of these systems employ a motor to drive the carrier and many utilize some type of motor control system for controlling the operation of the motor. Most systems of the prior art, however, employ a tachometer which is coupled to the drive shaft of the motor, and the tachometer is used to feed back an analog signal which is proportional to the speed of the motor. This signal is then compared with some type of reference signal in a comparator or the like and is used to control the operating speed of the motor by any number of means known in the art. The present invention employs an electronic tachometer which is much cheaper, more efficient and easier to maintain than the prior art tachometers.

The carrier positioning systems of the prior art frequently operated to drive the carrier means at a constant speed until it arrived at a destination position, at which time it would be driven against a destination stop with wasted torque, wear and tear on the motor and associated stop apparatus, and with a great amount of noise. Some systems of the prior art would operate to drive the carrier at an ever increasing torque until a point midway between the original position and the destination position was reached, and at that time, would reverse the direction of current through the motor so as to slow the carrier as it approaches its destination position. Such systems do not employ any real speed control since the speed is either continually increasing or continually decreasing and a constant speed is never maintained. Many such systems are susceptible to overshoot or undershoot or must employ the stop mechanisms mentioned above with their associated disadvantages.

The system of the present invention overcomes the various disadvantages of the prior art by providing that the carrier means can be driven at either a predetermined high speed state which is entered whenever the carrier is more than a predetermined number of carrier positions from its destination position and at a predetermined low speed state which is entered when the number of carrier positions are less than or equal to said predetermined number of carrier positions from its destination position. A state machine with associated logic is used to insure a smooth and efficient transition when the carrier is positioned from a stop to the predetermined high speed state and then to the predetermined low speed state prior to being again stopped at the new desired destination position. An electronic tachometer speed control means is used to maintain a relatively constant predetermined high speed while in said high speed state and to maintain a relatively constant predetermined low speed while in said low speed state.

SUMMARY OF THE INVENTION

In view of the various problems encountered in the prior art, it is an object of this invention to provide a new and improved carrier positioning system for insuring that a carrier drive motor is operated so as to position a carrier means in a smooth and efficient manner without undershoot, overshoot, undue noise, or damage to the equipment.

It is also an object of this invention to provide carrier drive control system with means whereby the carrier may be positioned at either a first predetermined high speed or at a second predetermined low speed depending of the distance the carrier position is to be moved.

It is another object of this invention to provide an electronic tachometer speed control means for maintaining a relatively constant high speed when the motor is being driven at said predetermined high speed and for maintaining a relatively constant low speed when said motor is being driven at said predetermined low speed.

It is a further object of this invention to provide a means for insuring the smooth and efficient transition when the carrier is driven from a stop position to a high speed state and then as the destination position is approached, to a low speed state and finally to a stop at the new carrier destination position.

It is still another object of this invention to provide an improved electronic motor control system for controlling the direction of application of current to the carrier drive motor and for controlling the duration of application of current in a selected direction so as to effectuate a smooth and efficient positioning between subsequent printing positions.

Accordingly, this invention protects both the carrier drive motor and the associated printing apparatus by insuring that the carrier means is positioned from one printing position to the next in a smooth and efficient manner. The carrier drive motor may be driven in either a forward or reverse direction and the duration of application of current may be controlled by varying system conditions. When the carrier is to be driven to a destination position which is more than the predetermined number of carrier positions from the present position, a state machine means with its associated logic insures that the carrier moves from its previous location toward the destination position at a relatively high speed. While the motor is driven at this relatively high speed, an electronic tachometer speed control system maintains the speed at a relatively constant level, and when the system logic detects that the carrier is less than or equal to a predetermined number of carrier positions from the destination position, the carrier state machine and its associated logic insure a smooth and efficient transition from the high speed state to a relatively low speed state. This is accomplished by continuing to drive the motor at the present current level but in the opposite direction so as to slow the speed of the carrier for a specified time. After that specified time has elapsed, the motor is driven at a lower level of current until a speed which is just below the desired predetermined low speed is detected. The direction of current drive within the motor is then reversed again, and the motor is driven at said lower level of current in said predetermined low speed state until its destination position is reached. While the motor is driven in said predetermined low speed state, the electronic tachometer and speed control system will insure that a relatively constant speed is maintained until the destination position is reached or a major velocity error is detected.

BRIEF DESCRIPTION OF THE DRAWINGS

Other objects, advantages and features of the present invention will become more fully apparent from the following detailed description, appended claims and accompanying drawings in which like reference numerals designate corresponding parts:

DETAILED DESCRIPTION

Figure 1:
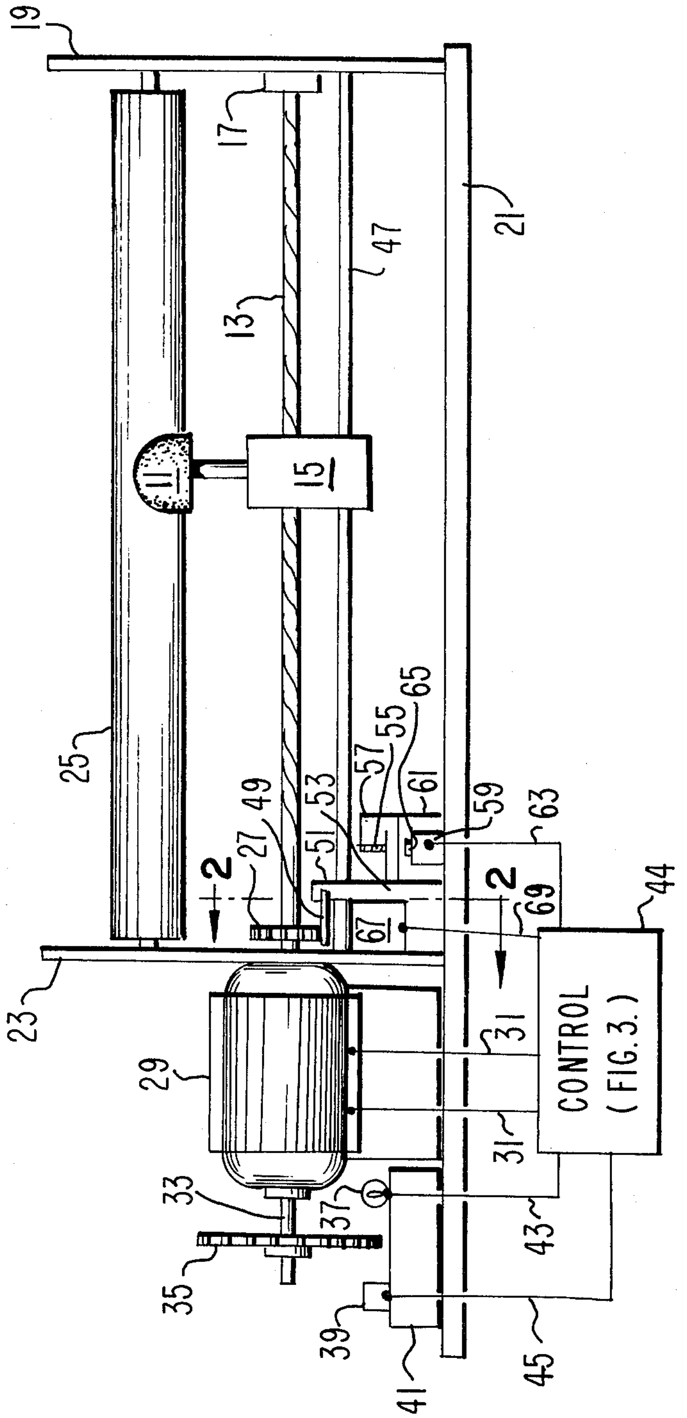
FIG. 1 is an overall perspective view of the carrier positioning system of the present invention.

FIG. 1 illustrates a type of printer wherein a printing element 11 such as a ball-type printing element or the like is moved along a lead screw 13 from one printing position to the next on a straight line by way of a carrier or carriage mechanism 15. The lead screw 13 has one end journaled at 17 into upright support 19 which is rigidly attached to a base 21. An opposite upright support 23 is rigidly attached to the base 21 and spaced from upright support 19 so as to house the platen 25 therebetween. The opposite end of lead screw 13 is rigidly attached to a toothed gear 27 which is driven by a DC motor 29. The DC motor 29 is driven in one direction or another in accordance with the direction of the current received on leads 31 and its torque is proportional to the amount of current received. A motor drive shaft 33 has one end attached to the toothed gear 27 and the other end, which extends beyond the opposite side of the motor, is attached to a carrier position readout timing disk 35. This timing disk forms a part of the carrier position read-out assembly comprising timing disk 35, a lamp 37, a photo-transistor 39, and a support 41 for positioning the photo-transistor 39 in relation to the lamp 37 such that as the carrier motor turns, and shaft 33 rotates the timing disk 35, the light beam from lamp 37 hits the photo-transistor 39 each time one of the 288 timing slots positioned above the periphery of timing disk 35 lines up between the lamp 37 and the photo-transistor 39. The light receives its power via lead 43 and the photo-transistor 39 generates signals representative of the carrier velocity and transmits these signals back to the control circuitry 44 which is shown in greater detail in FIG. 3 via electrical coupling 45.

Before the carrier motor 29 can drive the lead screw 13 so as to position the carrier 15, the carrier being restrained against rotation with the lead screw by a guide rod 47, a pair of interposer latches 49 must first be withdrawn from the teeth of the gear 27. The interposer latches 49 are physically pulled down out of the teeth of the gear 27 by a link 51 which is slidably situated between link guides 53 so as to enable the link 51 to travel up and down in a vertical path between the guide mambers 53. The link is biased by a spring 55 and spring holder 57 in the up position such that the upper end of the link is disposed above the interposer latches 49. An interposer solenoid 59 is housed within a solenoid housing 61 such that when the interposer solenoid 59 is energized via lead 63, the lower portion of link 51 is drawn down against the bias spring 55 until the lower portion of link 51 contacts the face 65 of the solenoid 59. Shortly after the energization of the interposer solenoid 59, a pair of hold solenoids 67 will be energized via lead 69 such that the interposer latches 49 will be held against the faces of hold solenoid 67. The interposer solenoid 59 will then be de-energized and the bias of spring 55 will move link 51 to its upward position and out of contact with the interposer latches 49.

Figure 2:
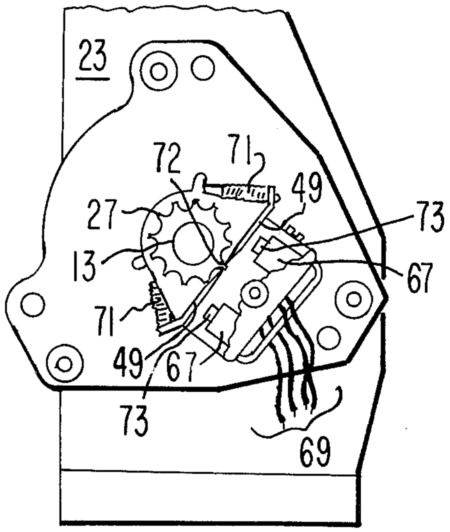
FIG. 2 is a blown-up sectional view of a portion of the apparatus of FIG. 1 taken along the lines 2—2 of FIG. 1 and it shows, in detail, the operation of the interposer latches of the system of FIG. 1.

FIG. 2 shows an and view of a portion of FIG. 1 taken along lines 2—2 of FIG. 1 which will be referred to when describing the detailed operation of the interposer latches. Toothed gear 27 is shown rigidly affixed to lead screw 13 which is driven by the motor 29 which resides behind vertical support or plate 23. It is seen that a pair of interposer latches 49 are spring biased by springs 71 to an upward position so that they engage one of the teeth 72 of drive gear 27 so as to prevent its rotation. When the interposer solenoid 59 of FIG. 1 is energized and the link 51 is lowered so as to hold the interposer latches 49 off of the engaged tooth 72 and down onto the faces 73 of solenoid 67, the solenoid 67 will be energized via lead 69 so as to hold the interposer latches 49 down against the hold solenoid faces 73 thereby allowing the rotation of gear 27 and its associated lead screw 13.

The interposer latches 49 will remain held down until the carrier 15 has been moved to its new position. With the interposer latches 49 withdrawn, the drive motor 29, under the electronic control of block 44, has the capability of moving the carrier at either of two speeds; a low speed of 4.5 IPS (inches per second) or at a high speed of 33 IPS. The carrier can be moved at either of these speeds, either to the left or to the right. When the carrier drive motor 29 rotates counterclockwise, the carrier moves toward the right, and conversely, when the carrier drive motor rotates counterclockwise, the lead screw 13 drives the carrier to the left. Interposer latches 49 remain held in the down position by hold solenoids 67 until the carrier passes the stop position immediately adjacent to its destination, at which time the hold solenoids 67 are deenergized so as to release the interposer latches allowing them to rise due to the bias springs 71 so as to engage the appropriate tooth of drive gear 27, thereby detenting it is the current position where printing is to occur.

Figure 3:
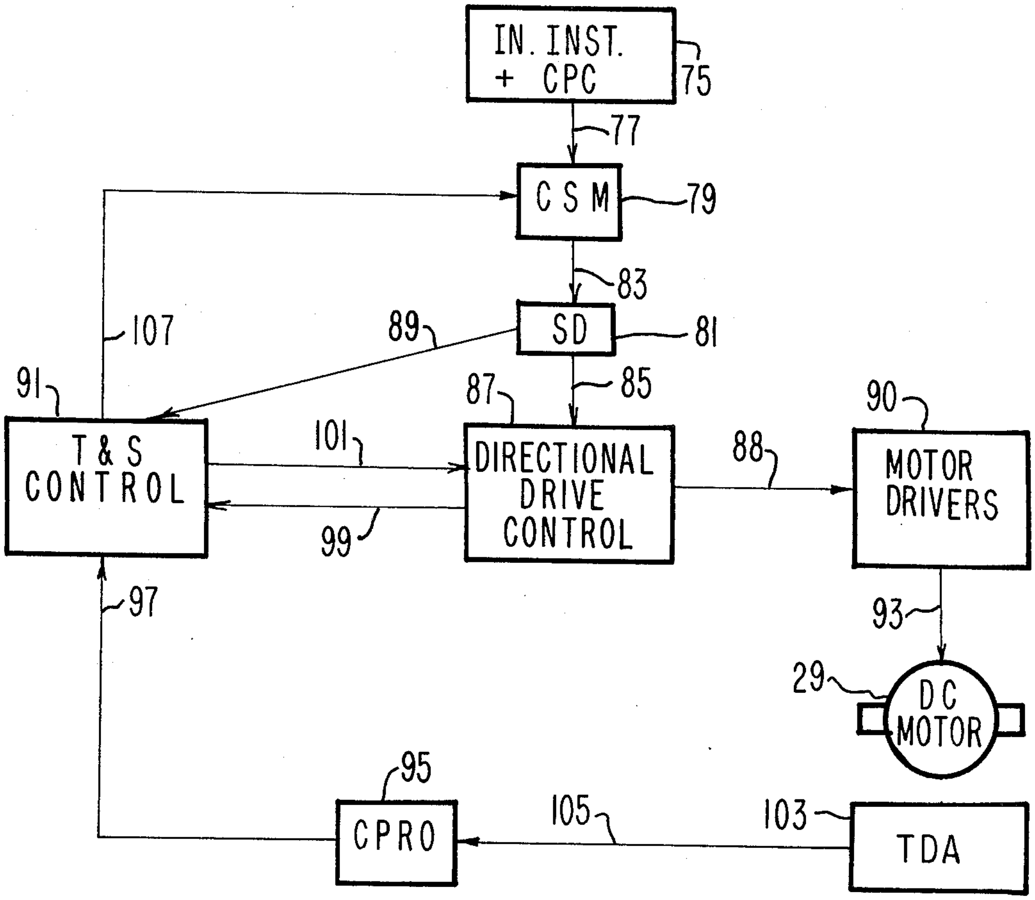
FIG. 3 is a block diagram which illustrates the overall carrier positioning control system of the present invention.

The basic carrier system mechanics described above are controlled by the logic shown in the following figures. FIG. 3 discloses a block diagram which illustrates the overall carrier control system of the present invention. Block 75 represents a means for generating input instructions whether from a keyboard, a program, or the like, and contains a character position counter (CPC) as known in the art to provide character position information. The output of the character position counter is fed via information path 77 to the carrier state machine (CSM) 79. The carrier state machine 79 contains a network of decoding gates which utilize the outputs of the character position counter (CPC) from input block 75 to decode specific front end instructions for the control of carrier positioning and print code to tilt/rotate code conversion. The CSM 79 contains a number of flip-flops and associated gating means which are used to control and synchronize the carrier movement and positioning, ribbon color, direction of carrier movement, carrier error conditions, and printing with other electronic and mechanical functions of the console. The operation of the carrier state machine CSM 79 will be described with reference to FIG. 4 and the specific details of construction are well known in the art. Decoded carrier state machine instructions are transferred to a set of solenoid drivers SD 81 via data path 83. The solenoid drivers invert these control signals and produce a change in nemonics as indicated below:

TABLE I

| Input From CSM to SD | Meaning | Output From SD | Meaning |
|---|---|---|---|
| RETDR | Return Drive | CRGL/ | Carrier Go Left/ |
| FWDDR | Forward Drive | CRGR/ | Carrier Go Right/ |
| MOVLT | Move Left | CRLT/ | Carrier Left Time/ |
| HISPDDR | High Speed Drive | CRHS/ | Carrier High Speed/ |
| HIPOW | High Power | CR4A/ | Carrier 4 Amps/ |
| HOLDDR | Hold Drive | HOLD SOL | Hold Solenoid |
| INTPDR | Interposer Drive | INTPSOL | Interposer Solenoid |
| RR64DR | 64 Character Drive | RRSOL | Red Ribbon Solenoid |

These signals are fed via data path 85 to the directional drive control block 87 and via data path 89 to the tachometer and speed control block 91. The signals CRGL/, CRGR/, CRLT/, and CR4A/ are the four basic signals used to produce carrier movement. These signals are utilized in the directional drive control logic of block 87 and are used to control the motor drivers of block 90. Signals from the directional drive control logic of block 87 are sent to the motor drivers of block 90 via signal path 88 and the actual driver control currents travel via path 93 to the DC motor 29 so as to control the speed and direction of the motor. The tachometer and speed control block 91 receives control signals from the solenoid drivers 81 via data path 89; from carrier position read-out block 95 via data path 97; and via data path 99 from the directional drive control block 87. The T&S control logic of block 91 uses these signals to produce further command signals which are used to control the speed and direction of operation of the D.C. motor 29. These speed control commands are fed via data path 101 back to the directional drive control logic of block 87. The carrier position read-out block 95 contains a comparator which receives the signals produced by the timing disk assembly of block 103 via data path 105 and converts these signals into the LINEGEN signals which are positive going pulses for each slot on the timing disk and which are used to enable the carrier position read-out counter of the electronic tachometer and speed control system of block 91. The tachometer and speed control logic of block 91 also contains a carrier control state machine (CCSM) some of whose outputs are fed back to the directional drive control system of block 87 and to CSM 79 and are used to drive the D.C. motor 29 at the appropriate speed and in the appropriate direction. The logic of block 91 also receives the linegen signals from block 95 and utilizes these signals in producing the signal CAPRO which is fed back to condition counter circuits within the carrier state machine block 79 via data path 107. The CAPRO signal is used to indicate that the carrier has moved one position by incrementing or decrementing the CPC counter.

Figure 4:
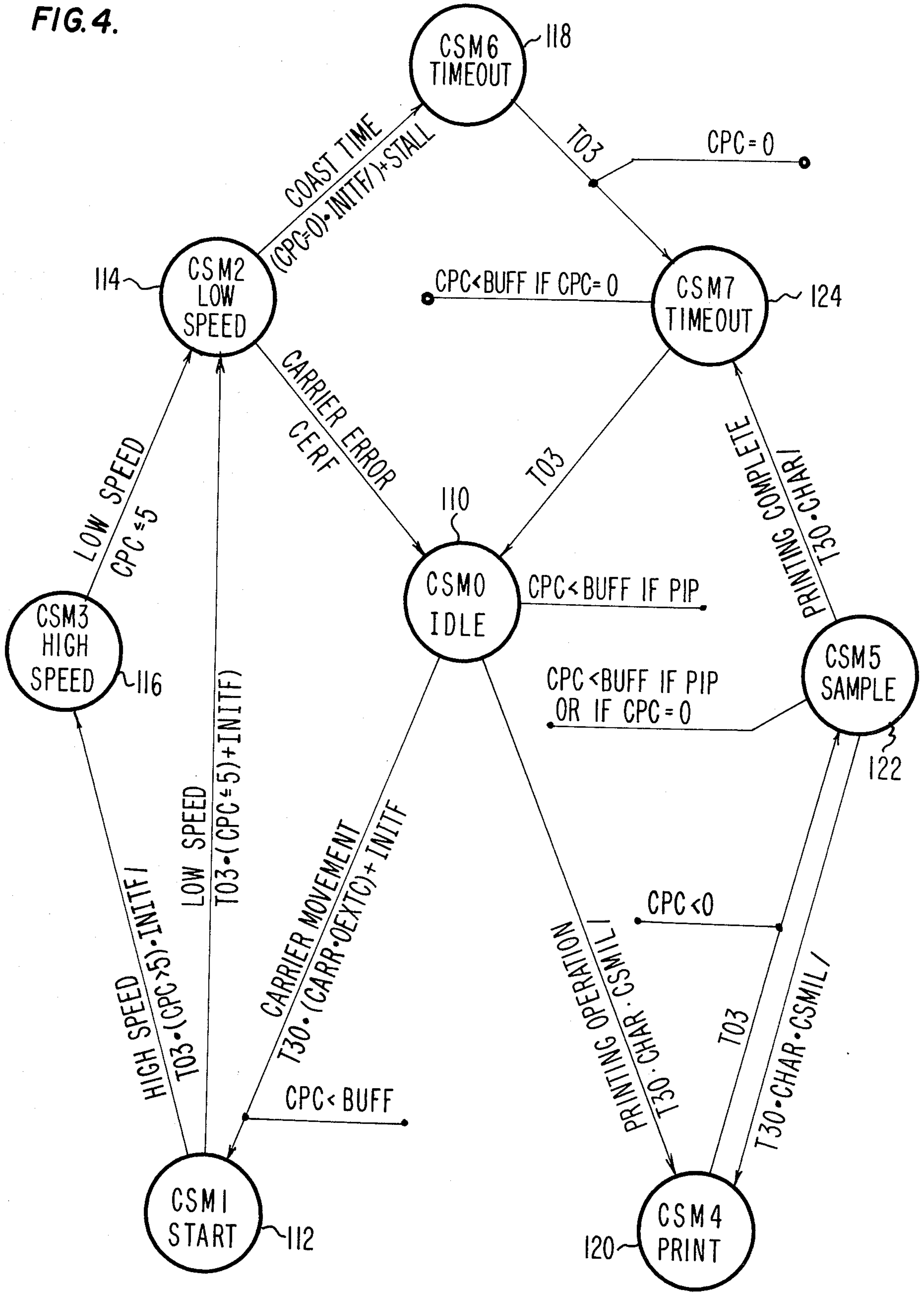
FIG. 4 illustrates a carrier state machine diagram which sets forth the functions of block 79 of the system of FIG. 3.

The carrier state machine (CSM) of block 79 includes three carrier control flip-flops (CC1F, CC2F, CC4F). The decoding of the control codes contained in the CPC counter through the internal logic of the carrier state machine 79 produces eight distinct carrier states, CSMO through CSM7. FIG. 4 illustrates the eight carrier states and shows the signals required to cycle the state machine. Carrier states 0, 1, 2, 3, 6 and 7 control carrier movement, velocity, positioning, and ribbon shift; carrier states 0, 4, 5 and 7 control character printing and carrier state 0 additionally serve as an idle state which becomes true after a "power on" sequence or when a carrier function has been completed. The carrier state will advance from CSMO to CSM1 for a character movement or CSM4 for a character print at T30 time. The state machine of block 79 of FIG. 3 will be described with reference to FIGS. 3 and 4.

Each of the circles of the state diagram of FIG. 4 represent an individual one of the eight possible states of the machine, and the lines interconnecting these states represent the various operations or transitions required to enter or exit a given state.

During CSMO, which is represented by circle 110, if the control code received from input block 75 indicates a print in place PIP operation, the PIP flip-flop is set and a PIPF signal is generated which will inhibit the interposer solenoid 59 of FIG. 1 during CSM4. This PIPF signal will also enable the print buffer to transfer its contents to the CPC register as indicated by the expression (CPC<BUFF). If the control code is decoded as an initialize right or left, the INIT flip-flop is set during CSMO. The INITF signal will enable the print buffer to CPC register transfer. The print buffer to CPC register transfer occurs on the transition from the CSMO state to the CSM1 state which is represented by circle 112 if the control code is decoded as a carrier movement. The character transfer into the CPC register will indicate the number of positions the carrier is to be moved to arrive at the selected character position.

The CSM1 state is the start state for any carrier movement that takes place. In CSM1, with CPC unequal to zero. the signal INTPDR to the interposer solenoid driver becomes true thereby activating the interposer solenoid 59. The carrier state advances from CSM1 to the low speed state CSM2 which is represented by circle 114 for initialization or if the CPC register is less than or equal to five (CPC ≤ 5) at TO3 time. If the CPC register is greater than five (CPC ≤ 5/) the carrier state advances from CMS1 to the high speed state CSM3 which is represented by circle 116 at To3 time. The interposer solenoid 59 is de-energized when the carrier exits state CSM1.

Carrier state CSM2 is the low speed state (4.5 IPS) and is entered when the carrier is within five positions (CPC ≤ 5) of the designated stop. During CSM2, the signal HOLDDR to the solenoid drivers of FIG. 5 for the hold solenoid 67 and the signal HIPOW (high power) for the carrier control circuitry of blocks 87 and 91 are true. The CPC register contains the number of positions a character is to be moved in order to arrive at the desired printing position, and as the carrier moves, the carrier position read-out signal (CAPRO) conditions a counter circuit within the carrier state machine CSM of block 79 which operates to count down or decrement (CPC-1) the CPC register for each printing position the carrier moves. A carrier error is detected if the carrier stops in the wrong position or if a back space control code is decoded and the CPC register is equal to zero. When a carrier error is detected, a carrier error flip-flop CERF is set and the printer control logic is inhibited. When the carrier error is reset (RSTCERF) through the signal POR/, the CSMO signal becomes true and normal print code operations can be resumed. If a carrier error is not detected, the carrier state advances from CSM2 to CSM6 which is represented by circle 118 when the CPC register has been decremented to zero (CPC=0).

Carrier state CSM3 is the high speed state (33 IPS) and is entered from CSM1 when the carrier is to be moved more than five positions (CPC>5). During CSM3, the signals to the solenoid drivers for the hold solenoid 67 (HOLDDR) and for high speed (HSPDDR) and high power (HIPOW) for the carrier control torque circuitry are true. The carrier movement CSM3 is identical to the carrier movement in CSM2 except for the carrier speed. When the carrier is within five positions of the designated stop (CPC ≤ 5), the carrier states advance to CSM2. This insures a smooth reliable stop in the designated printing position.

Carrier state CSM4 which is designated as circle 120, is the data character print and ribbon lift state. The color (red or black) for the character print was set by a decoded control code during CSMO. When a data character is decoded and the forms loading assembly is closed, CSM4 is entered from CSMO at T30 time. If the forms loading assembly is open, the forms state will cycle and close prior to CSM4 being entered. The signals (INTPDR) to the solenoid drivers 81 for the interposer solenoid 59 and the printer clutch become true during CSM4. With the printer clutch signal true, the appropriate tilt and/or rotate signals for the decoded character are generated as required. The carrier states advance from CSM4 to CSM5 which is represented by circle 122 at TO3 time. On the transistion, the CPC register is cleared (CPC=O).

Carrier state CSM5 is a sample state following a character print in CSM4. In CSM5, a print buffer to CPC register transfer (CPC<BUFF) is enabled. After the transfer, if a data character is decoded, the carrier states return to CSM4 at T30 time. During CSM5, if the control code transferred into the CPC register was a print in place code, the PIP logic is set up and another print buffer to CPC register transfer takes place. A decoder data character will return the character state to CSM4 at T30 time. If the control code transferred into the CPC register during CSM5 was not a data character, the carrier state advances from CSM5 to CSM7 which is represented by circle 124 at T30 time.

Carrier state CSM7 is the time out state entered prior to returning the carrier state to CSM0. CSM7 is entered from CSM6 at time TO3 when a carrier movement has been completed or from CSM4 when a character print operation has been completed. During CSM7, if the CPC register is clear, a print buffer to CPC register transfer takes place and the carrier state advances from CSM7 to CSM0 (IDLE) at TO3 time.

Carrier state CSM6 is a time out state which insures that the carrier has had sufficient time to coast to a stop. The carrier state enters CSM6 from CSM2 when the CPC register has counted down to zero (CPC=0). The carrier state also advances from CSM2 to CSM6 if the carrier becomes stalled for any reason. The CPC register is cleared if the carrier becomes stalled. The carrier state then advances from CSM6 to CSM7 at TO3 time and on the transition, the CPC register is cleared.

The carrier state machine CSM of block 79 of FIG. 3 also provides print code to tilt and/or rotate code conversion. The print codes enter the input block 75 from the console and exits as the CPC counter outputs at the CPC1F-CPC8F lines which enter the character state machine CSM of block 79. The print codes and the tilt/rotate operations do not form a part of the present invention and may be more fully understood with reference to the above-cited copending patent applications.

Figure 5:
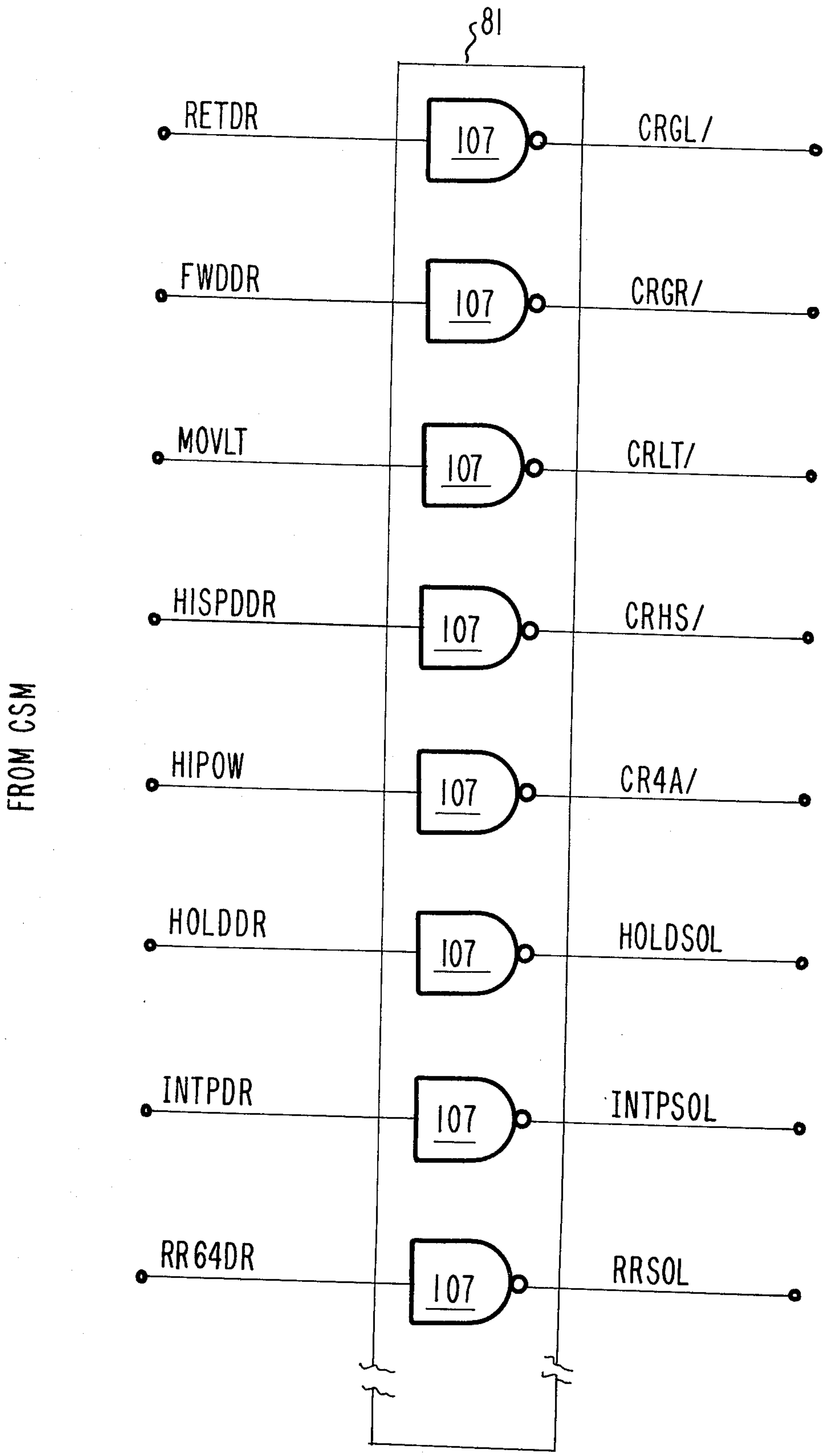
FIG. 5 sets forth a schematic of the solenoid driver circuits of block 81 of the system of FIG. 3.

The solenoid drivers of block 81 are substantially as shown in FIG. 5, which illustrates that eight of the control signals received from the carrier state machine CSM of block 79 of FIG. 3 are passed through a set of inverting drivers 107 so as to produce a new set of control signals labeled as shown in FIG. 5 and Table I given above.

Figure 6A:
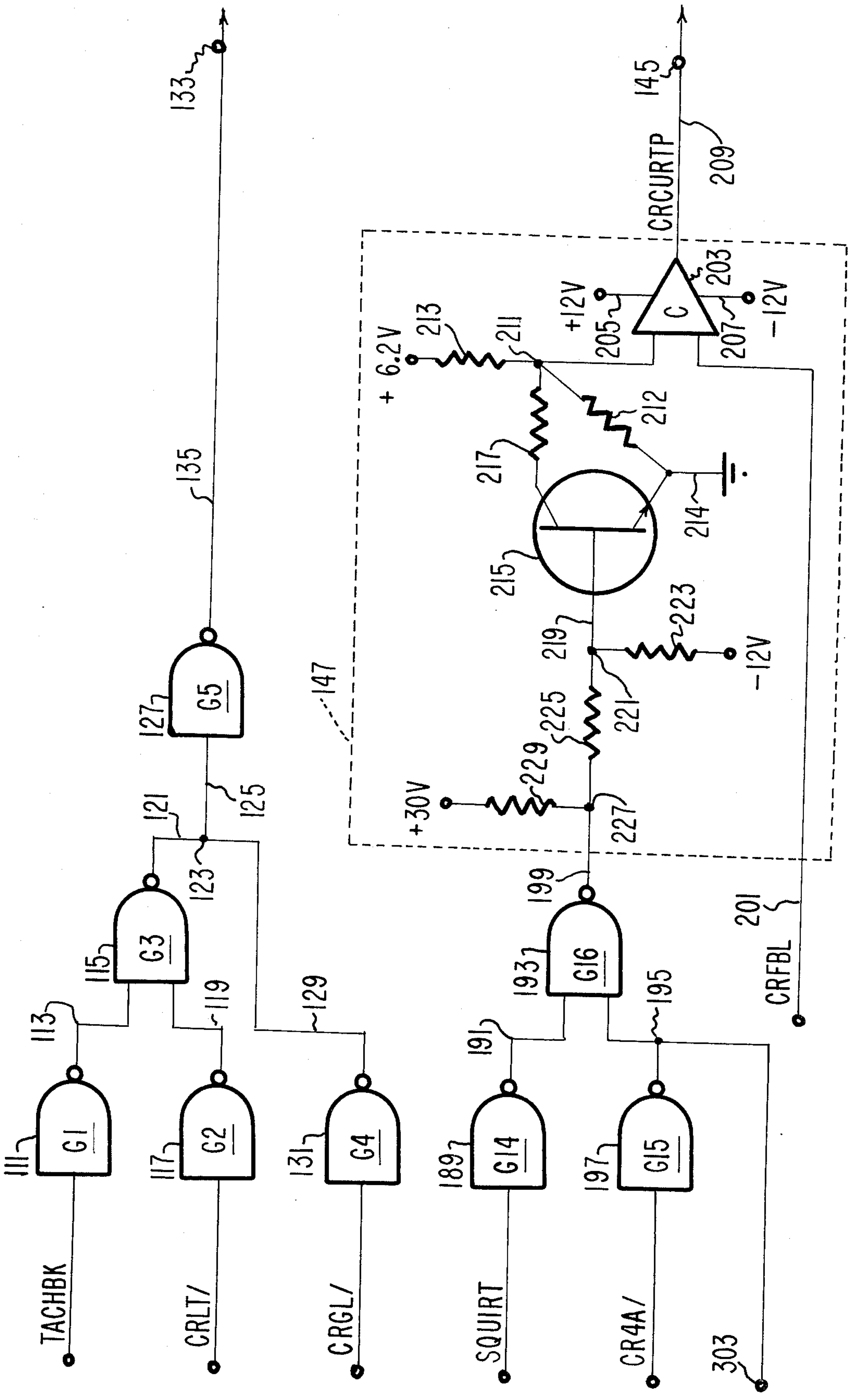
FIG. 6A and B illustrates a schematic diagram of the directional drive control system of block 87 of the system of FIG. 3.

The basic directional drive control system which is represented by block 87 of FIG. 3 is described with reference to FIG. 6A and B. The basic inputs to the circuit of FIG. 6 include CRGL/; CRGR/; CRLT/; and CR4A/ which are received from the solenoid drivers of block 81 of FIG. 3 as amplified in FIG. 5. In addition, the circuit of FIG. 6 receives the input signals TACHBK and SQUIRT from the tachometer and speed control circuitry of block 91 of the circuit of FIG. 3 and the signal CRFBL from the motor drivers of block 90 of the circuit of FIG. 3. The circuit of FIG. 6 provides four output signals which determine the direction and speed of the motor driver, and will be described with reference to FIG. 7.

The control signal TACHBK is fed to the input of NAND gate 111 which serves as a driver and its output is connected via lead 113 to a first input of NAND gate 115. The control signal CRLT/ is fed to the input of NAND gate driver 117 whose output is fed via lead 119 to a second input of NAND gate 115. The output of NAND gate 115 is fed via lead 121 to a node 123 and thence via lead 125 to the input of NAND gate driver 127. The junction 123 is also coupled via lead 129 to the output of NAND gate driver 131 whose input is the control signal CRGL/ from the solenoid driver circuitry of FIG. 5. The output of NAND gate 127 is connected to a node 133 via lead 135, and the node 133 is connected to the input of a NAND gate 137 via lead 139 and to one input of an AND gate 141 via lead 143. A second input of AND gate 141 is supplied with the generated signal CRCURTP which is taken from the output junction node 145 of the comparator portion of the circuit of FIG. 6 which is represented as being enclosed within the dotted block 147, and this output signal CRCURTP is supplied to the second input of the AND gate 141 via lead 149. The output of AND gate 141 is taken from junction node 151 and is designated as the control signal CRDLB/A.

The control signal TACHBK is also inputted to another driver NAND gate 153 whose output is coupled to one input of a NAND gate 155 via lead 157. The other input of NAND gate 155 receives the control signal CRLT/ from the circuit of FIG. 5, and the output of NAND gate 155 is fed to one input of a NAND gate 159 via lead 161. The other input of NAND gate 159 is supplied via lead 163 from the output of a NAND gate driver 165 whose input is the FIG. 5 control signal CRGR/. The output of NAND gate 159 is supplied to node 167 via lead 169. Node 167 is also connected to the input of NAND gate driver 171 via lead 173 and to one input of an AND gate 175 via input lead 177. The other input of AND gate 175 is the signal CRCURTP which is taken from the output junction 145 of the comparator system represented as being enclosed within the dotted block 147 as previously described via lead 178. The output of AND gate 175 is taken from junction node 179 and is designated as the control signal CRDRB/A. Junction node 179 is also connected to the output of NAND gate 137 at output junction node 181 via lead 183 and resistor 184 and the junction node 181 output serves to supply control signal GRDLAA. Similarly, the output junction node 151 of AND gate 141 is connected via lead 185 and resistor 186 to a junction output node 187 at the output of NAND gate driver 171 and is used to supply the signal CRDRAA.

The control signal SQUIRT from the T&S logic of block 91 of FIG. 3 is inputted to NAND gate driver 189 whose output is fed via lead 191 to one input of NAND gate 193. The other input of NAND gate 193 is connected via lead 195 to the output of a NAND gate driver 197 whose input is the control signal CR4A/. The output of NAND gate 197 also provides an output junction 303 for the signal CR4A which is used in the start logic circuitry of FIG. 10. The output of NAND gate 193 is supplied via lead 199 as a first input of the comparator system 147. A second input to the comparator system 147 is supplied via lead 201 and contains the signal CRFBL which is taken from the circuit of FIG. 7 to be described hereinafter. The signal CRFBL is supplied via lead 201 to the second input of a comparator 203 which is typical of the comparators known in the art. The comparator is also supplied from a +12 volt source via lead 205 and from a −12 volt source via lead 207. The output of the comparator 203 is fed to output node 145 via output lead 209 and provides the signal CRCURTP as previously described. The first or reference input to the comparator 203 is taken from node 211 and the level of the voltage of this node is capable of existing at either a predetermined high or a predetermined low level depending upon the input states of the SQUIRT and the CR4A/ signals. The circuitry utilized in attaining this two level reference signal includes a resistor 213 which has one end coupled to node 211 and its other end coupled to a +6.2 volt source of potential. Node 211 also connected to the collector of a transistor 215 via a resistor 217 and the transistor's emitter is coupled to ground via lead 214 and to input node 211 via resistor 212. The base of the transistor 215 is coupled via lead 219 to node 221. Node 221 is connected to one end of a resistor 223 whose other end is connected to a −12 volt source of potential and through a resistor 225 to a node 227. Node 227 is resistively coupled through a resistor 229 to a +30 volt source of potential and via lead 199 to the output of NAND gate 193 as previously specified.

Figure 6B:
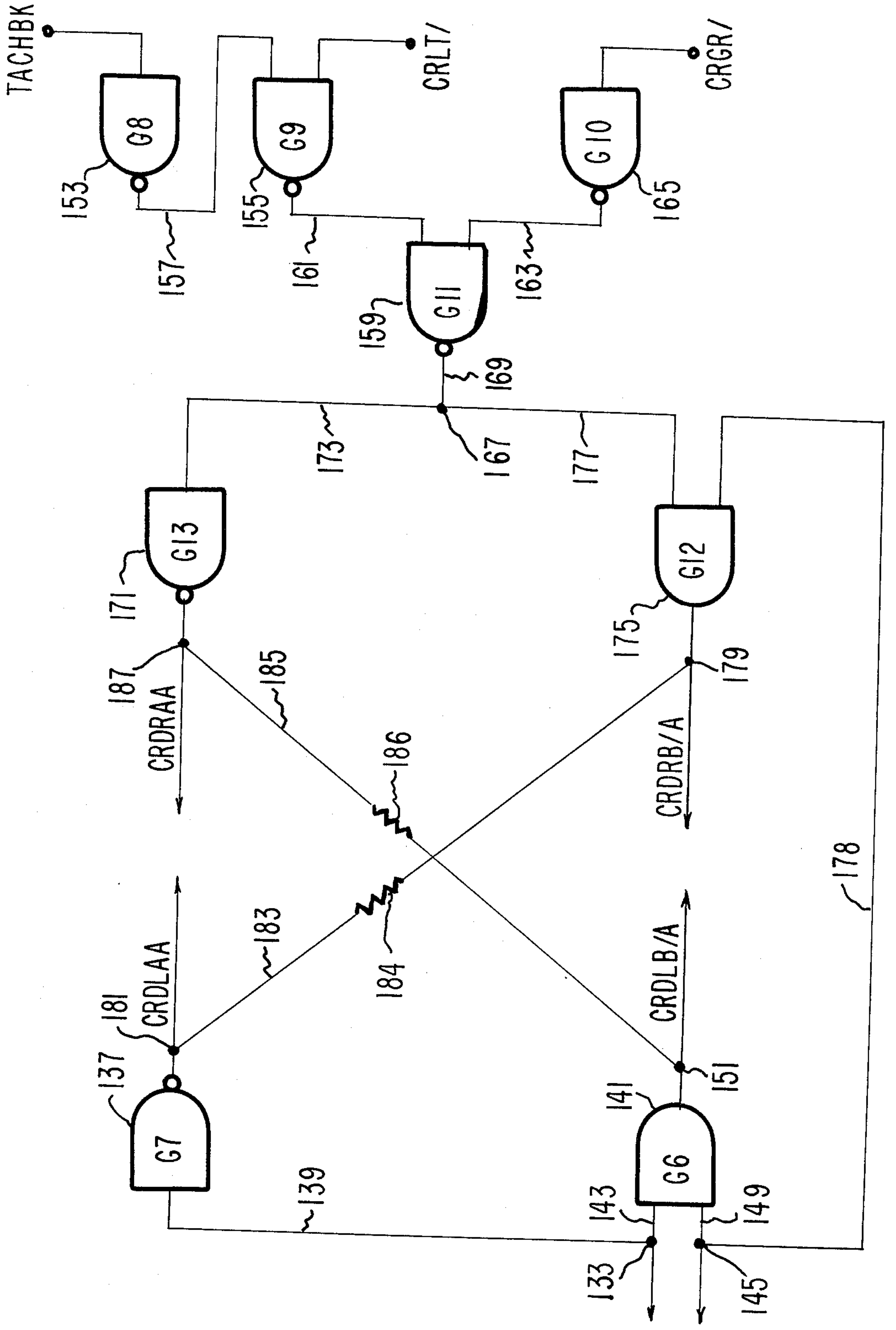
Figure 7:
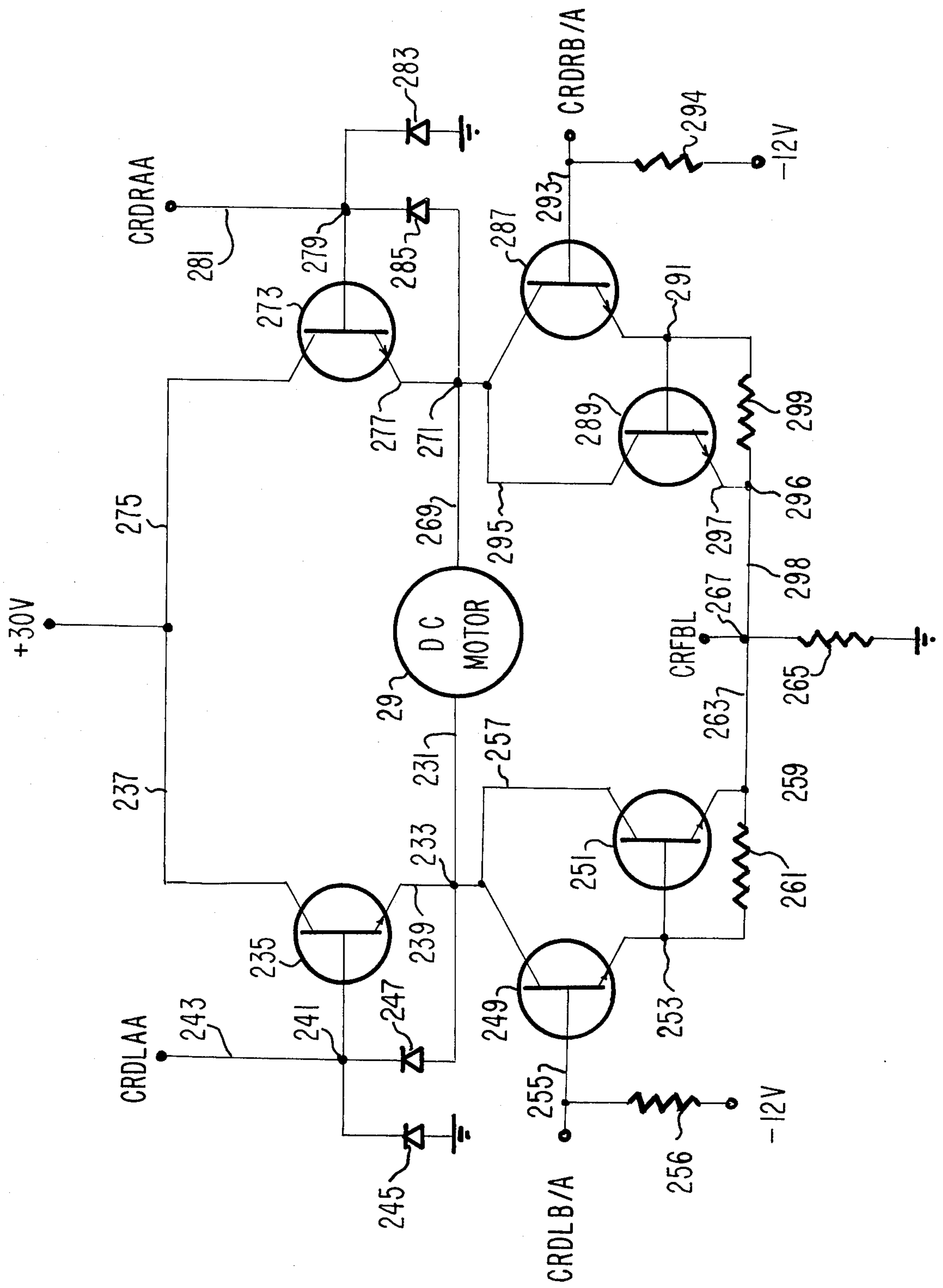
FIG. 7 shows a schematic diagram of the actual motor driver circuits of block 90 of the system of FIG. 3.

The schematic of FIG. 7 represents the motor control drivers of block 90 of FIG. 3 and has as its input the four outputs generated by the circuit of FIG. 6. The circuit of FIG. 7 is used to control carrier motor 29 which is a DC motor capable of rotating clockwise or counterclockwise at either high or low speed depending on the direction and the amount of current flowing through the motor winding. The carrier motor 29 is coupled to four separate driver circuits. Two of the driver circuits are coupled to the motor 29 via coupling 231 from driver coupling node 233. A first driver circuit comprises transistor 235 which has its collector coupled to a +30 volt source of potential via lead 237 and its emitter connected to driver coupling node 233 via lead 239. The base of transistor 235 is connected to a first driver input node 241 which receives the input signal CRDLAA from node 181 of the circuit of FIG. 6 via lead 243. The node 241 is also coupled to ground through a diode 245 which has its anode connected to ground and its cathode connected to the node 241. The node 241 is also coupled to the driver coupling node 233 through a diode 247 which has its anode connected to the node 233 and its cathode connected to node 241.

A second driver circuit is comprised of transistors 249 and 251 which are connected to form a first darlington amplifier pair. Transistor 249 has its cathode coupled to driver coupling node 233, its emitter coupled to a node 253 and its base connected to junction node 151 of the circuit of FIG. 6 for receiving the signal CRDLB/A via lead 255. The collector of transistor 249 is also connected to the collector of transistor 251 via lead 257 and the emitter of transistor 251 is coupled to a node 259 which is resistively coupled to node 253 through resistor 261. Node 259 is also coupled via lead 263 to one end of the resistor 265 whose opposite end is grounded. At the point where lead 263 is coupled to resistor 265 an output node 267 is situated and is used to provide the signal CRFBL which is utilized in the circuit of FIG. 6 as one input of comparator 147.

The third and fourth driver circuits are coupled to the carrier motor 29 via lead 269 from a second input driver coupling node 271. The third driver circuit comprises a transistor 273 whose collector is coupled to a +30 volt source of potential through lead 275 and whose emitter is coupled to the driver coupling node 271 via lead 277. The base of transistor 273 is coupled to an input node 279 which acts to receive the input signal CRDRAA from junction 187 of the circuit of FIG. 6 via lead 281. Input node 279 is also coupled to ground through a diode 283 whose anode is coupled to ground and whose cathode is coupled to the junction 279, and is further coupled to the driver coupling node 271 through a diode 285 whose anode is connected to the driver coupling node 271 and whose cathode is coupled to the input node 279.

The fourth motor driver circuit comprises a second darlington amplifier pair which includes the transistors 287 and 289. Transistor 287 has its collector coupled to driver coupling node 271 and its emitter coupled to a node 291. The base of transistor 287 receives the signal CRDRB/A from junction 179 of the circuit of FIG. 6 via input lead 293. The base of transistor 289 is connected to the node 291 and the collector of transistor 289 is coupled to the collector of transistor 287 via lead 295. The emitter of transistor 289 is coupled to the output node 267 via lead 297, node 296 and lead 298. Node 296 is resistively coupled to node 291 via resistor 299.

As was noted above, the transistors 235 and 273 serve as single transistor drivers which control the direction of carrier movement. When transistor 235 is on, it enables the carrier to be driven to the left and when transistor 273 is on, it enables the carrier to be moved to the right. As is readily observed from the nature of the associated logic controlling the conduction or non-conduction of transistors 235 and 273, when one of these drive transistors is enabled, the other is normally disabled and vice versa. Drive transistor pair 249 and 251 and drive transistor pair 287 and 289 are configured as darlington amplifiers and are used to control the level of current flow through the carrier motor. It is readily observed that as with the single drive circuits, only one of the darlington drive circuits may be enabled at a given time.

There are three directional drive conditions for the carrier motor and these conditions will be described in the following discussion of the operation of the drive control system of the present invention, with reference to FIGS. 3, 6 and 7.

The first possible drive condition for the carrier motor would be a condition under which no drive is required. This "no drive" state is implemented as follows: In order to energize the carrier motor 29, at least two of the four drivers must be turned on. For a right drive the transistor driver 273 and the darlington driver comprising transistors 249 and 251 must be on and for left drive the single transistor 235 and the darlington driver comprising transistors 287 and 289 must be on. In the "no drive" state, CRGL/ and CRGR/ will both be high. It will be recalled that the signal CRGL/ represents a carrier go left signal negated and CRGR/ represents a carrier go right instruction negated. If both of these signals are high, the instructions are effectively do not go left and do not go right respectively. If CRGL/ is high, the output of NAND gate 131 will be low and when this low is transmitted via lead 129, node 123, and lead 125 to the input of NAND gate 127, the output of NAND gate 127 will go high. This high will be supplied to the input of NAND gate 137 via lead 135, junction 133 and lead 139. A high signal at the input of NAND gate 137 will result in a low at the output node 181. The presence of a low at junction 181 is transmitted via lead 243 of the circuit of FIG. 7 to input node 241 at the base of transistor driver 235. The presence of a low at the base of transmitter 235 will hold transistor 235 biased in the off position. Similarly, if the signal CRGR/ is high and is inputted to NAND gate 165, a low will result at its output and be transmitted via lead 163 to NAND gate 159. Since a low is present at the other input of NAND gate 159, a high will appear at its output and be transmitted via lead 169, junction 167 and lead 173 to the input of NAND gate 171. A high at the input of NAND gate 171 will result in a low signal at the output node 187 and this low is transmitted via lead 281 of the circuit of FIG. 7 to input node 279. As the low is applied to the base of driving transistor 273, the transistor will remain biased in a non-conducting state.

At the same time the low which is present at the output of NAND gate 137 at output node 181 will be transmitted via lead 183 to node 179 thereby clamping the node 179 which represents the output of AND gate 175 in a low state. This insures that the signal CRDRB/A is low and since this signal is inputted via lead 293 of the circuit of FIG. 7 to the base of transistor 287, it will insure that the transistor remains biased in the off position thereby keeping both transistors of the darlington pair comprising transistors 287 and 289 in a substantially non-conducting state. Similarly, the low signal which appears at the output of NAND gate 171 at output node 187 is applied via lead 185 to node 151 thereby clamping the output of AND gate 141 to a low state. This insures that the signal CRDLB/A is low and since this signal is applied via lead 255 of the circuit of FIG. 7 to the base of transistor 249, the darlington pair comprising transistors 249 and 251 will remain in a substantially non-conducting state. Hence will both of the signals CRGL/ and CRGR/ being high, all carrier driver transistors remain in the off position and the carrier motor 25 does not move.

When it is desired that the carriage be driven to the right, the solenoid driver circuit 81 of FIG. 5 will provide a CRGR/ signal which will be low. Since this low signal is applied to the input of NAND gate 165, its output will go high and this high signal will be transmitted via lead 163 to the input of NAND gate 159. A high at both inputs of NAND gate 159 will cause a low at its output and this low will be transmitted to node 167 via lead 169. A low at node 167 will be transmitted via lead 177 to one input of AND gate 175, thereby causing its output to go low. As discussed previously, a low signal at node 179 will cause the signal CRDRB/A to be low and when this low is applied to the base of transistor 287 via lead 293, the darlington amplifier stage comprising transistors 287 and 289 will remain off. Similarly, if this low is transmitted from the junction node 179 to the junction node 181 via lead 183, the signal CRDLAA will be clamped low and since this signal is supplied to the base of transistor 235 via lead 243 and junction 241, driving transistor 235 will remain off. The presence of a low signal at the node 167 will also be transmitted via lead 173 to the input of NAND gate 171. This will cause the output of NAND gate 171 as taken from junction node 187 to go high thereby causing the CRDRAA signal to go high. The application of a high CRDRAA signal via lead 281 and input node 279 to the base of transistor 273, will cause the drive transistor 273 to turn on. This same high signal is transmitted from the junction node 187 to the junction 151 via lead 185, causing the signal CRDLB/A to go high. Since this high signal is inputted to the base of darlington transistor 249 via lead 255, it will switch the transistor 249 to a conductive state and allow the darlington pair to operate in the linear range in accordance with the signals present at the input of AND gate 141. The conduction of transistor 249 will cause transistor 251 to conduct and once transistors 249 and 251 are switched to a conductive state, the darlington amplifier stage will provide a current path between ground and the +30 volt source via resistor 265, output node 267, lead 263, node 259, the first darlington amplifier stage, driver compelling node 233, lead 231, the DC carrier motor 29, lead 269, driver coupling node 271, lead 277, transistor 273, lead 275, and the +30 volt source of potential. To insure that there is one and only one conductive path we note that the signal CRGL/ will remain high. The presence of this high signal at the input of NAND gate 131 will cause a low to appear on lead 129 and when this low applied to the input of NAND gate 127 via node 123 and lead 125, the output of NAND gate 127 will go high causing a high to appear at node 133 via lead 135. As this high is applied via lead 139 to the input of NAND gate 137, the output junction node 181 of NAND gate 137 will go low. This will cause a low CRDLAA signal to be applied to the base of transistor 235 via lead 243 and node 241, thereby insuring that it remains in the off condition. Since the output junction node 181 is coupled via lead 183 to the output junction node 179, the signal CRDRB/A will be clampled low and since this signal is applied to the base of transistor 287 via lead 293, the second darlington pair comprising transistors 287 and 289 will be clamped in the off position.

The other input of AND gate 141 will receive a signal CRCURTP from the output of the comparator circuit 147 and this signal will determine whether or not AND gate 141 passes a high signal. The conduction of the first darlington pair comprising transistors 249 and 251 will be controlled by the signals CRDLB/A and hence will be altered in accordance with the comparator output signal CRCURTP. As current flows through the path previously discussed, a voltage is developed across the resistor 265. This voltage is designated as the signal CRFBL and is used as one input to comparator 203 via lead 201. The other input to comparator 203 is a reference voltage which can assume one of two levels depending upon the output of NAND gate 193. Whenever the voltage across resistor 265 exceeds the reference voltage as determined by the current state of the output of NAND gate 193, the output of comparator 203 goes low and substantially reduces the conduction of the first darlington driver transistors 249 and 251. This will cause the voltage across resistor 265 to drop and the signal CRFBL to decrease. As this signal is decreased and fed via lead 201 to one input of comparator 203, the output of the comparator 203 will go high, driving transistors 249 and 251 harder. This action by the comparator circuit insures uniform carrier current. As indicated previously, there are actually two reference voltages into the second input 211 of comparator 203 which are dependent upon the state of the SQUIRT and the CR4A/ signals. When the carrier is to drive at a high current, the signal at the output of NAND gate 193 will insure that the voltage at node 211 is greater than when a low current carrier drive is desired. The presence of a higher reference voltage at this input of the comparator 203 will then be compared to the higher voltage across resistor 265 so as to allow the carrier to drive at the desired higher constant current.

The complementary conditions prevail for drive left as for drive right. The CRGL/ signal will be low; transistor 235 will be rendered conductive, and the second darlington amplifier pair comprising transistors 287 and 289 will conduct. A current path will be established between ground and the +30 volt source via resistor 265, output node 267, lead 298, node 296, the second darlington amplifier pair comprising transistors 287 and 289, driver coupling node 271, lead 269, the D.C. carrier motor 29, lead 231, driver coupling node 233, drive transistor 235, and lead 237. Simultaneously, drive transistor 273 will be disabled and the first darlington amplifier stage comprising transistors 249 and 251 will be clamped off. The operation of the comparator circuit will similarly insure a constant current and the state of the signal at the output of NAND gate 193 will alter the reference input of node 211 to the comparator 203 so as to allow either high current or low current operation.

Figure 8:
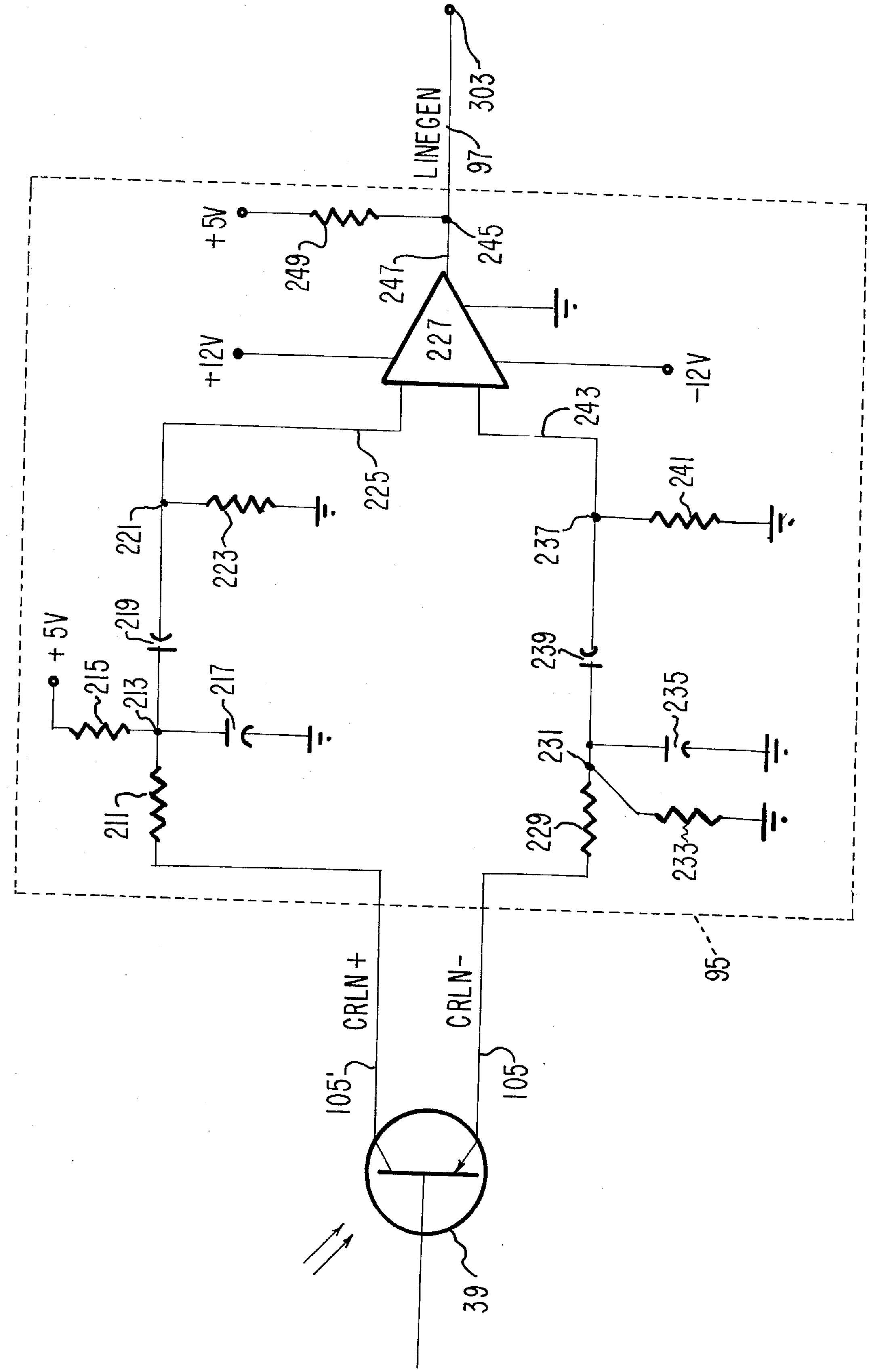
FIG. 8 illustrates a schematic diagram of the carrier position readout system of block 95 of the system of FIG. 3.

FIG. 8 describes in detail the carrier position readout assembly of block 95 of the circuit of FIG. 3. A photo-transistor 39 which was specified with reference to FIG. 1 receives the light which is emitted from lamp 37 at its base each time one of the slots of the slotted disk 35 is positioned between the lamp and the phototransistor 39. The photo-transistor 39 passes the signal CRLN+ on its collector lead 105' and the signal CRLN− on its emitter lead 105. As indicated in the block diagram of FIG. 3, these leads pass the CRLN+ and CRLN− signals to the carrier position read-out assembly of block 95. The CRLN+ signal is transmitted via lead 105' through a resistor 211, to a node 213. Node 213 is connected to a +5 volt source of potential through a resistor 215 and to ground through a capacitor 217. Node 213 is also connected through a capacitor 219 to node 211 which in turn is connected through resistor 223 to ground and via lead 225 to a first input of a comparator 227. The CRLN- signal is transmitted via lead 105 through a resistor 229 to a node 231. Node 231 is coupled to ground through a resistor 233 and is coupled to ground through a capacitor 235. Node 231 is also coupled to node 237 through a capacitor 239. Node 237 is coupled to ground through resistor 241 and is coupled via lead 243 to the second input of comparator 227. Comparator 227 is a standard commercial comparator well known in the art and has a third input connected to a +12 volt source of potential, a fourth input connected to a −12 volt source of potential and a grounded input. The output of the comparator 227 is supplied to node 245 via lead 247. Node 245 is coupled through a resistor 249 to a +5 volt source of potential and serves to supply the output pulse LINEGEN to input terminal 303 of the CAPRO counter of FIG. 11 via lead 97. The LINEGEN or line generator pulse is a positive going pulse for each slot on the timing disk 35 and enables the CAPRO counter of FIG. 11 to count.

Figure 9:
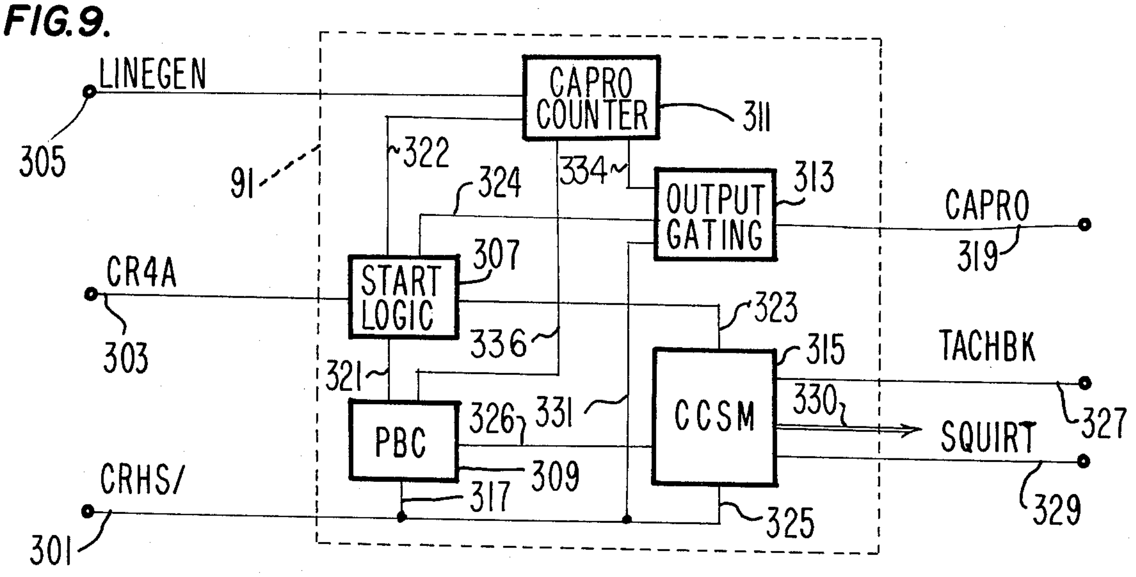
FIG. 9 is a block diagram of the electronic tachometer and speed control circuitry, including the carrier control state machine and its associated logic, which was represented by block 91 of the system of FIG. 3.

FIG. 9 depicts, in block diagram form, the tachometer and speed control circuitry of the T&S control block 91 of FIG. 3. The inputs to the tachometer and speed control systems of block 91 include the signal CR4A which is the complement to the control signal CR4A/ which is an output of the solenoid driver circuit 81 of FIG. 5; the signal CRHS/ which is an output of the solenoid driver circuit 81 of FIG. 5; and the signal LINEGEN which is the output of the circuit of FIG. 8, and as described above, each LINEGEN or line generator signal is a positive going pulse for each timing slot on the position read-out disk 35. The electronic tachometer and speed control circuitry of FIG. 9 generates the output signals TACHBK and SQUIRT which are used as inputs to the logic circuit of FIG. 6 and the signal CAPRO which is an input signal to the carrier state machine CSM block 79 of FIG. 3. The CAPRO signal informs the logic contained in CSM block 79 that the character has moved one complete character position. The signals TACHBK, SQUIRT, TRANSPT, and BMPSTTP which are generated in the CCSM 315 are also fed back to CSM block 79 of FIG. 3 to control direction changes as described with reference to FIG. 17. The circuitry of block 91 contains electronic tachometer logic and a carrier control state machine (CCSM) which are used to control the speed of the carrier motor 29 relative to the distance to be traveled by the carrier 15. This control is required in order to accurately position the carrier to the proper stop position as specified by the input logic of block 75 so that printing may take place. The carrier state machine logic of block 79 decodes various input signals and instructions as previously discussed, and causes the solenoid drivers 81 to generate the control signal CRHS/ which is fed to one input of the circuit of FIG. 9 via input 301. Similary, the solenoid driver circuitry of FIG. 5 produces the signal CR4A/ which is supplied to the input of NAND gate 197 of the circuit of FIG. 6. NAND gate 197 inverts the input signal so that the signal CR4A is available at the output of NAND gate 197 and may be supplied to the circuit of FIG. 9 via input 303. The signal LINEGEN which was the output of the circuit of FIG. 8 is inputted to the circuit of FIG. 9 via input 305. As discussed previously, the two command or control signals CR4A and CRHS/ are used to begin carrier movement. CR4A going high, produces a high motor current which is required to start the carrier motor 29 from a dead stop irrespective of whether the carrier 15 is to move at a high speed of 33 inches per second (ips) or a low speed of 4.5 ips. The state of CRHS/ will determine whether the carrier is to move at the high or the low speed.

The electronic tachometer and speed control system of block 91 includes a start logic subsystem 307, a presettable binary couner 309, a carrier position read-out counter 311, output gating circuitry 313 and a carrier control state machine 315. The presettable binary counter 309 is responsive to the state of input signal CRHS/ which is fed to the presettable binary counter 309 via lead 317 to determine the preset of the binary counter and ultimately the speed at which the motor drives the carriage. It is also used to detect velocity errors by counting pulses which occur between LINEGEN pulses and it delays the generation of the CAPRO pulses from output lead 319 of output gating circuitry 313 until the carrier motor is sufficiently up to speed from a dead stop. This will insure that the character position counter will be accurately decremented to zero which is the desired carrier stop destination. This is achieved by the presettable binary counter by requiring that a predetermined count be attained before passing a signal indicative thereof over lead 321 to the start flip-flop subsystem 307. When the CR4A signal which is supplied to input 303 to the start logic subsystem 307 goes high, the start logic subsystem 307 will allow the pesettable binary counter 309 to be preset and initiate its count and will allow the transmission of signals on lead 322 to enable the CAPRO counter and on lead 324 to enable the output gating logic 313 to pass the CAPRO signal on output lead 319. The start logic subsystem also passes signals on lead 323 to the carrier control state machine 315, which also receives the signal CHRS/ from input 301 via lead 325. The carrier control state machine moves to the various states and produces output signal TACHBK on lead 327 and output signal SQUIRT on lead 329. The CCSM signals TACHBK, TRANSPT, SQUIRT and BMPSTTP are also supplied to CSM79 (as described with reference to FIG. 17) via output path 330. Various inter-relationships between the CCSM 315 and the PBC 309 are represented by the line 326. The signal CRHS/ from input 301 is also fed to the output gating circuitry 313 via lead 331 and is used in the output gating logic. The carrier position read-out or CAPRO counter 311 gates the signals indicative of the CAPRO counter via lead 334 to output gating circuitry 313 where it is gated to output 319 as the control signal CAPRO. The CAPRO counter 311 receives the LINEGEN signals via lead 305 and uses this signal to generate the CAPRO signal which informs the logic of the carrier state machine of block 79 of FIG. 3 that the carrier has been moved one position relative to its stop destination as specified by the character position counter of FIG. 3. Signals are transmitted via data path 336 from the CAPRO counter 311 to the presettable binary counter 309 to control preset to allow the presettable binary counter to monitor for carrier velocity errors. The circuitry and operation of the various subblocks contained within FIG. 9 will be disclosed hereinbelow and the inter-relationship between the various blocks will be described.

Figure 10:
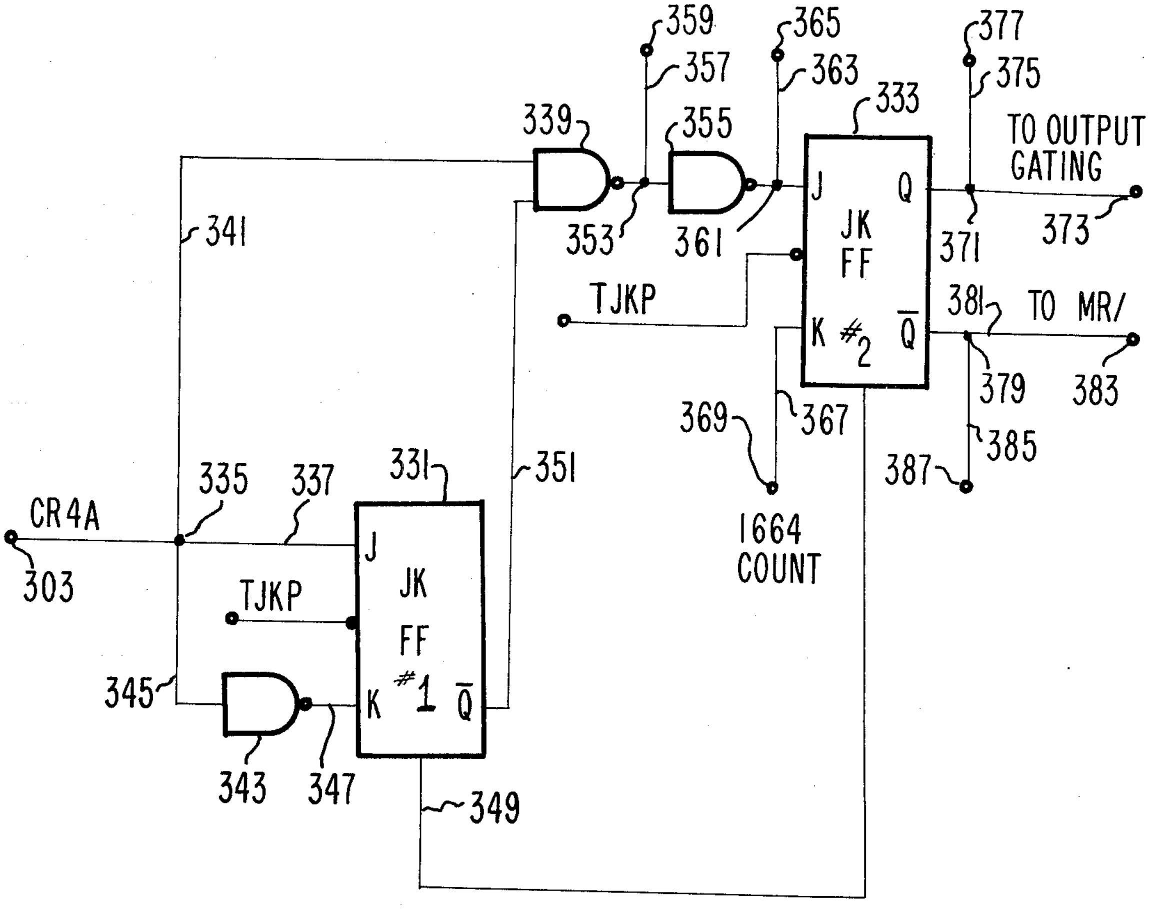
FIG. 10 is a schematic diagram of the start logic of block 307 of the block diagram of FIG. 9.

FIG. 10 shows a schematic diagram of the start logic circuitry of block 307 of FIG. 9. The start logic circuitry of FIG. 10 employs a first JK flip-flop 331 and a second JK start flip-flop 333 to preset and start the presettable binary counter PBC of block 309 and the carrier position read-out counter CAPRO of block 311 during a carrier excursion period. One input 303 of the start logic circuit of FIG. 10 supplies the signal CR4A to node 335. Node 335 is connected to the "J" input of JK flip-flop 331 via lead 337; to one input of a NAND gate 339 via lead 341; and to the input of NAND gate 343 via lead 345. The output of NAND gate 343 is supplied to the "K" input of JK flip-flop 331 via lead 347 while the clock input of JK flip-flop 331 is supplied with clock pulses TJKP from a source of clock pulses not shown but known in the art. The clear input of JK flip-flop 331 is connected to the clear input of JK start flip-flop 333 via lead 349 and the "Q̄" output of JK flip-flop 331 is coupled via lead 351 to the second input of NAND gate 339. The output of NAND gate 339 is coupled to node 353 which serves as the input to NAND gate 355, and node 353 is also coupled via lead 357 to junction 359 which is coupled to the presettable binary counter 309 of the circuit of FIG. 9. The outputs of NAND gate 355 is coupled to node 361 which serves as the "J" input to JK start flip-flop 333 and which is coupled via lead 363 to junction 365 which is similarly coupled to the presettable binary counter circuitry of block 309. The clock input of JK start flip-flop 333 is provided with clock pulses TJKP from the above-cited source of clock pulses and the "K" input of start flip-flop 333 is coupled via lead 367 to a junction 369 which in turn is coupled to the presettable binary counter of block 309 of the circuit of FIG. 9 so as to receive the predetermined 1664 count which indicates that sufficient time has lapsed so as to prevent the generation of the CAPRO count until the carrier motor is actually moving. The "Q" output of the JK start flip-flop 333 is taken from node 371 and is supplied via junction 373 to the output gating circuitry of block 313 of the circuit of FIG. 9 via lead 375 to junction 377 which supplies this signal to both the CAPRO counter of block 311 and to the carrier control state machine CCSM of block 315. The "Q" output of start flip-flop 333 is taken from node 379 thence via lead 381 to junction 383 which is supplied to and used to initiate the CAPRO counter of block 311 and via lead 385 to junction 387 which supplies this signal both to the presettable binary counter PBC of block 309 and to the carrier control state machine CCSM of block 315.

As mentiond previously, a high CR4A signal indicates that a high motor current is required for starting and operating the carrier motor. With the carrier stopped and the motor inoperative, CR4A is low and the presence of a low signal at junction 335 means that a low is provided to the "J" input of JK flip-flop 331 via lead 337 and a high is provided to the "K" input of JK flip-flop 331 via lead 345, NAND gate 343 and lead 347. The presence of a high at the "K" input of JK flip-flop 331 prevents it from being set thereby maintaining the "Q̄" output high. Since this high is presented to one input of NAND gate 339 via lead 351 while the other input is provided with the low CR4A signal via lead 351, the output of NAND gate 339 which is junction 353, remains high thereby forcing the output of NAND gate 355 which is taken from node 361 to be low. This low is supplied to junction 365 via lead 363 and is later inverted and used to inhibit the parallel enable preset inputs of the PBC 309. When it is desired for the carrier to move, the CR4A signal goes positive so as to present a high at the "J" input of the JK flip-flop 331; a low at the "K" input of JK flip-flop 331; and a high on one input of NAND gate 339. Since the other input of NAND gate 339 is taken from the "Q̄" output of JK flip-flop 331 which remains high until the arrival of the next clock pulse, both inputs to NAND gate 339 are momentarily high causing a low to appear at output node 353 which is inverted by NAND gate 355 to supply a high at input node 361. The presence of a high at input node 361 is supplied to junction 365 via lead 363 and fed to an inverter before being used to enable the preset inputs of the presettable binary counter 309 as hereinafter described. Upon the arrival of the next clock pulse TJKP, JK flip-flop 331 will set; the JK start flip-flop 333 will set; and the count contained on the parallel preset inputs of the PBC 309 will be loaded into the PBC as hereinafter described.

After the JK start flip-flop 333 has been set by the arrival of the clock pulse TJKP, the "Q" output as taken from node 371 goes high and the "Q̄" output as seen at node 379 goes low. The low signal present at node 379 is fed via lead 385 to junction 387 and is used to inhibit the CAPRO counter 311 of the circuit of FIG. 9 by keeping the second four bit counter chip reset via its MR/ line as described hereinafter. Approximately five milliseconds later, the presettable binary couner 309 generates the signal 1664 which indicates that a sufficient time has lapsed for the carrier motor to come up to speed and this signal is supplied via junction 369 and lead 367 to the "K" input of JK start flip-flop 333 so as to reset the start flip-flop 333 thereby enabling the CAPRO counter by supplying the high which is present at the "Q̄" output or junction 379 to the MR/ input of the second stage of the CAPRO counter via lead 385 and junction 387 as hereinafter described.

The carrier position read-out counter or CAPRO counter of block 311 of FIG. 9 will now be discussed in detail with reference to FIG. 11. The CAPRO counter comprises three subcounter circuits labeled CAPRO counter chip No. 1 (CCC1), CAPRO counter chip No. 2 (CCC2) and CAPRO counter chip No. 3 (CCC3). Each of these chips is a standard, of-the-shelf, TTL9316 four bit counter chip as known in the art. Each such chip includes a set of four parallel preset inputs labeled $P_0$ through $P_3$; a set of four counter outputs labeled $Q_0$ through $Q_3$; a termination count output labeled TC; a parallel enable input labeled PE/; a master reset input labeled MR/; a clock pulse input labeled CP; a count enable parallel input labeled CEP; and a count enable trickle input labeled CET. These chips and the designated inputs and outputs and the operation thereof are well-known in the art and their construction forms no part of the present invention.

The carrier position read-out counter or CAPRO counter is required to inform the carrier state machine logic CSM of block 79 of FIG. 3 that the carrier has moved a unit of position. Each time a CAPRO pulse is generated, the character position counter CPC contained in the logic of FIG. 3 will be decremented so as to indicate that the carrier has moved one complete position. CAPRO, therefore, informs the carrier state machine CSM logic as to the movement of the carrier relative to its stop destination as specified by the character position counter CPC.

As discussed with reference to FIG. 8, a character position read-out timing disk in conjunction with a lamp and photo-transistor arrangement, generates a set of signals CPLN+ and CPLN− which are referred to as character position line numbers. These signals serve as inputs into the comparator 227 of the circuit of FIG. 8 and the output of comparator 227 is designated LINEGEN for line generator. LINEGEN is a positive going pulse for each slot on the timing disk 35 and the signal LINEGEN enables the carrier position read-out counter or CAPRO counter to begin its counting.

Figure 11:
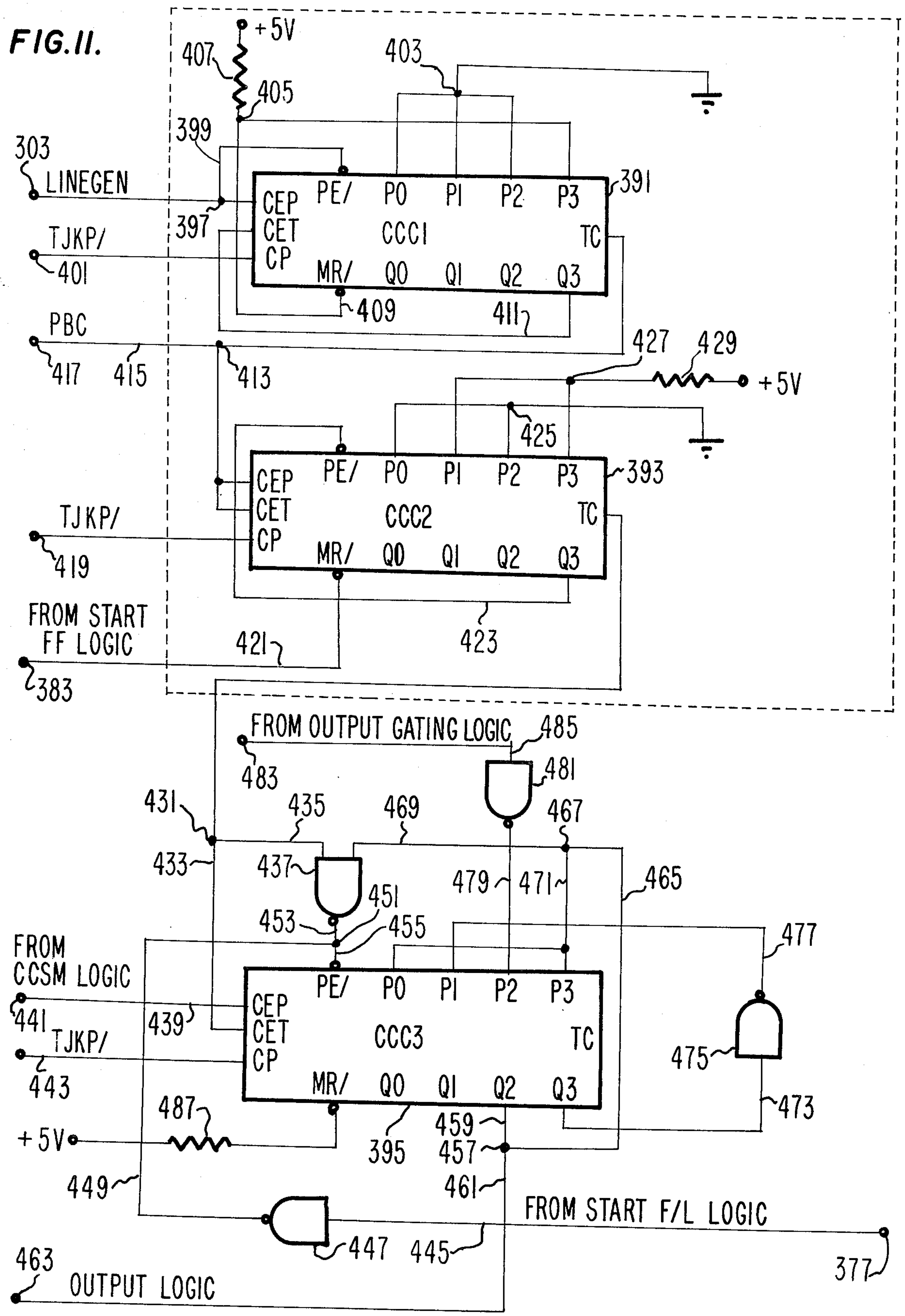
FIG. 11 is a schematic diagram of the CAPRO counter of block 311 of the block diagram of FIG. 9.

The CAPRO counter comprises a first CAPRO counter chip designated CCC1 and labeled as block 391 in the circuit of FIG. 11. This chip is a standard four bit counter chip, as previously discussed, which is configured as a basic Mod 7 counter. A second CAPRO counter chip is designated CCC2 or block 393 and is similarly comprised of a four bit counter chip configured as a Mod 6 counter. The third and final counter chip of the CAPRO counter is designated CCC3 or block 395 and comprises a four bit counter chip configured basically as a Mod 4 counter.

The signal LINEGEN which is the output of the circuit of FIG. 8 is inputted to the CEP input of the first counter 391 via input lead 303 and node 397. Node 397 is also connected to the parallel enable input PE/ of the first counter 391 via lead 399. A source of clock pulses TJKP/ are fed via lead 401 to the clock pulse or CP input of the first counter 391. The parallel preset inputs $P_0$, $P_1$ and $P_2$ are coupled via node 403 to ground while the P3 parallel preset input is coupled to a node 405. Node 405 is coupled through a resistor 407 to a +5 volt source of potential and via lead 409 to the master reset input MR/. The CET input is connected via lead 411 to the $Q_3$ output of the counter and the terminal count or TC output of the first counter 391 is coupled to node 413 which serves as the terminal count output of the first counter 391. Node 431 is coupled via lead 415 to a terminal 417 which couples to the circuitry of the presettable binary counter of block 309 of the circuit of FIG. 9 and which will be hereinafter described. Furthermore, node 413 is coupled to the CEP input and to the CET input of the second CAPRO counter chip 393. A source of clock pulses TJKP/ is coupled via lead 419 to the clock pulse or CP input as was the case of the first CAPRO counter chip 391. The master reset input MR/ is coupled via lead 421 to terminal 383 of the start logic circuitry of FIG. 10. The $Q_3$ output of the second counter chip 393 is fed via lead 423 back to the preset enable input PE/. Parallel presets inputs $P_0$ and $P_2$ are connected to ground via node 425 while parallel preset inputs $P_1$ and $P_3$ are connected to node 427 and thence via resistor 429 to a +5 volt source of potential. Node 431 is coupled to the TC terminal and serves as the terminal output of the second counter chip 393.

The third CAPRO counter chip 395 is more complex and is configured as a basic Mod 4 counter. The CET input of the third counter 395 is coupled to node 431 via lead 433 and node 431 is also coupled via lead 435 to one input of a NAND gate 437. The CEP input of the third counter 395 is coupled via lead 439 to a terminal 441 which is coupled to the carrier control state machine CCSM of block 315 of the circuit of FIG. 9 to be described hereinafter. As with the first and second counters, a source of clock pulses TJKP/ are fed via lead 443 to the clock pulse or CP input of the third counter 395.

Terminal 377 of the start logic circuitry of FIG. 10 is connected via lead 445 to the input of a NAND gate 447 whose output is connected via lead 449 to node 451. Node 451 is connected to the output of NAND gate 437 via lead 453 and via lead 455 to the parallel preset enable input PE/ of the third CAPRO counter chip 395. The $Q_2$ output of the third CAPRO counter chip 395 is connected to a node 457 via lead 459. Node 457 provides the CAPRO counting pulses to the output gating circuitry of FIG. 12 via lead 461 and junction terminal 463. Node 457 is also connected via lead 465 to a node 467. Node 467 is connected to the second input of NAND gate 437 via lead 469 and to the $P_0$ and $P_3$ parallel preset inputs of the third CAPRO counter chip via lead 471. The $Q_3$ output of the third CAPRO counter chip 395 is connected via lead 473 to the input of a NAND gate 475 whose output is coupled via lead 477 to the $P_1$ parallel preset input. The final parallel preset input $P_2$ is connected via lead 479 to the output of a NAND gate 481 whose input is received from junction 483 of the output gating logic of FIG. 12 via lead 485. The master reset input MR/ is coupled to a +5 volt source of potential through a resistor 487.

The operation of the CAPRO counter of FIG. 11 will now be briefly described. As indicated previously, the first CAPRO counter chip (CCC1) 391 and the second CAPRO counter chip (CCC2) 393 are four bit counter chips configured as Mod 7 and Mod 6 counters respectively. The first CAPRO counter chip 391 has its parallel preset inputs $P_0$, $P_1$ and $P_2$ tied to ground through node 403 for the purpose of presetting the counter with a low. The $P_3$ parallel preset input is tied to a +5 volt source of potential through resistor 407 and lead 405 so as to insure that the $P_3$ preset input is always high when the first counter 391 is preset. Between slots on the character position read-out timing disk, the signal LINEGEN will be low and this low is transmitted to the CEP input of the first CAPRO counter 391 via lead 303 and node 397. The presence of a low at the CEP input will disable any counting by the counter 391, and since the LINEGEN signal is coupled to the parallel enable iput PE/ via lead 399, the presence of a low at this input will allow the $P_0 - P_3$ condition of 0001 to be preset into the counter so as to force the $Q_0 - Q_3$ outputs to the count 0001 upon the occurrence of the next TJKP/ clock pulse. The "1" or high on the $Q_3$ output enables the CET input via lead 411, and as soon as a timing slot passes between the lamp 37 and the phototransistor 39, the LINEGEN pulse goes high so as to disable the PE/ input and enable the CEP input such that the counter begins to count clock pulses beginning with the preset count of eight (0001) and ending with a count of 15 (1111), whereupon all of the $Q_0 - Q_3$ outputs will contain 1's causing the terminal count TC which is transmitted to node 413 to become high at this time. The occurrence of the next clock TJKP/ pulse will reset the counter 391 to 0000 and a "0" at the $Q_3$ output will be transmitted back to the CET input via lead 411 so as to again disable the counter 391 and allow it to remain in the reset condition until the arrival of the next LINEGEN pulse which repeats the preset-count procedure described above.

The second four bit CAPRO counter 393 is held reset via its master reset input MR/ being held low by the signal received from junction 383 of the start logic circuitry of FIG. 10 which is supplied to the MR/ input via lead 421. When the 1664 pulse from the presettable binary counter 309 of the block diagram of FIG. 9 resets the start flip-flop 333 of FIG. 10, a high appears at node 379 and is transmitted via lead 381 to junction 383 and thence via lead 421 to the master reset input of the second CAPRO counter 393. When this high signal reaches the MR/ input of the second CAPRO counter 393, the "0" from the $Q_3$ output enables the parallel enable input PE/ and the count of 0101 which is present on the $P_0 - P_3$ inputs respectively is preset into the counter 393 upon the arrival of the next TJKP/ clock pulse. When the terminal count pulse TC from the first CAPRO counter chip 391 arrives at node 413 as previously described, the CEP and CET inputs of the second counter 393 are enabled allowing the next clock pulse TJKP/ to count up the counter 393 to a count of 1101.

Each succeeding LINEGEN pulse will increment the second CAPRO counter 393 a shown by inputs $Q_0 - Q_3$ respectively, as follows: 0011, 1011, 0111, and 1111. When all of the outputs $Q_0 - Q_3$ are 1's, the terminal count output TC will go high and a "1" will be provided to node 431. The next clock pulse TJKP/ will reset the outputs $Q_0 - Q_3$ and the resetting of output $Q_3$ to "0" will cause a low signal to be transmitted via lead 423 back to the parallel enable input PE/ allowing the second counter 393 to be preset to its initial count of 0101 so that it will again await the next terminal count pulse from the first CAPRO counter chip 391 before repeating the above recited steps.

The third CAPRO counter chip 395 (CCC3) is basically a Mod 4 counter and may be initially preset to one of two initial counts depending on the state of the signals CRHS/. When CRHS/ is low, indicating that high speed operation is desired, the first CAPRO pulse will occur after the first 12 LINEGEN pulses have been counted. To accomplish this the third CAPRO counter chip 395 is initially preset to a count of 0100. Recall that the start flip-flop 333 of the circuit of FIG. 10 is set while the presettable binary counter 309 of the block diagram of FIG. 9 is counting 1664 clock pulses. The high from the "Q" output of start flip-flop 333 is taken from node 371 and transmitted via lead 375 to junction 377. Junction 377 is connected via lead 445 to the input of NAND gate 447 and thence via lead 449, node 451 and lead 455 to the parallel enable input PE/ of the third CAPRO counter 395. The high which is present at junction 377 is inverted in NAND gate 447 so as to enable the PE/ input of the third CAPRO counter. If CRHS/ is low, indicating that a high speed operation is desired, a signal from the output gating circuitry of FIG. 12, to be hereinafter described, will be transmitted to junction 483 and thence via lead 485 to the input of a NAND gate 481 which will invert this signal and transmit it via lead 479 to the $P_2$ parallel preset input of the third CAPRO counter 395. The state of $P_0$, $P_1$ and $P_3$ are unknown at this time and may be either high or low. The first clock pulse TJKP/ will operate to preset the third counter 395 to XXOX where X represents an unknown number either high or low. The "0" from the $Q_2$ output is applied to the $P_0$ and $P_3$ preset inputs and since PE/ is still enabled, the next TJKP/ clock pulse will operate to preset the third counter 395 to 0×00. $Q_3$ now contains an "0" and this signal is inverted in NAND gate 475 and sent back to parallel preset input $P_1$. Since the preset enable input PE/ is still enabled, the next TJKP/ clock pulse will preset the third counter 395 to a count of 0100 and since the preset enable input PE/ remains enabled, subsequent clock pulses will continue to reset the counter to the same 0100 count on each successive clock pulse.

After the presettable binary counter 309 of the block diagram of FIG. 9 has counted 1664 clock pulses, the start flip-flop 333 of the circuit of FIG. 10 is reset. The low signal which is present at junction 377 is inverted by NAND gate 447 and the presence of a high at the preset enable input PE/ of the third CAPRO counter 395 will disable the parallel preset. At the same time, the master reset input MR/ of the second CAPRO counter stage 393 receives a high from junction 383 and enables the second CAPRO counter 393 to count LINEGEN pulses. After the first six LINEGEN pulses, the terminal count pulse TC from the second CAPRO counter chip 393 will go high and via node 431 will enable the CEP and CET inputs of the third CAPRO counter 395, and count the third CAPRO counter stage to a count of 1100. The next terminal count TC at node 431 or the output of the second CAPRO counter stage 393 will occur after 12 LINEGEN increments and will change the count of the third CAPRO counter to 0010. Since the $Q_2$ output is now high and the CAPRO output gate is enabled by CRHS/ being low, the hereinafter described in the output gating circuit of FIG. 12, the CAPRO signal is generated at the output of the gating circuit of FIG. 12. The high from the $Q_2$ output of the third counter 395 is applied to preset inputs $P_0$ and $P_3$ and to one input of NAND gate 437. After the next six LINEGEN pulses, the terminal count TC of the second stage of the CAPRO counter 393 will again go high and when this high is presented to the other input of NAND gate 437, its output goes low so as to enable the parallel enable input PE/ of the third CAPRO counter 395 such that the next clock pulse will preset the third CAPRO counter 395 with a count of 1101. The next terminal count TC which goes high will occur after six more LINEGEN pulses and will cause the generation of the CAPRO pulse by incrementing the count of the third CAPRO counter chip 395 to 0011. Again, the $Q_2$ output is high such that the next terminal count TC received from the output of the second CAPRO counter chip 393 will preset the third CAPRO counter stage 395 to a count of 1001. It will now require three more terminal counts or 18 more LINEGEN pulses to generate the next CAPRO signal at which time 1001 is again preset into the counter and CAPRO continues to be generated at a rate of one CAPRO pulse for each 24 LINEGEN pulses.

Figure 12:
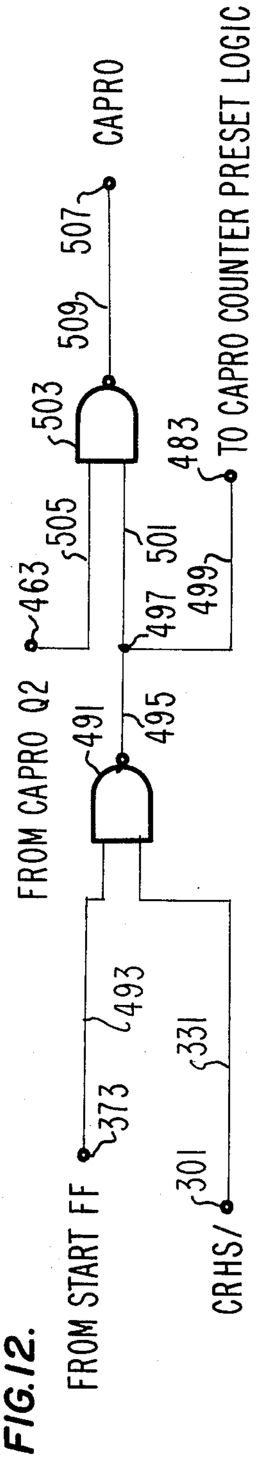
FIG. 12 is a schematic diagram of the output gating of block 313 of the block diagram of FIG. 9.

As mentioned previously, the third CAPRO counter chip 395, which is configured as a Mod 4 counter, may be initially preset to one of two predetermined counts depending upon the state of the CRHS/ signal which determines the speed at which the carriage is to move. If the CRHS/ signal is high, indicating that low speed operation is desired, the signal present at junction 483 which is received from the output gating circuitry of FIG. 12 is low and when this signal is inverted by NAND gate 481, a high is presented to the $P_2$ preset input. Since the PE/ input has been enabled by the signal received from the start flip-flop 333 via junction 377 as described hereinabove, the next TJKP/ clock pulse will preset the third CAPRO counter chip 395 with a count of XXIX. The CAPRO output gate of the output gating circuit of FIG. 12 which will be described hereinafter, is disabled until the start flip-flop 333 of the circuit of FIG. 10 is reset by the 1664 count which it receives at terminal 369 from the presettable binary counter 309 of the block diagram of FIG. 9. When the start flip-flop 333 receives the 1664 count signal it is reset and the first CAPRO pulse is generated. After the first CAPRO pulse is generated, the third CAPRO counter chip 395 is preset to 1001 via the preset logic associated with the third CAPRO counter stage 395 as described hereinabove. The preset count of 1001, which was described with respect to the high speed operation, will generate the CAPRO pulses at a rate of one CAPRO pulse for every 24 LINEGEN pulses. Hence, the further presetting and counting of the third CAPRO counter chip 395 would be the same for both high and low speed operation as has been previously described.

The output gating circuitry of FIG. 12 will now be described in detail. The CRHS/ input 301 of the block diagram of FIG. 9 is connected via lead 331 to one input of a NAND gate 491. The other input of NAND gate 491 is taken via lead 493 from the junction 373 of the start logic circuitry of FIG. 10. The output of NAND gate 491 is connected via lead 495 to node 497. Node 497 is connected via lead 499 to junction 483 of the CAPRO counter of FIG. 11. Node 497 is also connected via lead 501 to a first input of a NAND gate 503. The second input of NAND gate 503 is taken via lead 505 from junction 463 of the CAPRO counter of FIG. 11. The output of NAND gate 503 is supplied to the CAPRO output terminal 507 via lead 509.

As discussed with reference to FIGS. 10 and 11, when enabled, the output gating circuitry, and in particular NAND gate 503, will pass a negative going CAPRO pulse in response to the presence of a high at the input of NAND gate 503 which is supplied from junction 463 which corresponds to the $Q_2$ counter output of the third CAPRO counter chip 395. NAND gate 503 is disabled when the low is presented to the second input via lead 501 from node 497 which corresponds to the output of NAND gate 491. This low will be present whenever both inputs of NAND gate 491 are high and this occurs when the start flip-flop 333 is set and the CRHS/ signal is high. During high speed operation, the CRHS/ signal is low so that the output of NAND gate 491 is high thereby enabling the NAND gate 503 to pass the CAPRO pulses whenever the $Q_2$ output of the third CAPRO counter chip 395 goes high. During low speed operations, the CRHS/ signal at the input of NAND gate 491 will always be high hence the output of NAND gate 491 will go high as soon as the 1664 count from the presettable binary counter 309 of the block diagram of FIG. 9 is achieved and fed to the "K" input of JK start flip-flop 333. When the JK start flip-flop 333 is reset, the signal at junction 373 goes low and the output of NAND gate 491 goes high. When this high is applied to the input of NAND gate 503, it is enabled and the output gating will pass the negative going CAPRO signal to terminal 507 for each occurrence of a high at the $Q_2$ counter output of the third CAPRO counter chip 395.

Figure 13:
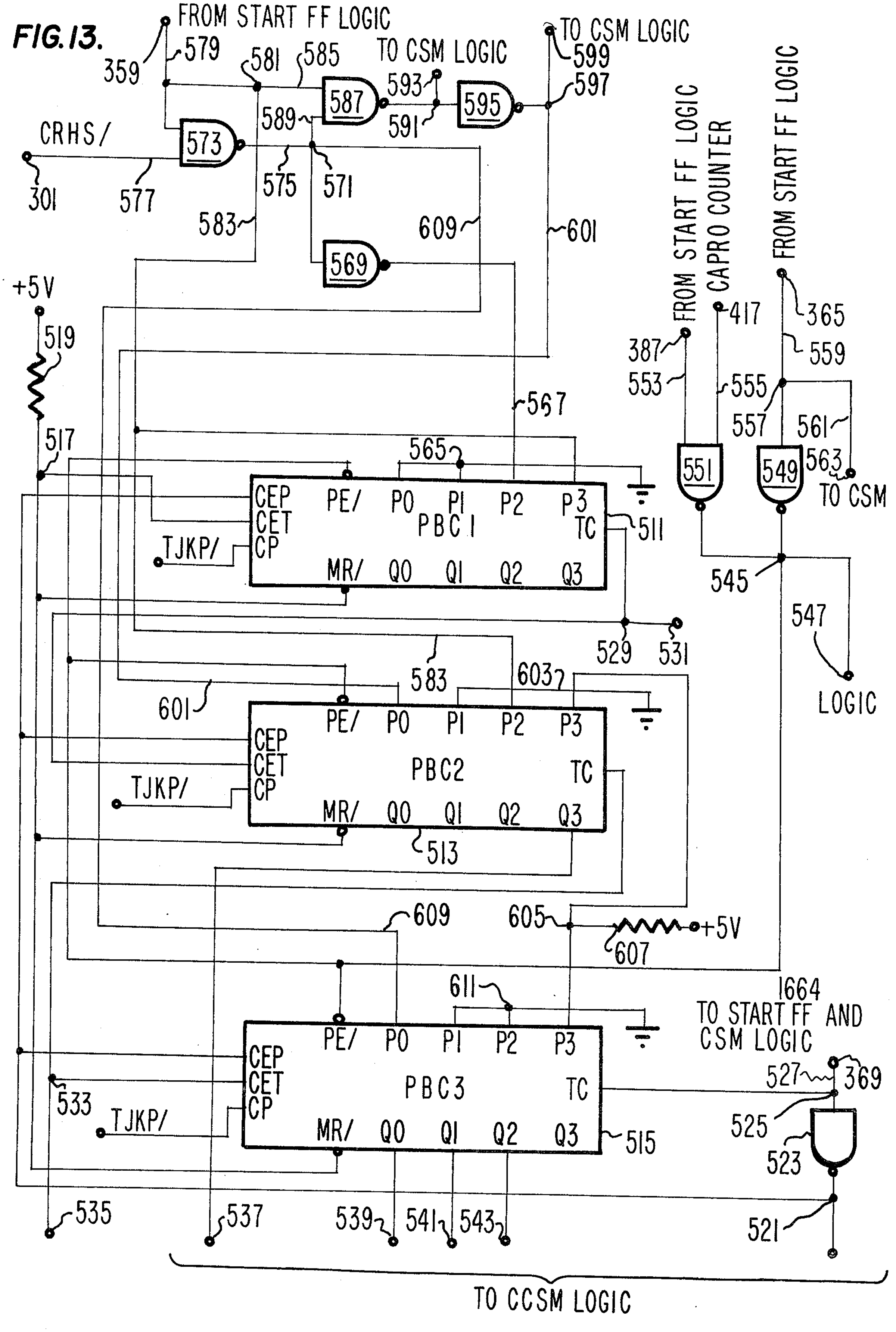
FIG. 13 is a schematic diagram of the presettable binary counter of block 309 of the block diagram of FIG. 9.

FIG. 13 illustrates in detail the presettable binary counter 309 of the block diagram of FIG. 9. The presettable binary counter of FIG. 13 has two basic functions. First, it operates to delay the generation of the CAPRO signal until the carrier motor is sufficiently up to speed from a dead stop. This insures that the character position counter CPC of the carrier state machine CSM 79 of the block diagram of FIG. 3 will be accurately decremented to zero which is the desired carrier stop destination. When the carrier motor begins moving, the presettable binary counter will count 1664 clock pulses (which takes approximately 5 milliseconds) after which the start flip-flop 333 of FIG. 10 will be reset so as to enable the output gating circuit of FIG. 12 to pass the CAPRO signals.

Secondly, the presettable binary counter of FIG. 13 is used for detecting carrier velocity errors. This is accomplished by counting clock pulses which occur between successive LINEGEN pulses. The specific count or lack of count in the third stage of the presettable binary counter will determine whether or not a carrier velocity error has occurred. Since the function of the third stage of the presettable binary counter is so interwoven with the carrier control state machine 315 of FIG. 9, which is described in detail in FIG. 14, it will be described in connection therewith.

The presettable binary counter of FIG. 13 comprises three four bit counter chips which are commercially available off-the-shelf items as previously discussed with reference to the CAPRO counter of FIG. 11. The first presettable binary counter chip 511 is designated PBCl; the second presettable binary counter chip 513 is designated PBC2; and the third presettable binary counter chip 515 is designated PBC3. Each of these chips has presettable inputs $P_0 - P_3$ which are used in conjunction with the carrier control state machine CCSM to be discussed with reference to FIG. 14, and the start flip-flop circuitry of FIG. 10. The presettable binary counter will be preset and allowed to count 1664 clock pulses before allowing CAPRO pulses to be counted. This prevents the generation of CAPRO signals until the carrier motor is actually moving. The presettable binary counter of FIG. 13 and its associated preset gating will now be described.

Each of the master reset inputs MR/ of presettable binary counters 511, 513 and 515 are connected to common node 517. Node 517 is connected directly to the CET input of presettable binary counter 511 and through a resistor 519 to a +5 volt source of potential. Each of the clock pulse or CP inputs of presettable binary counters 511, 513 and 515 are connected to a source of clock pulses TJKP/ and the CEP inputs of each of the counters are commonly connected to node 521. Node 521 is the output of NAND gate 523 and serves as an input to the carrier control state machine CCSM of FIG. 14 as discussed hereinafter. The input of NAND gate 523 is taken from node 525 which is connected to the terminal count or TC output of the presettable binary counter 515. The signal present at node 525 is also supplied via lead 527 to junction 369 of the circuit of FIG. 10 since it is at this node that the 1664 count is generated. The terminal count output TC of the first stage of presettable binary counter 511 is taken from node 529 and from there fed to the CET input of the second stage of the presettable binary counter 513 and to output terminal 531. The terminal count output TC of the second stage of the presettable binary counter 513 is taken from node 533 which feeds the terminal count pulse to the CET input of the third stage of the presettable binary counter 515 and to terminal output 535. The $Q_3$ output of the second stage of the presettable binary counter 513 is fed to terminal 537 while the $Q_0$, $Q_1$ and $Q_2$ outputs of the third stage of the presettable binary counter 515 are fed to terminal outputs 539, 541 and 543 respectively. Node 521 and output terminals 531, 535, 537, 539, 541 and 543 are supplied to the carrier control state machine CCSM of the circuit of FIG. 14 and their function will be described in association therewith.

The preset inputs of the presettable binary counters 511, 513 and 515 will now be discussed in detail. The parallel enable inputs PE/ of the presettable binary counters 511, 513 and 515 are commonly coupled to node 545. Node 545 is coupled directly to terminal output 547; to the output of NAND gate 549; and to the output of NAND gate 551. One input of NAND gate 551 is taken via lead 553 from output terminal 387 of the start logic circuit of FIG. 10. The second input to NAND gate 551 is taken from output terminal 417 of the CAPRO counter circuit of FIG. 11 and is supplied to the second input of NAND gate 551 via lead 555. The input of NAND gate 549 is taken from node 557 which is directly coupled via lead 559 to junction output 365 of the start logic circuit of FIG. 10. Node 557 is also coupled via lead 561 to junction output 563. Junction output 547 and 563 are coupled to the carrier control state machine CCSM and will be further described with reference to FIG. 14. The $P_0$ and $P_1$ parallel preset inputs of the first stage of the presettable binary counter 511 are coupled via node 565 directly to ground. The $P_2$ presettable input of the first stage of the presettable binary counter 511 is connected via lead 567 to the output of a NAND gate 569 whose input is connected to node 571. Node 571 is connected to the output of NAND gate 573 via lead 575. One input of NAND gate 573 is taken via lead 577 from the CRHS/ input 301 of the block diagram of FIG. 9 and the other input of NAND gate 573 is taken via lead 579 from junction terminal 359 of the start logic circuit of FIG. 10. Lead 579 also couples the terminal 359 to a node 581. Node 581 is connected via lead 583 to the $P_3$ presettable input of the first presettable binary counter 511 and to the $P_2$ presettable input of the second presettable binary counter 513. Node 581 is also connected via lead 585 to one input of a NAND gate 587 whose other input is taken via lead 589 from node 571. The output of NAND gate 587 is connected via node 591 to output terminal 593. Node 591 is also connected to the input of a NAND gate 595 whose output is connected to node 597. Node 597 is directly connected to output terminal 599 and via lead 601 to the $P_0$ presettable input of the second presettable binary counter 513. Output terminal 593 and 599 are connected to the carrier control state machine of FIG. 14 and will be further described in connection therewith. The $P_1$ presettable input of the second presettable binary counter 513 is directly coupled to ground via lead 603 and the $P_3$ presettable input of the second presettable binary counter 513 is commonly coupled with the $P_3$ presettable input to the third presettable binary counter 515 at node 605 which is then connected through resistor 607 to a +5 volt source of potential. The $P_0$ presettable input to the third stage of the presettable binary counter 515 is connected via lead 609 to node 571 and the $P_1$ and $P_2$ presettable inputs to the third presettable binary counter 515 are commonly coupled via node 611 directly to ground.

A very brief description of the operation of the presettable binary counter of FIG. 13 is as follows. During either a high speed or a low speed carrier movement from a stop condition, CR4A will go high and this signal will be applied to node 335 of the circuit of FIG. 10. Since the "$\overline{Q}$" output of JK flip-flop 331 was previously high, both inputs of NAND gate 339 will be high causing a low to appear at its output as reflected at terminal 359. The low signal at terminal 359 will be fed via lead 579, node 581, and lead 583 to the $P_3$ parallel preset input to the first presettable binary counter 511 and to the $P_2$ parallel preset input of the second presettable binary counter 513 causing zeros to be available at these inputs. Since the $P_0$ and $P_1$ inputs of the first presettable binary counter 511 and the $P_1$ input of the second presettable binary counter 513 are grounded, a zero will be present at these inputs as well. Furthermore, since a low is present at junction 359, a low will be present at one input of NAND gate 573 causing a high to appear at node 571. This high is inverted in NAND gate 569 and fed via lead 567 to the $P_2$ parallel preset input of the first presettable binary counter 511; hence the numbers 0000 are present at the parallel preset inputs $P_0$ through $P_3$ of the first presettable binary counter 511. The high which is present at node 571 is fed via lead 609 to the $P_0$ parallel preset input of the third presettable binary counter 515. The low which is present at junction 359 is also fed to one input of NAND gate 587 causing its output to go high and if this high is fed to NAND gate 595, it is inverted and appears as a low at node 597. This low is fed via lead 601 to the $P_0$ input of the second presettable binary counter 513, causing parallel preset inputs $P_0$, $P_1$, $P_2$ and $P_3$ to be presented with the numbers 0001 respectively. Since a high is present at the $P_0$ output and at the $P_3$ output of the third presettable binary counter 515, the numbers present at its inputs $P_0$ – $P_3$ are 1001 respectively. When the CR4A signal of the start circuit of FIG. 10 goes high, and a low is present at the output of NAND gate 339, a high will be present at the output of NAND gate 355 so that a high is present at the terminal 365. This high is inputted to NAND gate 549 so that a low is present at node 545. This low is used to enable the parallel enable inputs PE/ of each of the presettable binary counters 511, 513 and 515 so that upon the occurrence of the next TJKP/ clock pulse, the presettable binary counters 511, 513 and 515 will be preset with the counts 0000; 0001; and 1001 respectively. Upon the first clock pulse after CR4A goes high, JK flip-flop 331 of the start logic of FIG. 10 will be set causing a high to appear at node 545 to disable the PE/ inputs of the presettable binary counters. Since the CET input of the first presettable binary counter chip 511 is connected through resistor 519 to a +5 volt source of potential, it is permanently enabled and since the MR/ inputs of all of the three presettable binary counter chips are connected to the +5 volt source of potential via node 517, the master reset capability is permanently disabled. The CEP inputs of each of the presettable binary counters 511, 513 and 515 are enabled by a high which is presented to each of these inputs from node 521 at the output of NAND gate 523 since the 1664 output or node 525 is low. The presettable binary counter will now count 1664 clock pulses at which time the terminal count TC of the third presettable binary counter 515 will go high so as to generate the 1664 count at node 525. A high at node 525 will be inverted by NAND gate 523 and fed via node 521 to the CEP inputs of each of the three presettable binary counters 511, 513 and 515 so as to disable the CEP inputs of all three counters thereby preventing further counting. Simultaneously, the presence of a high at node 525, which indicates the 1664 count has been attained, will be fed via output junction 369 to the "K" input of JK start flip-flop 333 so that the start flip-flop 333 will be reset upon the occurrence of the next TJKP clock pulse.

The presettable binary counter of FIG. 13 remains disabled until the next LINEGEN pulse into the CAPRO counter generates a terminal count or TC pulse out of the first stage of the Mod 6 counter 391. When the terminal count is obtained, a high appears at junction 413 which is passed via lead 415 to terminal 417. When a high is present at terminal 417, a high is similarly present at terminal 387 of the start logic of FIG. 10 since the start flip-flop 333 has been reset by the arrival of the 1664 count pulse at terminal 369. When a high is present at both the input of terminal 387 and the input of terminal 417, the output of NAND gate 551 goes low and this low is reflected at node 545. When the start flip-flop 331 is reset, a high is present at junction 361 which is fed to terminal 365. This signal is inverted by NAND gate 549 so as to insure that the junction 545 remains low and since this low is supplied to the PE/ inputs of the presettable binary counters 511, 513 and 515, the parallel enable inputs are enabled and upon the arrival of the next TJKP/ clock pulse, the three counter states will be preset to the counts contained on the $P_0 - P_3$ inputs of the respective presettable binary counter stages and, as indicated above, the signals present at the $P_0 - P_3$ inputs at the various counter stages are determined by the states of CR4A and the CRHS/ signals respectively.

At the start of operation for either high or low speed, the CR4A signal is high and the CRHS/ signal is normally low. The stages of the three presettable binary counters 511, 513 515 will be preset to the respective counts 0000, 0001, and 1001. This corresponds to the decimal number 2432. For high speed operation, the CRHS/ signal is low thereby presetting the presettable binary counter stages 511, 513 and 517 with the respective counts 0001, 1011, and 1001. This corresponds to the decimal number 2520. For low speed operation the CRHS/ signal is high. This results with the presettable binary counters 511, 513 and 515 being preset with the values 0011, 0011, and 0001 respectively. This corresponds to the decimal number 2252.

As is readily seen, when 1663 pulses have been counted after the counters have been preset to 2432, the total on the presettable binary counter has been counted up to 4095 which corresponds to all ones in each of the stages of the presettable binary counters, thereby causing a high to be outputted from the terminal count output TC of the third presettable binary counter stage 515. This high is passed to node 525 and is referred to as the 1664 pulse as previously described. A further description of the presettable binary counter of FIG. 13 as it relates to the detection of carrier velocity errors will be discussed with reference to FIG. 14.

The carrier control state machine 315 of the block diagram of FIG. 9 will now be described in detail with reference to FIG. 14. The carrier control state machine CCSM of the present invention comprises two four bit counter chips and associated gating circuitry. The key element of the carrier control state machine is the first carrier control state machine counter 621 also designated CCSMC1. The carrier control state machine also includes a second carrier control state machine counter 623 which is designated CCSMC2 and also referred to as latching counter 623. The state of the outputs $Q_0 - Q_3$ of the first carrier control state machine counter 621 determines the specific state of the carrier. There are seven distinct states possible and these are given as indicated in Table II below.

TABLE II

| | $Q_0$ | $Q_1$ | $Q_2$ | $Q_3$ |
|---|---|---|---|---|
| STOP STATE (Before 1664) | 0 | 0 | 0 | 0 |
| START STATE (After 1664) | 0 | 0 | 0 | 0 |
| 33 IPS STATE | 0 | 0 | 0 | 0 |
| TRANSITION STATE | 1 | 0 | 0 | 0 |
| SQUIRT STATE | 0 | 1 | 0 | 0 |
| 4.5 IPS STATE | 0 | 0 | 1 | 0 |
| BUMP STATE | 0 | 0 | 1 | 1 |

Figure 15:
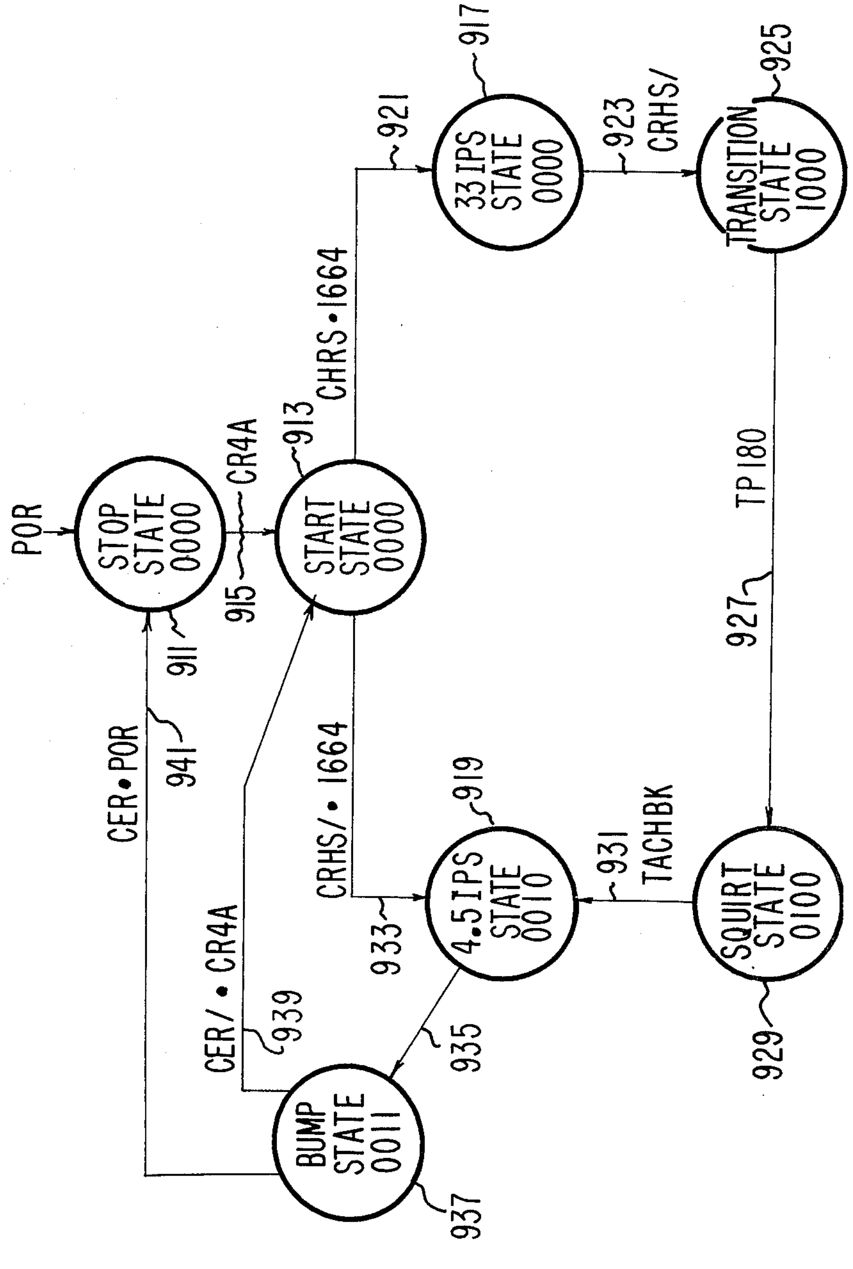
FIG. 15 is a state machine diagram illustrating the operation of the state machine of FIG. 14.

A graphic representation of the carrier control state machine is shown in FIG. 15 and should be referred to during the description of each state. Briefly, the carrier control state machine diagram of FIG. 15 may be described as follows.

Each circle on the diagram represents one of the seven states mentioned above in Table II and the designation of the state is contained therein and, in addition, each of the four numbers which is representative of the $Q_0 - Q_3$ output count of the carrier control state machine counter 621 is also given within the circle. The arrowed lines connecting the circle show the direction of transition from one state to another and the conditions under which these transitions occur.

The STOP STATE which is represented by circle 911 is an initialized state which is entered by POR when the machine is initially turned on or when a carrier velocity error has occurred. The carrier is completely stopped. Assuming we wish to enter the START STATE, which is represented by the circle 913, we must follow transition path 915 which requires that the CR4A signal goes high. When the CR4A signal goes high, the start flip-flop 333 of the circuit of FIG. 10 is set and the carrier motor begins to drive in the direction specified by CRGL/ or CRGR/ being low. The presettable binary counter of FIG. 13 is preset and begins to count clock pulses. After 1664 clock pulses have been counted, the 1664 signal resets the start flip-flop and enables the CAPRO counter of FIG. 11. These are two exits from the start state 913; either the high speed 33 IPS STATE as represented by circle 917, or the low speed 4.5 IPS STATE as indicated by the circle 919. If it is desired to make the transition to the high speed state from the start state, the path 921 must be followed and this requires that the CRHS signal and the 1664 signal simultaneously occur. The character position control counter CPC of the carrier state machine CSM 79 of the block diagram of FIG. 3 is set to something greater than five, indicating the number of positions which the carrier is to move. As the carrier moves at high speed, the character position counter is decremented by the CAPRO counter until the character position counter has been decremented to five. When the CPC counter has been decremented to five, CRHS/ goes high, as indicated by path 923 and the TRANSITION STATE as represented by circle 925 is entered. With the CPC counter set to five, and the CRHS/ signal high, the TRANSITION STATE causes the direction of the carrier motor current to be reversed to slow the carrier down to its low speed of 4.5 ips. The carrier motor itself does not reverse direction since the signal CRLT/ does not change but continues to move in the direction of its destination with a high reverse current operating to brake its speed. When the carrier speed is sufficiently close to 4.5 ips, such that further braking with high reverse current would cause the motor to reverse direction, a signal count designated TP180 goes high causing the TRANSITION STATE 925 to be exited via transition path 927 which causes entry into the SQUIRT STATE as indicated by the circle designated 929. The SQUIRT STATE maintains the reverse current on the carrier motor but switches the level of current to a much lower value. The low current is applied until the motor speed goes slightly below 4.5 ips. This condition will generate the TACHBK signal which advances the state machine via path 931 to the low speed 4.5 IPS STATE as indicated by the circle labeled 919. This is the low speed state and has two possible entrances. If the carrier had entered the 33 IPS STATE from the start state, the 4.5 IPS STATE would be entered by the TACHBK signal going high while in the SQUIRT STATE, but if the CRHS/ signal is high during the START STATE, the 4.5 IPS STATE would be entered directly from the START STATE after the 1664 count via transition path 933. This occurs whenever the number of carrier positions the carrier is to move is less than or equal to five causing CRHS/ to be high. As soon as the carrier motor stops moving after being in the 4.5 IPS STATE, a transition via path 935 will put the carrier control state machine into the BUMP STATE which is represented by the circle 937. The BUMP STATE will be entered when the carrier has reached its stop destination and this is signaled by the character position counter CPC of the carrier state machine CSM 79 of the block diagram of FIG. 3 having been decremented to zero. The BUMP STATE will also be entered when a carrier velocity error is detected in the 4.5 IPS STATE. In this case the carrier stops and since the carrier position counter is not yet equal to zero (CPC>0), the carrier error flip-flop (CERFF) is set so as to flag the error condition to the processor. In either case, the CCSM state machine remains in the BUMP STATE 937 until the next carrier movement command CR4A causes the start flip-flop 333 to set, thereby resetting the CCSM state machine to the START STATE 913 via transition path 939 if CER is high; or causing the CCSM state machine to enter the STOP STATE 911 via transition path 941 should the CER flip-flop be set and the POR signal present.

The circuit of FIG. 14 will now be described with reference to particular states of the state machine diagram of FIG. 15. As mentioned in the description of the CCSM state machine diagram of FIG. 15, a signal referred to as TP180 or the 180 count signal must be generated in order to exit the TRANSITION STATE 925 and enter the SQUIRT STATE 929. The logic necessary to generate the TP180 pulse will be described below with reference to the circuit of FIG. 14. The 180 count signal is labeled TP180 and appears at output node 620 of a logic circuit comprising NAND gates 622, 625, 627 and 629 respectively. One input of NAND gate 622 is supplied via lead 631 from junction 537 to the circuit of FIG. 13 and represents the $Q_3$ output of the second presettable binary counter 513. The second input of NAND gate 622 is supplied via lead 633 from junction 539 of the circuit of FIG. 13 which represents the $Q_0$ output of the third presettable binary counter 515. The output of NAND gate 623 is supplied via lead 635 to the input of NAND gate 625 whose output is supplied via lead 637 to one input of a NAND gate 627. The other input of NAND gate 627 is taken from lead 639 which is connected to the $Q_1$ output of the latching counter 623 which was preset with the $Q_0$ output of the first carrier state machine counter 621 on the previous clock pulse indicating that the CCSM is currently in the TRANSITION STATE. The output of NAND gate 627 is connected via lead 647 to the input of NAND gate 629 whose output at node 621 generates the TP180 count pulse. The TP180 count pulse is used by the carrier control state machine when the carrier motor is decelerated from the high speed state of 33 ips to the low speed state of 4.5 ips as demonstrated by the state diagram of FIG. 15. When the presettable binary counter of FIG. 13 is preset to 0011, 0011, 0001 as previously described as occurring when the CRHS/ signal is high, then the TP180 count will be generated 180 clock pulses after the counter has been so preset by CRHS/ going high and the PE/ input going low. The presettable binary counter will count the 180 clock pulses and on the 180th count the $Q_0$ output of the third presettable binary counter 515 will go high and since the high is then present at both of the inputs of NAND gate 622, a low will be presented at its output to the input of NAND gate 625 whose output will then present a high signal to one input of NAND gate 627. If the signal on lead 639 is high, indicating that the $Q_0$ output of the first carrier control state machine counter 621 is high (which indicates that the carrier control state machine is in the TRANSITION STATE) NAND gate 627 will produce a low at its output and this low will be transmitted to the input of NAND gate 629 whose output will then produce the positive pulse which we have labeled TP180, at node 620. This TP180 pulse is then fed via lead 649 to one input of the NAND gate 651 for further use by the carrier control state machine as hereinafter described.

A detailed description of the remaining portion of the circuitry of FIG. 14A and B will now be described. The first carrier control state machine counter 621 of the circuit of FIG. 14A will be discussed first. The MR/ input is connected via lead 653 to a node 655. Node 655 is connected via lead 657 to the CET input of CCSM state machine counter 621 and via lead 659 to junction 387 of the start logic of FIG. 10. A source of clock pulses TJKP is supplied to the CP input of the state machine counter 621 and the CEP input is supplied via lead 661 from the output of a NAND gate 663. The $Q_0$ output of the first control carrier state machine counter 621 is supplied via lead 645 to node 643 and a positive signal TRANSTP at this point indicates that the CCSM state machine is in the TRANSITION STATE. The $Q_1$ output of the first carrier control state machine counter 621 is connected via lead 665 to node 667 from which the SQUIRT output terminal 669 is taken. The $Q_2$ output of the first carrier control state machine counter 621 is fed via lead 671 to node 673 from which the signal TP4.5 IPS taken at terminal 675. The $Q_3$ output of the first carrier control state machine counter 621 is supplied via lead 677 to node 679 from which the signal BMPSTTP is taken at terminal 681. The parallel enable input PE/ to the first carrier control state machine counter 621 is taken from node 683 via lead 685. The $P_0$ and $P_1$ parallel preset inputs to the first CCSM counter 621 are directly coupled through node 687 to ground. The $P_2$ parallel preset input is coupled to a +5 volt source of potential through a resistor 689 and the $P_3$ parallel preset input is connected via lead 691 to node 693 from which the output signal ENTER BUMP is taken at terminal 695.

The CRHS/ input 301 of the block diagram of FIG. 9 is connected to junction 697 via lead 699. The junction 697 is connected to one input of a NAND gate 701 via lead 703. Node 697 is also connected via lead 705 to one input of a NAND gate 707. The output of NAND gate 701 is connected via lead 709 to a node 711 which is connected via lead 713 to node 683. Node 711 is also connected to the output of a NAND gate 715 via lead 717. The node 683 is connected to the output of a NAND gate 719 via lead 721. One input of NAND gate 719 is connected to node 693 via lead 723 and the other input to NAND gate 719 is connected to node 725 via lead 727. A first input of NAND gate 715 is connected via lead 729, node 817 and lead 819 to node 731 which serves as an output for the signal TACHBK which is supplied to output junction 733 via lead 732. The other input to NAND gate 715 is connected via lead 735 to node 737. The second input to NAND gate 701 is connected via lead 739 to node 741 which is coupled via lead 743 to the 1664 count terminal 369 of the circuit of FIG. 13. As mentioned previously, one input of NAND gate 707 is taken from junction 697 via lead 705 and the other input of NAND gate 707 is taken from node 745. The output of NAND gate 707 is supplied via node 747 to the input of NAND gate 663 and via lead 749, it is connected to the output of NAND gate 651. One input of NAND gate 651 is taken via lead 649 from the node 620 and represents the signal TP180 whereas the other input of NAND gate 651 is supplied via lead 751 from node 753. Node 753 is coupled via lead 755 to node 643 and via lead 757 to the input of a NAND gate 759 whose output is coupled via lead 761, node 763 and lead 765 to node 745. Node 763 is the output of a NAND gate 767 whose input is taken from node 737. Node 737 is connected via lead 769 to node 667 and via lead 735 to one input of NAND gate 71. Node 725 provides the input to a NAND gate 771 whose output is directly coupled to node 745. Node 725 is further connected to node 673 via lead 738.

In addition, node 741 is coupled via lead 773 to the input of a NAND gate 775 whose output is connected via lead 777 to node 693. Node 693 is coupled as previously mentioned via lead 691 to the $P_3$ preset input of the first carrier control state machine counter 621 and via lead 779 to the output of a NAND gate 781 whose input is coupled via lead 783 to node 785.

The second carrier control state machine counter or latching counter 623 of FIG. 14B will now be discussed in detail. A source of clock pulses TJKP is supplied to the CP input of latching counter 623, and both the CEP and the CET inputs are coupled via node 787 directly to ground. The MR/ input to latching counter 623 is coupled via lead 789 to node 791. Node 791 is coupled via lead 793 to the output of a NAND gate 795 whose input is taken via lead 797 from junction 377 of the start logic circuit of FIG. 10. Node 791 is also coupled via lead 799 to the output of a NAND gate 801 whose input is taken from node 679 via lead 803. Node 791 is further coupled via lead 805 to junction output 441 of the circuit of FIG. 11. The $Q_1$ output of the latching counter 623 is connected via lead 639 to one input of NAND gate 627 as previously described. Node 811 is connected via lead 809 to node 643 and provides an input via lead 813 to a NAND gate 815 whose output is taken from node 817. Node 817 is connected to node 731 via lead 819 and to one input of NAND gate 715 via lead 729 as previously discussed. Node 811 is also connected to node 821 via lead 823 and node 821 is used to provide the terminal output 825 for the signal TRANSTP and to provide the input to the $P_1$ parallel preset input of the latching counter 623 via lead 827. The $Q_2$ output of the latching counter 623 is fed via lead 829 to one input of a NAND gate 831, the other input of which is taken from the $Q_3$ output of the latching counter 623 via lead 833, node 835 and lead 837. The node 835 serves as the input to a NAND gate 839 whose output is taken from node 731 and feeds the TACHBK pulse to output terminal 733 via lead 732. The output of NAND gate 831 is fed to node 785 via lead 841. The parallel enable PE/ input of the latching counter 623 is taken via lead 843 from terminal 547 of the presettable binary counter circuit of FIG. 13.

The parallel preset input $P_2$ of the latching counter 623 is connected via lead 845 to the output of a NAND gate 847 whose input is connected via lead 849 to a node 851. Node 851 is connected via lead 633, as previously indicated, to one input of NAND gate 622 and via lead 853 to junction 539 of the presettable binary counter circuit of FIG. 13. Junction 539 is also coupled via lead 855 to one input of a NAND gate 857 and via lead 859 to one input of a NAND gate 861. The second input to NAND gate 857, the second input to NAND gate 861, and the sole input to NAND gate 863 is supplied via lead 865 from junction 543 of the presettable binary counter of FIG. 13. The output of NAND gate 857 is connected via lead 867 to node 869 which serves to provide the output signal LOWBMPT at output terminal 871 and which serves to provide the input to a NAND gate 873 via lead 875. The output of NAND gate 873 is supplied via lead 877 to one input of a NAND gate 879, the other input of which is supplied via lead 881 from the terminal 387 of the start logic circuit of FIG. 10. The output of NAND gate 879 is supplied via lead 883 to node 521 of the circuit of FIG. 13. The output of NAND gate 863 is connected via lead 885 to node 887 and thence via lead 889 to the $P_3$ parallel preset input of the latching counter 623. Node 887 is also connected via lead 891 to the output of a NAND gate 893 whose input is connected via lead 895 to the terminal 541 of the circuit of FIG. 13.

Figures 14, 14A:
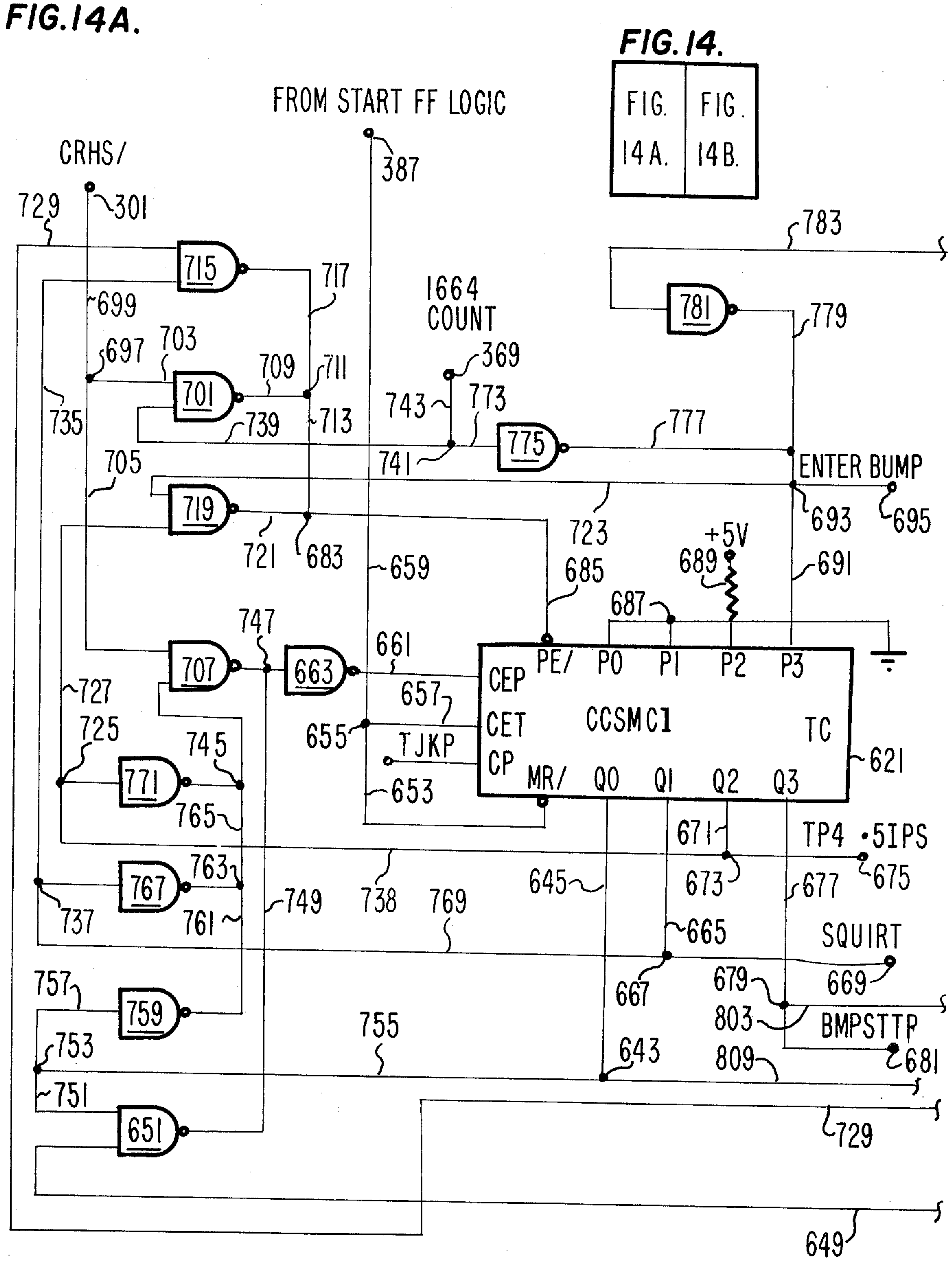
FIG. 14A and B is a schematic diagram of the carrier control state machine of block 315 of the block diagram of FIG. 9.
Figure 14B:
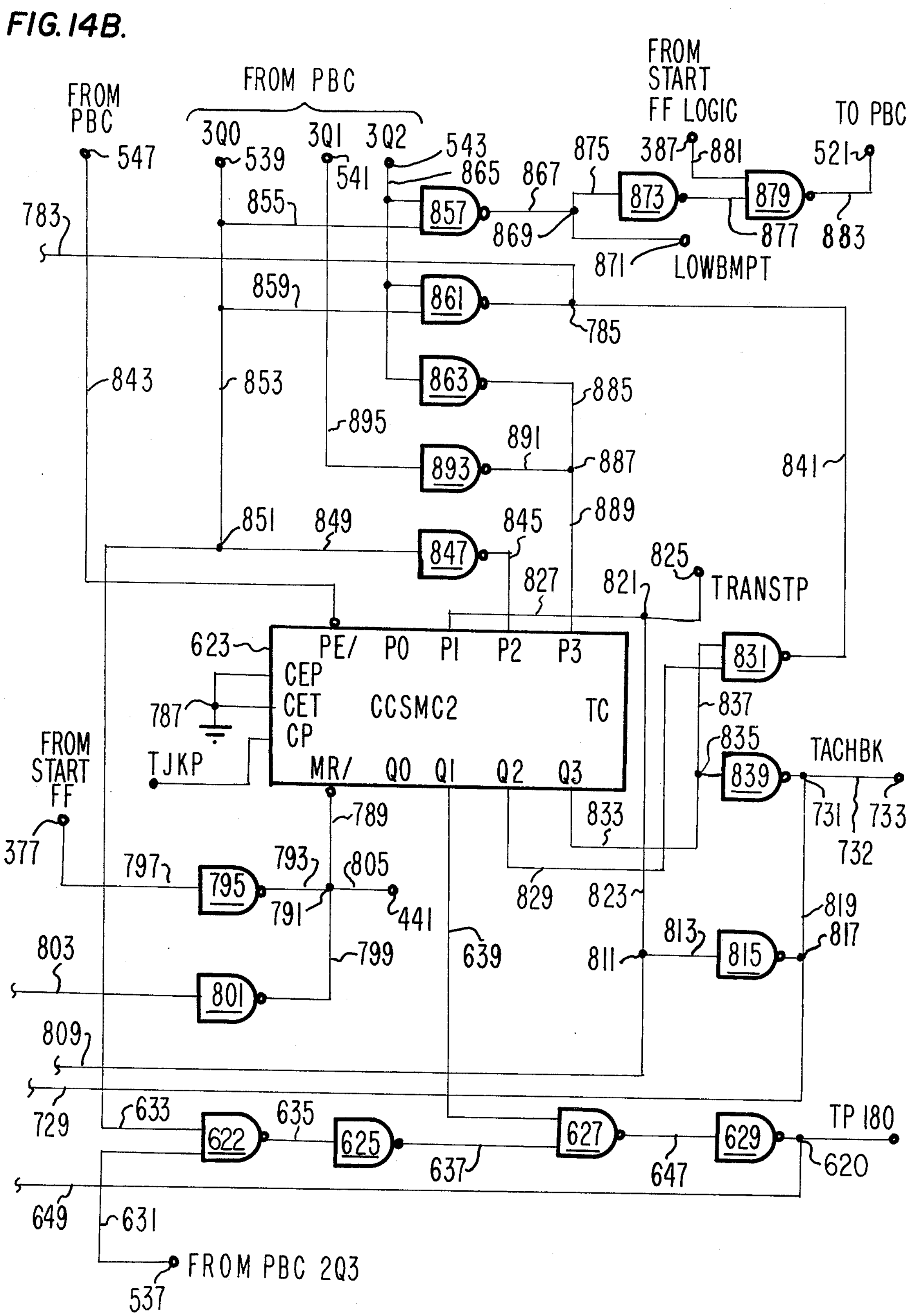

The operation of the circuit of FIG. 14 will now be briefly described in conjunction with the carrier control state machine diagram of FIG. 15 with reference to specific carrier states. The operation of the carrier control state machine of FIG. 14 will first be described with respect to the operation of the 33 IPS STATE. Carrier control state machine counter 621 is normally held reset to a count of 0000 by the presence of a low at the MR/ input which is taken from the reset output of start flip-flop 333 of he circuit of FIG. 10 via junction 387. After the presettable binary counter of FIG. 13 has obtained the 1664 count, start flip-flop 333 is reset, the "$\overline{Q}$" output goes high, and this high is transmitted via junction 387 and node 655 to the CET and the MR/ inputs of the first carrier control state machine counter 621. The first carrier control state machine counter 621 will, however, remain reset so long as the signal CRHS/ is low. The signal CRHS/ is gated by a terminal 301, lead 699, node 697 and lead 703, to one input of NAND gate 701. The other input of NAND gate 701 receives the 1664 count from terminal 369 and transmits this signal via lead 743, node 741, and lead 739 to the other input of NAND gate 701. Since the output of NAND gate 701 is coupled to the PE/ input of the first carrier control state machine counter 621 via lead 709, node 711, lead 713, node 683, and lead 685, the parallel enable input PE/ will be disabled until CRHS/ goes high and the 1664 count has been attained. But since the high speed operation is dictated by the fact that the signal CRHS/ is low, a high will appear at the PE/ input of the first carrier control state machine counter thereby preventing it from being preset. Since the $Q_0$, $Q_1$ and $Q_2$ outputs are fed back to NAND gates 759, 767 and 771 respectively and their outputs are commonly coupled to one input of NAND gate 707, the other input of which is taken from the CRHS/ signal, the output of NAND gate 707 will remain high as long as the CRHS/ signal is low. This forces the output of NAND gate 663 to be low thereby disabling the CEP input of the first carrier control state machine counter 621 and insuring that the carrier moves at the high speed of 33 ips in the direction specified by the carrier state machine logic of block 79 of FIG. 3 so long as the high speed commands CRHS/ remains low.

For the 4.5 IPS STATE to occur, the CRHS/ signal must be high when the 1664 count resets the start flip-flop 333. A reset of flip-flop 333 causes the "$\overline{Q}$" output to go high and this signal is fed via junction 387 to node 655 which applies the high to the CET and to the MR/ input of the first carrier control state machine counter 621 so as to enable these inputs and cause the counter to be reset. With the CRHS/ signal high, and the $Q_0$, $Q_1$ and $Q_2$ outputs of the first carrier control state machine counter being low, two highs will be present at the input of NAND gate 707 causing a low to appear at node 747 and a high to be transmitted from the output of NAND gate 663 to enable the CEP input of the first carrier control state machine counter 621. The presence of the high CRHS/ signal at the first input of NAND gate 701 concurrently with the presence of a high 1664 count at the other input will cause a low signal to be applied to the PE/ input of a first carrier control state machine counter 621 such that the next clock pulse TJKP will cause the first carrier control state machine counter 621 to be preset with a count of 0010. The high which is now present at the $Q_2$ output of the first carrier control state machine counter 621 will be transmitted via lead 671, node 673 and node 725 to the input of NAND gate 771 causing its output to go low. Since a low is now present at one input of NAND gate 707, the output of NAND gate 663 goes low so as to disable the CEP input of the first carrier control state machine counter 621. With the CEP input disabled, the CCSM state machine will remain in the 4.5 IPS STATE with the carrier driving at low speed in the direction specified by the carrier state machine logic of block 79 of FIG. 3.

The TRANSITION STATE is entered when the CHRS/ signal goes high while the state machine is in the 33 IPS STATE. As indicated above, in the TRANSITION STATE the $Q_0$ output of the first carrier control state machine counter 621 is low as is the $Q_1$ and $Q_2$ outputs, and the outputs of NAND gates 759, 767 and 771 are high so that one input of NAND gate 707 is high. When the CRHS/ signal goes high, the output of NAND gate 707 will go low so that a high is applied from the output of NAND gate 663 to the CEP input of the first carrier control state machine counter 621 thereby enabling the counter. The first clock pulse TJKP will cause the $Q_0$ output of the first counter 621 to go high thereby signalling entry into the TRANSITION STATE. The high from the $Q_0$ output is fed back to the input of NAND gate 759 and inverted so as to cause a low to appear at one input of NAND gate 707 thereby forcing a low at the CEP input so as to disable once more the carrier control state machine counter 621 insuring that the CCSM state machine remains in the TRANSITION STATE so that the carrier motor can make its transition from high speed to low speed operation as shown in the velocity profile diagram in FIG. 16.

Figure 16:
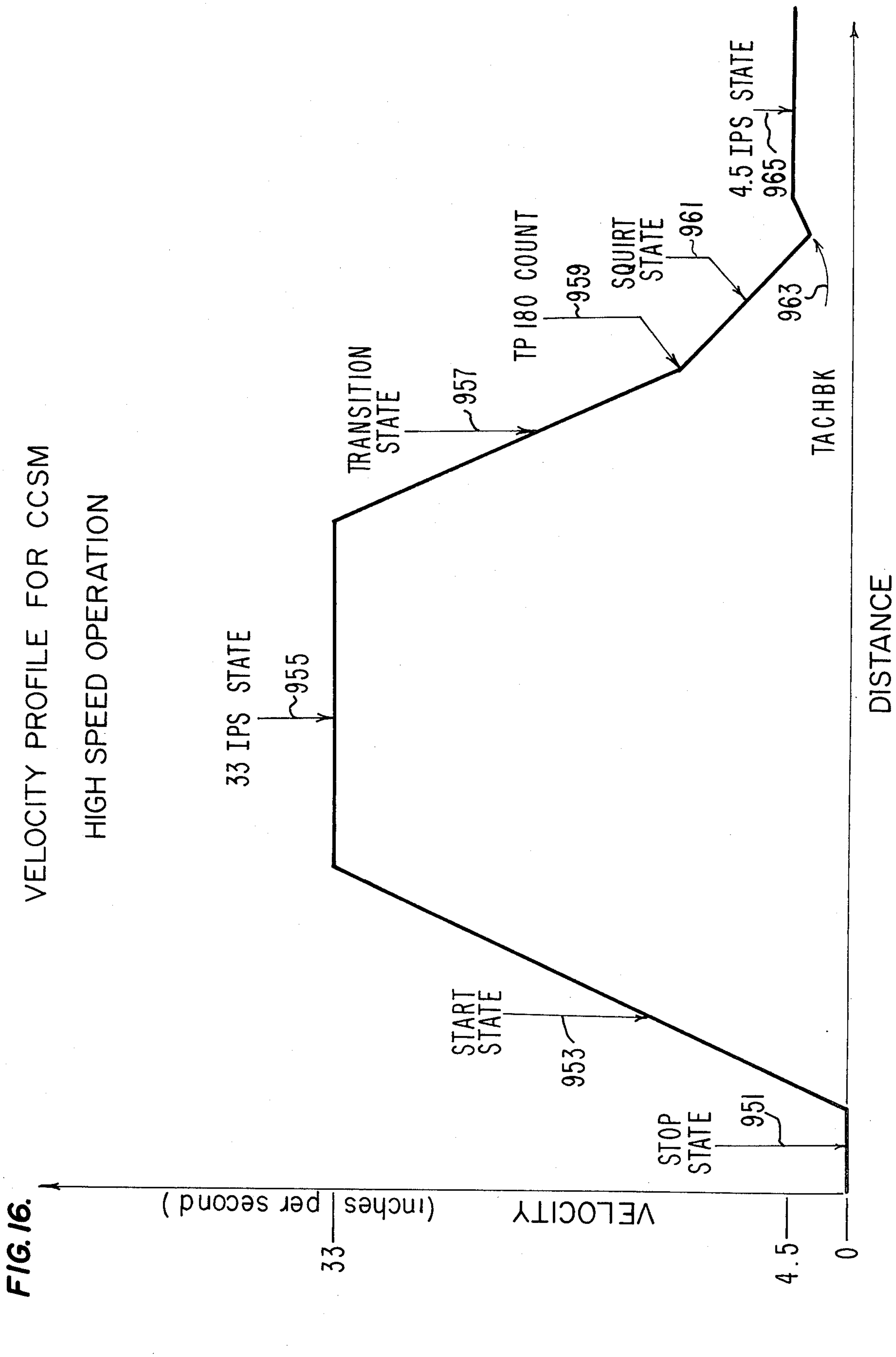
FIG. 16 is a velocity profile which illustrates the various states of the carrier control state machine of FIG. 14 for high speed operation.

The velocity profile for the carrier control state machine in high speed operation is shown in FIG. 16. It represents a plot of velocity in inches per second versus the distance the carrier must move to reach the desired destination. As indicated in the profile of FIG. 16, the state machine is originally in the STOP STATE as indicated by the heavy line pointed out by the arrow 951. Once the CR4A signal has gone high, the START STATE is entered and this is represented by the heavy black line pointed out by the arrow designated 953. The concurrence of the 1664 count with the CRHS signal being high insures that the 33 IPS STATE or high speed state is entered and this speed is indicated by the arrow labeled 955. When the 33 IPS STATE is exited, and the CRHS/ signal goes high, indicating that CPC<5, the TRANSITION STATE, pointed out by the arrow labeled 957 is entered and this state is maintained until the occurrence of the TP180 count as indicated by the arrow labeled 959. The CCSM state machine then enters the SQUIRT STATE which is pointed out by the arrow labeled 961 and upon the occurrence of the TACHBK pulse which occurs at the point indicated by the arrow 963, the CCSM state machine enters the 4.5 IPS STATE or the slow state as indicated by the arrow labeled 965.

The $Q_0$ output of the first carrier control state machine counter 621 is supplied via lead 645, node 643, lead 809, node 811, lead 823, node 821 and lead 827 to the $P_1$ parallel preset input of the second carrier control state machine counter 623 which serves as a latch. Since the CEP and CET inputs of the latching counter 623 are grounded, these inputs are permanently disabled so that the chip functions as a latch by clamping its outputs $Q_0 - Q_3$ to the state of the parallel inputs $P_0 - P_3$ when the parallel enable input PE/ goes low. The next LINEGEN pulse which is supplied to the CAPRO counter of FIG. 11 will cause the signal at node 545 of the circuit of FIG. 13 to go low thereby applying a low from junction 547 and lead 843 to the PE/ input of the latching counter 623. Upon the occurrence of the next clock pulse TJKP, the high which was present at the $Q_0$ output of the first carrier control state machine counter 621 and which represents the TRANSITION STATE signal, is preset into the latching counter 623 such that a one is present at the $Q_1$ output of the latching counter. This signal is applied to the TP180 count circuitry previously described and enables the first input of NAND gate 627 to go high. When the TP180 count pulse is received at the presettable binary counter of FIG. 13 via input terminals 537 and 539, NAND gate 622 will go low causing nand gate 625 to go high and since NAND gate 627 has been enabled by the presence of a high at its other input which is taken from the $Q_1$ output of the latching counter 623, the output of NAND gate 627 will go low causing a high to appear at the output of NAND gate 629 which represents the TP180 signal indicating that a count of 180 has expired.

The TP180 signal is used as one input to NAND gate 651 whose other input is taken from the $Q_0$ output of the first carrier control state machine counter 621. When the CCSM state machine is in the TRANSITION STATE and the TP180 count has been achieved, the output of NAND gate 651 will go low causing a high to appear at the output of NAND gate 663 so as to enable the CEP input of the first carrier control state machine counter 621. The arrival of the next TJKP clock pulse will increment the first carrier control state machine counter 621 by a single count so that the $Q_0 - Q_3$ outputs will contain the count 0100. The $Q_1$ output becomes high, indicating that the SQUIRT STATE has been entered and this high is fed back to the input of NAND gate 767 causing a low to appear at its output. This low causes the output of NAND gate 707 to go high which in turn causes the output of NAND gate 663 to go low thereby disabling the CEP input of the carrier control state machine counter 621 and insuring that the CCSM state machine remains in the SQUIRT STATE.

The CCSM state machine will remain in the SQUIRT STATE until the signal TACHBK is generated. TACHBK will go high when the speed control logic of the third PBC515 indicates that the carrier speed has been reduced to below 4.15 ips since PBC 515 was not reset by the next LINEGEN before its preset count was incremented. When the $Q_1$ and $Q_2$ outputs go high before being reset by the application of a low to the PE/ input of the third presettable binary counter 515, these signals are fed via terminals 541 and 543 to inverters 893 and 863 respectively where they cause a low to appear at the commonly coupled node 887, which is connected via lead 889 to the $P_3$ parallel preset input of the latching counter 623. Upon the occurrence of the next LINEGEN pulse, a low will be applied via terminal 547 and lead 843 to the PE/ input of the latching counter 623 such that the occurrence of the next clock pulse TJKP will cause the low present at node 887 to be preset into the $Q_3$ output. When $Q_3$ goes low, this low is transmitted to the input of NAND gate 839 causing its output to go high and the signal TACHBK to appear at terminal 733. With the TACHBK signal high and the $Q_1$ output of the first carrier control state machine counter 621 being high, indicating that we are in the SQUIRT STATE, both inputs to NAND gate 715 will be high causing its output to be low. This low is supplied to the PE/ input of the first carrier control state machine counter 621 so as to set the parallel enable. Upon the occurrence of the next clock pulse TJKP, the $P_0$ – $P_3$ inputs will preset the first carrier control state machine counter 621 to a count of 0010 and the presence of a high at the $Q_2$ output indicates that we are low in the 4.5 IPS STATE as indicated previously.

The BUMP STATE is the normal state which is entered into when the carrier has reached its normal stop position. The BUMP STATE may also be entered when a carrier velocity error occurs while in the 4.5 IPS STATE. The character position counter CPC in the carrier state machine CSM logic of block 79 of FIG. 3 determines whether or not an error has occurred. If the BUMP STATE is entered and CPC=0, the carrier has reached its designated stop position as specified by the carrier state machine logic of block 79 of FIG. 3. If the CPC counter is greater than zero (CPC>0) when the BUMP STATE is entered, an error has occurred in the carrier velocity. In this case the carrier error flip-flop (CERF) is set and the BUMP STATE is entered. The BUMP STATE is entered when the carrier control state machine counter 621 is set to a count of 0011. The third stage of the presettable binary counter 515 determines whether or not the carrier is moving at the proper speed. The presettable binary counter of FIG. 13 counts clock pulses between successive LINEGEN pulses and the repetition rate of the generation of LINEGEN pulses is directly proportional to the speed of the carrier. The specific count contained in the third stage 515 of the presettable binary counter of FIG. 13 will determine if the BUMP STATE will be entered upon the occurrence of the next LINEGEN pulse.

The logic function is as follows: The state machine is initially set to 0010 indicating that we are in the 4.5 IPS STATE. The presence of a high at the $Q_2$ output of the first CCSM counter 621 enables one input to NAND gate 719. The first LINEGEN pulse to occur after the 4.5 IPS STATE is entered is received from terminal 417 of the circuit of FIG. 13 and once the start flip-flop 333 is reset, a high is obtained from the terminal 387 so that both inputs to NAND gate 551 of the circuit of FIG. 13 are high causing a low to appear at node 545. This enables the parallel enable input PE/ of the third stage of the presettable binary counter 515 to be preset and, via terminal 547 and lead 843, enables the PE/ input of the latching counter 623 of the carrier control state machine to be enabled. This signal also enables the first and second presettable binary counters 511 and 513 to be preset. Upon the arrival of the next TJKP clock pulse, the presettable binary counters of FIG. 13 will be set with the count 0011, 0011, 0001 since th CRHS/ signal is high in the 4.5 IPS STATE. The PBC is enabled and will count clock pulses until the next LINEGEN pulse presets the presettable binary counters once again. The arrival of the second LINEGEN pulse, besides operating to preset the three stages of the presettable binary counter 515, will also operate to preset the four bit latching counter 623 to the state of its $P_2$ and $P_3$ inputs. The $P_2$ and $P_3$ inputs are connected to the $Q_0$, $Q_1$ and $Q_2$ outputs of the third stage of the presettable binary counter 515 via terminals 539, 541 and 543 respectively through NAND gate 847, 893 and 863 respectively. If the $Q_0$ – $Q_2$ outputs of the third stage of the presettable binary counter 515 have not been incremented but remain in the preset condition 0001 when the second LINEGEN pulse occurs, then the $P_2$ and $P_3$ inputs to the latching chip 623 are high and the latch is preset to a count of 0011. If the $Q_2$ and $Q_3$ outputs of the latching chip 623 are high. NAND gate 831 generates a low signal on lead 841 and this low is transmitted via junction 785 and lead 783 to inverter 781. Inverter 781 then passes a high to the $P_3$ presettable input to the first carrier control state machine counter 621. This high is similarly transmitted via node 693 and lead 723 to the second input of NAND gate 719 whose first input is high via lead 727 since the $Q_2$ output of the first carrier control counter 621 is high indicating that we are in the 4.5 IPS STATE. This causes a low to appear at the output of NAND gate 719 which will be applied via node 683 and lead 685 to the PE/ input of the first carrier control state machine counter 621 causing the counter to be preset with the count 0011 which indicates that the BUMP STATE has been entered. The $Q_3$ output of the first carrier control state machine 621 going high causes the output of NAND gate 801 to go low and this low signal is applied via lead 799, node 791 and lead 789 to the MR/ input of the four bit latch 623 causing the latch to reset to a count of 0000.

It will be observed that the BUMP STATE was entered in this case since too few clock pulses were counted between two adjacent LINEGEN pulses. While clock pulses occur at a fixed rate of one every three microseconds, the repetition rate of the LINEGEN pulses is directly proportional to the carrier motor speed. What has really occurred is that the carrier motor was moving a predetermined amount faster than 4.5 ips such that the second LINEGEN pulse was generated before the third stage of the presettable binary counter 515 could be incremented. This caused an overspeed velocity error which was detected by the logic described causing the BUMP STATE to be entered. When the BUMP STATE is entered, the carrier motor drive is turned off by the logic of FIG. 17 and it stops moving completely. At the same time since the BUMP STATE was entered due to a velocity error, the character position counter is not a zero (CPC ≠ 0) and this generates a signal CERF which causes the carrier error to be flagged to the processor. The predetermined amount by which the velocity is permitted to exceed the desired rate of 4.5 ips before an error is detected is controlled by the count at which the three presettable binary counters are preset. In the case of an overspeed error, the preset count is such that if the third PBC515 is not incremented before being preset by the next LINEGEN pulse, then the BUMP STATE is entered and an error is flagged.

The BUMP STATE may also be entered when the carrier moves at a speed which is a predetermined amount under 4.5 ips. In this instance, the third state of the presettable binary counter 515 will count an excess number of clock pulses as defined by the $Q_0$ and $Q_2$ outputs of the third presettable binary counter 515 before the arrival of the second LINEGEN pulse. When $Q_0$ and $Q_2$ both go high, indicating that our predetermined count indicative of an underspeed error has been attained, this condition will be reflected at terminals 539 and 543 and will cause the output of NAND gate 861 to go low. This signal is transmitted via lead 783 to NAND gate 781 where it is inverted and supplied as a high to the $P_3$ parallel preset input of the first carrier control state machine counter 621 and via lead 723 to the one input of NAND gate 719. As discussed above, the output of NAND gate 719 will cause a low to appear at the PE/ input of the first carrier control state machine counter 621 and cause the counter to be preset with the count 0011, once again indicating that the BUMP STATE has been entered. Since, in this case, the BUMP STATE was again entered before the character position counter was equal to zero (CPC ≠ 0), a carrier error CER is again flagged to the processor. There exists a range of speeds between the point at which an overspeed error is detected and the point at which an underspeed error is detected, and this range is given by the number of clock pulses counted between the case where PBC515 has not been incremented at all and the case where it has been incremented until its $Q_0$ and $Q_2$ outputs contain ones. Within this range the TACHBK signal is utilized as it is in the 33 IPS STATE to effectuate speed control as described hereafter.

The BUMP STATE will also be entered when the carrier reaches its designated stop position. The BUMP STATE logic functions the same as it did under a speed error condition. The third stage of the presettable binary counter 515 will continue counting clock pulses after the interposer solenoids have detented the lead screw on the carrier motor since the carrier is stopped and cannot produce another LINEGEN pulse to preset the third stage of the binary counter. The $Q_0$ and $Q_2$ outputs of the third stage of the presettable binary counter 515 will both eventually go high and preset the first carrier control state machine counter 621 to the BUMP STATE 0011 via NAND gate 861, 781 and 719. The CPC counter was decremented to zero when the carrier reached its stop position and since the condition CPC=0 exists when the BUMP STATE is entered, the CER flip-flop is not set and no error condition is flagged to the processor.

As indicated previously, with respect to the description of the operation of the present invention with reference to the velocity profile of FIG. 16, it is necessary that the direction of the drive currents to the motor be reversed when the TRANSITION STATE is entered and reversed again when the 4.5 IPS STATE is entered. This reversal is accomplished by reversing the state of the signals CRGL/ and CRGR/ which are used as inputs to the circuit of FIGS. 6A and B. Since these signals are decoded by the solenoid driver circuit of FIG. 5 from the signals RETDR and FWDDR respectively, the change in direction is actually accomplished by changing the state of the latter two signals.

Figure 17:
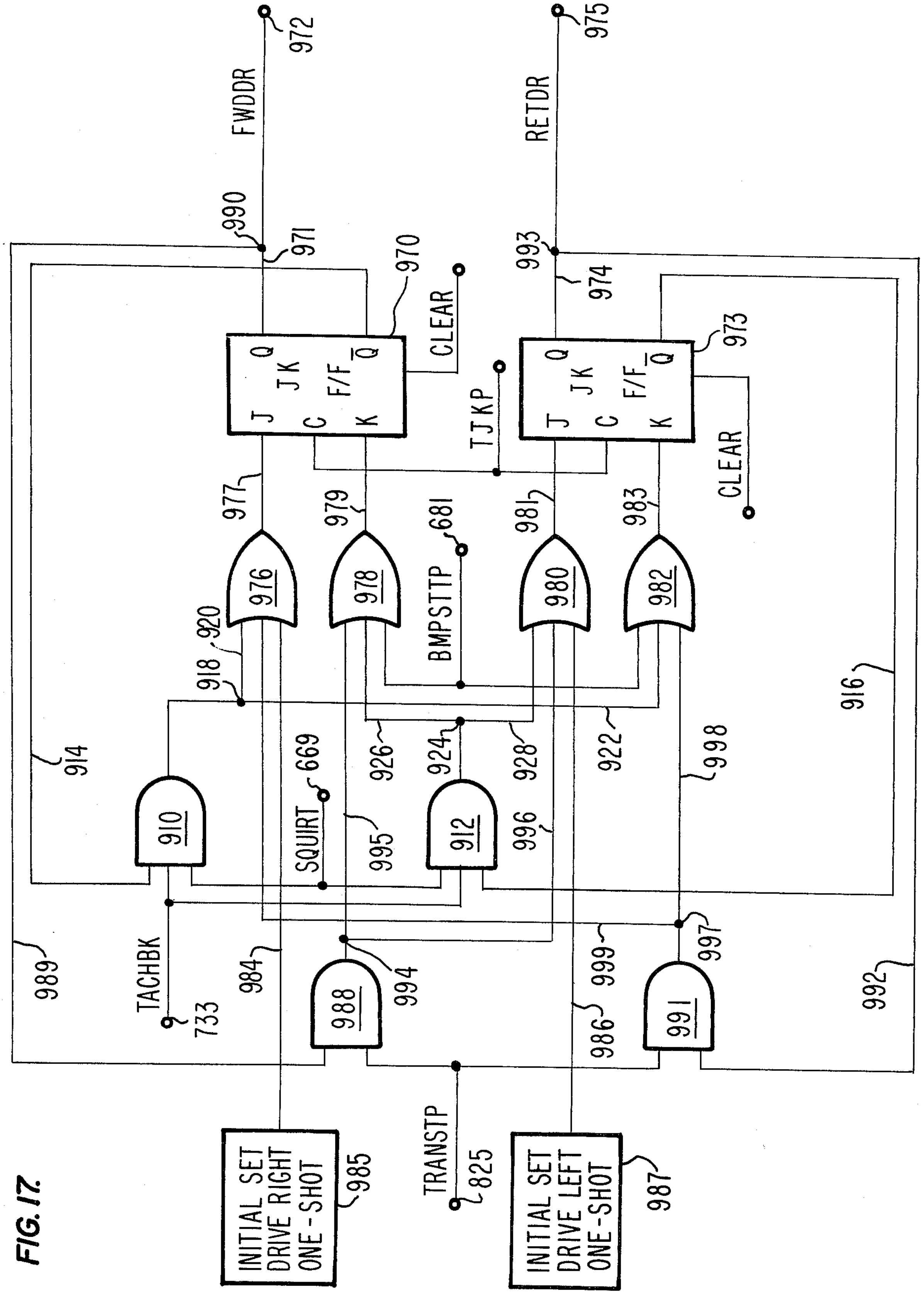
FIG. 17 is a schematic diagram of a portion of the carrier state machine logic of block 79 of the system of FIG. 3 which is used to generate signals which control the direction of current through the carrier drive motor.

The circuit of FIG. 17 accomplishes this reversal and may be described as follows. A first JK flip-flop 970 has its "Q" output connected via lead 971 to a terminal output 972 from whence the signal FWDDR may be provided to the solenoid driver circuits of FIG. 5. A second JK flip-flop 873 has its "Q" output provided via lead 974 to terminal output 975 which supplies the signal RETDR to the solenoid driver circuit of FIG. 5. The clock pulses TJKP are supplied to the clock inputs of both of the JK flip-flops and means for initially clearing the flip-flops to the reset state is provided. The "J" input of JK flip-flop 970 is taken from OR gate 976 via lead 977. The "K" input of JK flip-flop 970 is taken from the output of OR gate 978 via lead 979. Similarly, the "J" input of JK flip-flop 973 is taken from the output of OR gate 980 via lead 981, and the "K" input of JK flip-flop 973 is taken from the output of OR gate 982 via lead 983. Each of these OR gates has three inputs which may be described as follows. A first input to OR gate 976 is supplied via lead 984 from a one-shot multivibrator 985 or the like. The one-shot is used to initially set the drive right condition and may be configured, as known in the art, such that an input command signal indicating that the motor should be driven to the right, will cause a high to be outputted from the one-shot and transmitted via lead 984 to OR gate 976. Similarly, a first input to OR gate 980 is provided via lead 986 from a one-shot multivibrator 987. The one-shot multivibrator 987 is used to initially set a drive left condition when required by the input instructions. The other inputs of the four OR gates are taken from the output of a set of four AND gates as hereinafter described.

A first AND gate 988 has one input connected to the "Q" output of JK flip-flop 970 via lead 989, node 990, and lead 971. The second input of AND gate 988 is supplied with the signal TRANSTP from junction node 825 of the circuit of FIG. 14B. The signal TRANSTP is also supplied to a first input of an AND gate 991 whose second input is connected to the "Q" output of JK flip-fop 973 via lead 992, node 993 and lead 974. The output of AND gate 988 is taken from node 994 and is supplied via lead 995 to a first input of OR gate 978 and via lead 996 to a second input of OR gate 980. The output of AND gate 991 is taken from node 997 and is supplied via lead 998 to a first input of OR gate 982 and via lead 999 to a second input of OR gate 976. The third and fourth AND gates 910 and 912 respectively each have one input which receives the signal SQUIRT from output node 669 of the circuit of FIG. 14A and each has a second input which receives the signal TACHBK from the terminal node 733 of the circuit of FIG. 14B. The third input of AND gate 910 is taken from the "$\overline{Q}$" output of JK flip-flop 970 via lead 914 and the third input to AND gate 912 is taken from the "$\overline{Q}$" output of JK flip-flop 973 via lead 916. The output of AND gate 910 is taken from node 918 and is supplied via lead 920 to the third input of OR gate 976 and via lead 922 to the second input of OR gate 982. The output of AND gate 912 is taken from node 924 and is supplied via lead 926 to the second input of OR gate 978 and via lead 928 to the third input of OR gate 980. The third input of OR gate 978 and of OR gate 982 is supplied with the signal BMPSTTP which is taken from output node 681 of the circuit of FIG. 14A.

The operation of the circuit of 17 will be described in conjunction with the description of the overall operation of the system assuming that the input instructions require that the carriage be driven to the right and that the stop destination is more than five character positions from the present position requiring that we begin with the stop state and go through all of the states of FIG. 15 in accordance with the velocity profile given in FIG. 16. This operative description will be made with reference to FIGS. 5, 6, 10, 11, 13, 14 and 17.

Assume initially that the input instructions require the carrier be positioned to the right of its present location and to a printing position which is more than five character positions from its present location. In this event, the carrier must move from its stop position to the new print destination and in the process, traverse all of the states of the stage diagram of FIG. 15. Since it is to actually move to the right, the carrier state machine logic of block 79 of FIG. 3 will generate a move right signal which is decoded by the solenoid drivers of FIG. 5 such that the signal CRLT/ goes high. A high CRLT/ signal is therefore inputted to NAND gate 117 and to one input of NAND gate 155 of the circuit of FIG. 6. In order to move to the right, the motor must be driven for right drive and this is accomplished when the carrier state machine logic of block 79 of FIG. 3, and more particularly the circuit of FIG. 17, passes the signal FWDDR to the solenoid drivers of FIG. 5. The initial instruction data will cause the initial set drive right one-shot multivibrator 985 to pass a high on lead 984 to one input of OR gate 976. The OR gate 976 will gate this high to the "J" input of JK flip-flop 970 via lead 977 and upon the occurrence of the next TJKP clock pulse, JK flip-flop 970 will be set and a high will be present at the "Q" output. This high will be transferred via lead 971, node 990 and output terminal 972 to the solenoid driver circuit of FIG. 5 where it will be decoded to cause the signal CRGR/ to go low. It is readily seen that since the initial instructions did not cause the drive left signal to be generated by the one-shot multivibrator 987 and since neither the signal TRANSTP nor the signal SQUIRT are high, since we ae initially in the stop state, the output of AND gate 912 and AND gate 988 will be low, causing the output of OR gate 980 to be low, thereby insuring the JK flip-flop 973 remains in the clear position such that the signal RETDR at output 975 remains low. This signal is decoded by the solenoid drivers of FIG. 5 as well with the result that the signal CRGL/ is high. The high CRGL/ signal is inverted by NAND gate 13, causing a low to appear at node 123 (FIG. 6A). The low at node 123 is inverted by NAND gate 127 and causes a high to be applied to the input of NAND gate 137 (FIG. 6B). This insures that the signal CRDLAA remains low thereby preventing current from driving the motor to the left. Simultaneously, the low CRGR/ signal is inverted by NAND gate 165 and applied as a high to one input of NAND gate 159. Since the carrier system enters the START STATE as soon as the CR4A signal goes high so as to provide the necessary current for starting the motor, JK flip-flop 333 (FIG. 10) will be set causing a high to appear at output 377 and a low to be applied to the MR/ input of latching counter 623 (FIG. 14B). This insures that all of the outputs to the latching counter 623 are zeroed. A zero at the $Q_3$ output of the latching counter 623 causes the TACHBK signal to go high, and when this high is applied to NAND gate 153 (FIG. 6B), a low is caused to appear at the second input of NAND gate 155. Since a low is present at one input, the output of NAND gate 155 goes high, and this is applied to the second input of NAND gate 159. Since the other input of NAND gate 159 is provided with a high which was produced by the inversion of the low CRGR/ signal in NAND gate 165, a low is caused to appear at the output node 167. This low is transmitted via lead 173 to NAND gate 171 where it is inverted to generate a high CRDRAA signal at output node 187. As described previously, a high CRDRAA signal will cause the current to drive the motor to the right as required by the input instructions.

There is no speed control in the START STATE since the TACHBK signal remains high until the JK flip-flop 333 (FIG. 10) is reset by the attainment of the 1664 count. When the 1664 count resets the start flip-flop 333, the "$\overline{Q}$" output will go high, causing a high to appear at output 387. This high is applied to node 655 (FIG. 14A) and used to enable the CET input of CCSM 621 and to disable the master reset input so as to allow the state machine 621 to count. Since the desired carrier destination is more than five carrier positions from its present position, the CPC of the input logic of block 75 of the circuit of FIG. 3 will cause the carrier state machine 79 to generate the signal HISPDDR which is decoded in the solenoid driver circuit of FIG. 5 to produce a low CRHS/ signal indicating that we wish to drive at high speed. When the JK start flip-flop 333 was set by the CR4A signal going high, a low was present at the "$\overline{Q}$" output 387, and this low was used to enable the master reset of CCSM 621 until the JK flip-flop 333 is reset by the arrival of the 1664 count. Sice CRHS/ is low for high speed operation, this signal is supplied via terminal 301 to one input of NAND gate 701 causing its output to go high. This high is used to disable the parallel enable input of CCSM 621 so as to insure that it remains in the reset position while the state machine is in the START STATE.

After the motor has had sufficient time to come up to speed, the 1664 count is generated, as previously described, and this count is used to reset the JK start flip-flop 333. When the start flip-flop 333 is reset, a high is present at the output terminal 387 and this high is used to enable the CET input of CCSM 621 while disabling the master reset input MR/. Once the 1664 count has been achieved while the CRHS/ signal is still low, we enter the 33 IPS STATE.

In this state, the signal TACHBK is used to control the speed of the motor and to insure that the speed of approximately 33 IPS is maintained. This speed control is achieved as follows. Bearing in mind that a high TACHBK signal indicates an underspeed condition, whereas a low TACHBK signal indicates an overspeed condition, the speed control aspect of the present invention will be described. As indicated previously, when the CRHS/ signal is low, a predetermined count is entered into the three stages of the presettable binary counter (FIG. 13). The third stage of the presettable binary counter 515 is used to detect velocity errors and maintain speed control. If we are traveling faster than 33 inches per second, then LINEGEN pulses are arriving at the first CAPRO counter 391 (FIG. 11) and causing the generation of a terminal count at junction 417 at a rate sufficient to cause the presettable binary counters 511, 513 and 515 and the parallel enable input of the latching counter 623 (FIG. 14B) to be preset before the presettable binary counters have had a chance to increment the count which was preset into the third stage of PBC 515. The preset is enabled via the low which appears at node 545 each time the LINEGEN signal causes the terminal count of PBC 511 to occur. Since PBC 515 is preset with a count 1001 when CRHS/ is low, the outputs present at terminals 541 and 543 are both zeroes. When these are inverted by NAND gates 893 (FIG. 14B) and 863 respectively, a high appears at node 887. This high is preset into the latching counter 623 when the arrival of the next LINEGEN pulse causes a low to appear at node 547. The $Q_3$ output of the latching counter 623 then goes high and NAND gate 839 inverts this signal to produce a low TACHBK signal at junction 733. A low TACHBK signal indicates an overspeed condition and tells us that we must slow the motor speed. When the low TACHBK signal is applied to the input of NAND gate 111, it has no effect upon the circuit of FIG. 6A since the node 123 is clamped low by the output of NAND gate 131 thereby causing the signal CRDLAA (FIG. 6B) to remain low and insuring that no left to drive current flows through the motor. The presence of a low TACHBK signal at the input of NAND gate 153 will cause a high to appear at the second input of NAND gate 155. Since a high was already present at the other input of NAND gate 155 as previously described, the output will go low causing the output of NAND gate 159 to go high. This high will be fed to NAND gate 171 and inverted to cause the signal CRDRAA to go low. When this signal goes low, the right drive current circuit is disabled so as to stop the flow of current in the motor entirely until the TACHBK signal again goes high. When an underspeed error occurs, the third presettable binary counter 515 (FIG. 13) is counted up to a predetermined count which indicates that an underspeed has occurred before the next LINEGEN pulse causes the counters to be again preset. Since the $Q_1$ and $Q_2$ outputs of presettable binary counter 515 were initially zero, if either of them have been incremented to a one, the output of NAND gate 863 (FIG. 14B) or NAND gate 893 will go low, causing a low to appear at node 887. When the next LINEGEN pulse appears, this low will be preset into the $P_3$ input of the latching counter 623 and as the low is outputted from the $Q_3$ output and inverted via NAND gate 839, the TACHBK signal will go high indicating that an underspeed condition exists. As previously described, when the signal is presented at the input of NAND gate 111, it will have no effect upon the circuit of FIG. 6A, but when the high TACHBK signal is provided to the input of NAND gate 153 of the circuit of FIG. 6B, the drive right circuitry will again be enabled and the signal CRDRAA will go high, causing the motor to drive to the right as discussed previously. The TACHBK signal will continue to vacillate between high and low while it tries to maintain a constant 33 IPS speed.

At some point, the CPC of block 75 of the circuit of FIG. 3 will indicate that the carrier 15 (FIG. 1) is five character positions away from the desired printing position and the CCSM will cause the solenoid driver to switch the CRHS/ signal from low to high. This indicates a change from the 33 IPS STATE into the TRANSITION STATE and that the high current should be applied in the opposite direction. When the CRHS/ signal goes high, NAND gate 701 (FIG. 14A) will generate a low since its other input was already enabled when the 1664 count occurred. This low will be transmitted to the parallel enable input of CCSM 621 such that the next TJKP clock pulse will preset the counter to a count of 0000. Simultaneously, the high CRHS/ signal will cause a low to appear at the output of NAND gate 707 and hence a high signal at the output of NAND gate 663 which will enable the CEP input of CCSM counter 621. The next TJKP clock pulse will increment the counter to a count of 1000 indicating that the transition state has been entered. The high from the $Q_0$ output is fed back to NAND gate 759 and inverted to provide a low at one input of NAND gate 707. This results in a high at the input of NAND gate 663, causing a low to be applied to the CEP input of CCSM 621 thereby disabling further counting. The one from the $Q_0$ output of CCSM 621 is inverted via NAND gate 815 (FIG. 14B) and supplied as a low to the output of NAND gate 839 so as to clamp the TACHBK output terminal 733 to a low. This is to be expected since the TRANSITION STATE represents an attempt to come from high speed to low speed and the presence of a low TACHBK signal indicates that we are constantly in an overspeed condition and attempting to reduce the speed in order to correct the overspeed. When the TRANSITION STATE is entered and a high is caused to appear at the $Q_0$ output of CCSM 621 (FIG. 14A), a high TRANSTP signal appears at output 825 (FIG. 14B), and when this signal is fed to one input of AND gate 988 (FIG. 17) and AND gate 991, the AND gates will be caused to pass a signal if the other inputs have been enabled. The second input of AND gate 991 is not enabled since it is supplied with a low from the "Q" output of JK flip-flop 973, indicating that we had not previously instructed the motor to drive left. Since the motor had been previously instructed to drive right, the "Q" output of JK flip-flop 970 was high and as this high is fed back to the second input of AND gate 988, it is enabled. The arrival of a high TRANSTP signal at input 825 therefore will cause a high to be gated to node 994 at the output of AND gate 988. This high is supplied via OR gate 978 to the "K" input of JK flip-flop 970 and via OR gate 980 to the "J" input of JK flip-flop 973. The arrival of the next TJKP clock pulse will cause JK flip-flop 970 to reset and JK flip-flop 973 to set. This causes a reversal of the signals FWDDR and RETDR such that the solenoid drivers of FIG. 5 will generate a high CRGR/ signal and a low CRGL/ signal so as to effectuate a reversal of the direction of motor drive. While the carrier will actually continue to move to the right, the drive current flowing through the motor is attempting to drive it to the left so as to effectually slow the speed of the motor. The arrival of the high CRGR/ signal at NAND gate 165 (FIG. 6B) will cause the signal CRDRAA to go low so as to disable the right drive circuitry as previously described. Simultaneously, the presence of a low CRGL/ signal at the input of NAND gate 131 (FIG. 6A) will allow the junction 123 to go high causing a low to appear at the output of NAND gate 127. When this low is inverted in NAND gate 137 (FIG. 6A), the signal CRDLAA is allowed to go high thereby enabling the drive left portion of the motor drive circuitry as previously descried. The motor current will continue to drive left and slow the actual speed of the motor until the generation of the TP 180 count causes the carrier state machine to enter the SQUIRT STATE as previously described. Since NAND gate 651 (FIG. 14A) was enabled by the TRANSITION STATE signal TRANSTP, the arrival of the TP 180 signal from node 620 (FIG. 14B) will cause the output of NAND gate 651 to go low. This will be inverted by NAND gate 663 and passed as a high to the CEP input of CCSM 621 thereby enabling the CCSM 621 to count clock pulses. The next TJKP clock pulse will increment the counter to a count of 0100 and the presence of a high at the $Q_1$ output indicates that the SQUIRT STATE has been entered. When the SQUIRT STATE is entered, a high is present at the $Q_1$ output of CCSM 621, and when this signal is fed back to NAND gate 767 and inverted, a low will appear once more at the output of NAND gate 663 causing the CEP input of CCSM 621 to again be disabled. The SQUIRT signal is fed to the motor drive control of FIG. 6 and inverted in NAND gate 189 so as to cause the output of NAND gate 193 to go high so that the comparator 203 is referenced to a second current level so that the motor continues to be driven with left drive current but the level of the current reference is changed.

The carrier state machine remains in the SQUIRT STATE until the TACHBK signal goes high. This occurs as soon as an underspeed condition is detected by the speed control logic discussed previously. When the TACHBK signal goes high while we are in the SQUIRT STATE, two inputs of AND gate 910 (FIG. 17) and two inputs of AND gate 912 are enabled. Since JK flip-flop 970 is currently in the reset state, the high from the "$\overline{Q}$" output is fed back to the third input of AND gate 910, so as to cause the AND gate to pass a high signal as soon as the TACHBK signal goes high. This high is transmitted via OR gate 976 to the "J" input of JK flip-flop 970 and via OR gate 982 to the "K" input of JK flip-flop 973. The third input of AND gate 912 is disabled since the "$\overline{Q}$" output of JK flip-flop 973 is low. Upon the arrival of the next TJKP clock pulse, JK flip-flop 970 will be set and JK flip-flop 973 will be reset causing a second reversal of the direction of current in the motor. The "Q" output of JK flip-flop 970 will go high and the FWDDR signal of output 972 will be decoded by the solenoid driver circuit of FIG. 5 so as to cause the CRGR/ signal to go low. Simultaneously, the "Q" output of the Jk flip-flop 973 will go low causing the decoded signal CRGL/ to go high. As indicated previously, a high CRGL/ and a low CRGR/ signal supplied to FIG. 6 will cause the signal CRDRAA to go high and the signal CRDLAA to go low so that the motor is once again driven with a drive right motor current. Since the TACHBK signal went high in response to the detection of an underspeed condition, we know that the third stage of the presettable binary counter was allowed to count pulses and be incremented before being preset by the arrival of a new LINEGEN pulse. When the $Q_1$ and $Q_2$ outputs of the third presettable binary counter 515 (FIG. 13) go high, a low is caused to appear at node 887 (FIG. 14B). The arrival of the next LINEGEN pulse will cause a low to appear at the PE/ input of the latching counter 623 and the counter will have its $P_3$ input preset with the low from node 887. This low appears at the $Q_3$ output of the latching counter 623 and is inverted in NAND gate 839 to produce a high TACHBK signal. This signal is fed back via lead 729 to one input of NAND gate 715 (FIG. 14A) whose other input is taken from the $Q_1$ or SQUIRT output of the carrier state machine 621. The arrival of the high TACHBK signal causes NAND gate 715 to output a low which is applied to the PE/ input of CCSM 621 causing it to be preset with a count of 0010. The presence of a one at the $Q_2$ output of CCSM 621 indicates that we are in the 4.5 IPS STATE such that the motor is being driven at a lower speed in the originally specified direction. While in the 4.5 IPS STATE, speed control is maintained as it was in the 33 IPS STATE by varying TACHBK signals within certain predetermined limits which were described with respect to the BUMP STATE. If either a high speed error limit or the low speed error limit is exceeded or if the carrier arrives at its desired destination, the BUMP STATE will be entered as previously described and a high will appear at output node 681. When this signal is applied to OR gates 978 and 982 of the circuit of FIG. 17, a high is applied to the "K" inputs of JK flip-flop 970 and JK flip-flop 973 causing these flip-flops to be reset. When both of these flip-flops have been reset, the solenoid driver circuits of FIG. 5 will generate a CRGL/ signal which is high and a CRGR/ signal which is high indicating that we neither wish to drive right nor left. As discussed previously, when the signal CRGR/ goes high, the signal CRDRAA goes low so as to disable the right drive current and when the signal CRGL/ goes high, the signal CRDLAA goes low so as to disable the left drive, hence the motor is effectively stopped and the STOP STATE is once more entered. As previously described, if the BUMP STATE was entered before the carrier destination was reached, a carrier error will be flagged to the operator.

With this detailed description of the structure and operation of the present invention, it will be obvious to those skilled in the art that various modifications may be made without departing from the spirit and scope of the invention which is limited only by the appended claims.

What is claimed is:

1. A carrier positioning system comprising:

carrier means for positioning a print element in either of two directions along a line of print;

D.C. motor means for driving said carrier means in either of said two directions;

means for generating first instruction signals indicative of the direction in which said motor means must be driven in order to move said carrier means from its present carrier position to a desired destination carrier position and for generating second instruction signals indicative of the number of carrier positions between said present carrier position and said desired destination carrier position;

means for generating speed selection signals in response to said second instruction signals;

means responsive to said speed selection signals for selecting a first high speed state for driving said motor means at a first predetermined carrier drive speed when said second instruction signals indicate that the number of carrier positions between said present position and said desired destination position is more than a predetermined number, and for selecting a second low speed state for driving said motor means at a second lower predetermined carrier drive speed when said second instruction signals indicate that the number of carrier positions between said present position and said desired destination position is less than or equal to said predetermined number;

first logic means for effectuating a smooth and efficient transition between said first high speed state and said second low speed state;

electronic tachometer means associated with said motor means for generating signals indicative of the actual speed of said carrier means;

second logic means responsive to said signals indicative of the actual speed of said carrier means and to said drive speed selecting means for sensing underspeed and overspeed errors and for generating speed control signals in response thereto;

means for generating directional command signals in response to said first instruction signals and said first logic means;

motor driver means for defining at least two separate current drive paths through said motor means; and motor control means for selectively energizing and de-energizing one or more of said defined current drive paths in response to said directional command signals and for controlling the duration of application of current in said selected current drive path in response to said speed control signals for maintaining a relatively constant carrier drive speed while in either said first high speed state or in said second low speed state.

2. The carrier positioning system of claim 1 wherein said second logic means comprises:

presettable binary counter means responsive to said state selecting means for presetting a first predetermined initial count into said binary counter means when said state selecting means has selected said first high speed state and for presetting a second predetermined initial count into said binary counter means when said state selecting means has selected said second low speed state;

means responsive to one of said signals indicative of the actual speed of said carrier means for enabling said binary counter means to be preset with one of said initial counts and for thereafter enabling said binary counter means to count clock pulses and increment the stored count at a predetermined rate;

logical gating means coupled to at least a portion of the output of said binary counter means for outputting the count currently stored in said binary counter means;

presettable latching means having presettable input means responsive to said logical gating means for allowing said latching means to be preset with at least a portion of the output of said binary counter means when said preset enabling means again generates an enabling signal in response to the next successive one of said signals indicative of the actual speed of said carrier means; and means coupled to at least a portion of the output of said latching means for generating a first speed control signal in response to an overspeed condition when said latching counter has been preset by said logical gating means before said binary counter means has been incremented to a first predetermined overspeed count and for generating a second speed control signal in response to an underspeed condition when said presetttable latching means is preset by said logical gating means after said binary counter means has been incremented to a second predetermined underspeed count.

3. The carrier positioning system of claim 1 wherein said electronic tachometer means for generating signals indicative of the actual speed of said carrier means comprises:

a timing disk coupled to said motor means;

photo-optical means associated with said timing disk for generating a pair of speed indicative signals; and comparator means responsive to said pair of speed indicative signals for generating a series of positive going pulses at a rate indicative of the actual speed of said carrier means.

4. The carrier positioning system of claim 1 wherein said first logic means for effectuating a smooth and efficient transition between said first high speed state and said second low speed state comprises:

carrier state machine means for;

defining a START STATE in which said motor is driven at a relatively high level of current until sufficient time has elapsed for the motor means to have begun to move said carrier means;

defining a HIGH SPEED STATE in which said carrier means is to be driven at said first predetermined drive speed;

defining a LOW SPEED STATE in which the carrier means is to be driven at said second predetermined lower drive speed when said carrier means approaches its destination carrier position;

defining a TRANSITION STATE for reversing the direction of current flow in said motor and exiting said first predetermined HIGH SPEED STATE;

defining a SQUIRT STATE for continuing to slow said motor with a lower level of drive current until the carrier speed has been sufficiently slowed so as to exit said TRANSITION STATE and enter said LOW SPEED STATE; and defining a TERMINATION STATE for signifying that said carrier means has arrived at its desired destination position; and an electronic control means for controllably effecting a smooth and efficient transition between said states; and wherein said second logic means senses underspeed and overspeed errors and generates speed control signals in response thereto while in either said HIGH SPEED STATE or said LOW SPEED STATE and enables said motor control means to control the duration of application of current in said selected current drive path so as to maintain a relatively constant drive speed while in either said HIGH SPEED STATE or said LOW SPEED STATE.

5. The carrier positioning system of claim 1 wherein said motor driver means comprises:

first transistor driver means and a first darlington amplifier means serially coupled to said motor for defining a first current drive path through said motor;

second transistor driver means and a second darlington amplifier means serially coupled to said motor for defining a second current drive path through said motor, and feedback means coupled to said first and second darlington amplifier means for providing a feedback signal proportional to the level of current actually flowing in said first or second defined current drive paths;

and wherein said motor control means comprises:

first and second gating means for selectively energizing and de-energizing said first defined current drive path;

third and fourth gating means for selectively energizing and de-energizing said second defined current drive path;

logical gating means coupled to the inputs of said first and fourth gating means, said logical gating means, and responsive to said directional command signals for selecting or not selecting said first current drive path and being responsive to said speed control signals for controlling the duration of application of drive current in said selected path by selectively energizing and de-energizing said selected drive path in accordance with said speed control signals;

second logical gating means coupled to the inputs of said second and third gating means for selectively energizing and de-energizing said second defined current drive path in response to said directional command signals and for controlling the duration of application of drive current in said selected path by selectively energizing and de-energizing said second drive path in response to said speed control signals;

comparator logic means for establishing first and second reference signals representing a high speed current and a low speed current respectively, and for comparing said feedback signal with a selected one of said reference signals for maintaining a relatively constant current in said selected current drive path by controlling the amplification of said first and second darlington amplifier means; and third logical gating means coupled to the input of said comparator means and responsive to said first logic means for selecting one of said first and second reference signals.

6. In a carrier positioning system having a D.C. motor for positioning a print element carrier means in either of two directions along the line of print, and wherein said carrier positioning means includes a means for generating signals indicative of the direction in which said motor must be driven in order to reach a desired carrier destination position and a means for generating signals indicative of the number of carrier positions which said carrier means must be driven from its present position in order to reach said desired carrier destination position, an improved motor control system comprising:

motor driver means for providing two separate and individually energizable current drive paths through said motor, one path for forward motor drive and one path for reverse motor drive;

first means responsive to said desired carrier destination position being more than a predetermined number of carrier positions from the present carrier position for driving said carrier means at a first relatively high speed and responsive to said desired carrier destination position being less than or equal to said predetermined number of carrier positions from the present carrier position for driving said carrier means at a second relatively low speed;

speed control means responsive to the actual carrier speed at which said carrier means is being driven for generating speed control signals for maintaining a relatively constant carrier speed at either of said first and second drive speeds; and motor driver control means for selecting which of said current drive paths is to be energized, for controlling the duration of energization of said selected current drive path in response to said speed control signals, for reversing said selection of a current drive path and effecting a smooth and rapid transition between said first carrier drive speed and said second carrier drive speed when said carrier means approaches its desired carrier destination position, and for again reversing said selection of a current drive path for further slowing and eventually stopping said carrier means at said desired carrier destination position.

7. The improved motor control system of claim 6 wherein said speed control means comprises:

timing means rotatably coupled to said D.C. motor;

electro-optical means responsive to the rotation of said timing means for generating a pair of signals at a rate proportional to the rotation of said D.C. motor; and comparator means responsive to said pair of signals for successively generating speed control signals at a rate proportional to the speed of said motor and said carrier positioning means.

8. The improved motor control system of claim 7 wherein said motor driver control means comprises:

current drive path selection means initially responsive to the signals generated by said means for generating signals indicative of the direction in which said motor must be driven in order to reach a desired carrier destination position and subsequently responsive to direction reversal signals for selectively energizing and de-energizing either one of said two current drive paths through said motor;

speed control logic means responsive to said speed control signals and coupled to said motor driving means for controlling the duration of energization of a selected current drive path;

state machine means for defining various carrier states;

logic means associated with said carrier state machine means for generating direction reversal signals and reversing the selection of a current drive path for effecting a smooth and rapid transition between said first relatively high speed and said second relatively low speed when said carrier means approaches its desired carrier destination position; and additional logic means associated with said carrier state machine means for again reversing said selection of a current drive path for further slowing and eventually stopping said carrier means at said desired carrier destination position.

9. The improved motor control system of claim 8 wherein said speed control logic means comprises:

presettable binary counter means;

input logic coupled to the presettable inputs of said presettable binary counter means and responsive to said first responsive means for presetting a first predetermined overspeed count into said presettable binary counter means when said present carrier position is more than said predetermined number of carrier positions from said desired carrier destination position and for presetting a second predetermined underspeed count into said presettable binary counter means when said present carrier position is less than or equal to said predetermined number of carrier positions from said desired carrier destination position;

input means for receiving said speed control signals and for generating a preset enabling signal for enabling said presettable binary counter means to be preset for each successively received speed control signal and for enabling said presettable binary counter means to count clock pulses and increment the count stored therein;

presettable latching means for presetting the signals present at its preset inputs into said latching means each time said preset enabling signal is generated;

logic means coupling at least a portion of the output of said presettable binary counter means to at least a portion of the preset inputs of said presettable latching means, said logic means being responsive to the count contained in said presettable binary counter not having been incremented beyond a predetermined underspeed error count for supplying an underspeed error preset signal to the preset inputs of said presettable latching means and being responsive to the count in said presettable binary counter means having attained or surpassed a predetermined underspeed count for supplying an underspeed error preset signal to the presettable inputs of said presettable latching means; and gating means coupled to at least one output of said presettable latching means for generating said speed control signals, said gating means passing an "overspeed" speed control signal for terminating the energization of said selected current drive path in response to an overspeed error preset signal having been preset into said latching means and said gating means passing an "underspeed" speed control signal for enabling the energization of said selected current drive path in response to an underspeed error preset signal having been preset into said presettable latching means.

10. The carrier positioning system of Claim 8 wherein said state machine means comprises:

means for defining a HIGH SPEED STATE in which said carrier means is driven at said first relatively high speed;

means for defining a LOW SPEED STATE in which the carrier means is driven at said second relatively low speed;

means for defining a TRANSITION STATE for exiting said HIGH SPEED STATE; and means for defining a SQUIRT STATE for exiting said TRANSITION STATE and entering said LOW SPEED STATE.

11. The improved motor control system of claim 10 wherein said logic means associated with said carrier state machine means comprises:

first state machine logic means responsive to an indication that said present carrier position is more than a predetermined number of carrier positions from said desired carrier destination position for enabling said motor driver control means to energize said selected current drive path until said high speed state is entered;

second state machine logic means for enabling said motor driver control means to drive said motor at said first relatively high speed and for enabling said motor driver control means to utilize said speed control signals for maintaining a relatively constant carrier speed within said high speed state;

third state machine logic means responsive to an indication that said present carrier position is less than or equal to said predetermined number of carrier positions from said desired carrier destination position for enabling said motor driver control means to reverse the direction of current flow in said motor by selecting the other of said current drive paths thereby driving the motor in the opposite direction so as to slow the speed of said carrier means;

fourth state machine logic means responsive to said state machine means having been in said TRANSITION STATE for a predetermined period of time for entering said SQUIRT STATE and reducing the level of current flowing in said selected path; and fifth state machine logic means responsive to the speed of said carrier having fallen below said second relatively low speed for initiating said LOW SPEED STATE and enabling said motor driver control means to again reverse the direction of current flowing in said motor by selecting the opposite of the presently selected current drive path for continuing to drive said motor at said relatively low speed until said desired destination position has been reached, and for enabling said motor driver control means to respond to said speed control signals and maintain a relatively constant speed within said LOW SPEED STATE.

12. The improved motor control system of claim 11 wherein said state machine means further includes means for defining a BUMP STATE in response to said carrier means having arrived at said desired carrier destination position or in response to the detection of velocity errors of a sufficient magnitude while operating in said LOW SPEED STATE; and wherein said logic means associated with said carrier state machine means further includes a sixth state machine logic means responsive to said carrier means having reached its predetermined carrier destination position for causing said state machine means to enter said BUMP STATE, said sixth state machine logic means further including means for detecting a velocity error of a predetermined magnitude while said carrier state machine is in said LOW SPEED STATE and for causing said carrier state machine to enter said BUMP STATE in response to said detection; and wherein said current path selection means further includes means responsive to said carrier state machine entering said BUMP STATE for generating stop signals and de-energizing both of said current drive paths so as to stop the movement of said carrier means.

13. In a carrier positioning system having a motor driven carrier means for positioning a carrier in either direction along a line of print, means for generating signals indicative of the direction in which said motor must be driven in order to arrive at its desired carrier destination position, means for generating signals indicative of the number of carrier positions which said carrier means must be moved in order to arrive at said desired carrier destination position, motor driver means for selectively defining a first drive current path for driving said motor in a forward direction and for selectively defining a second drive current path for driving said motor in the opposite direction, and means for selectively energizing or de-energizing at least one of said selected motor current paths, an improvement comprising:

means for initially driving said motor at a relatively high level of current until a first predetermined high speed drive state is attained;

means for maintaining speed control during said first predetermined high speed state so as to maintain a relatively constant drive speed;

means responsive to said carrier means having been moved to a carrier position a predetermined number of carrier positions from said desired carrier destination position for selecting said second current drive path so as to drive said motor in the opposite direction for slowing the speed of said carrier means;

means responsive to said motor having been driven in the opposite direction for a predetermined period of time for reducing the amount of current flowing in said second drive current path;

means for determining when said carrier means has been slowed to a second predetermined lower speed indicating that a second predetermined low speed drive state has been attained; and means responsive to said determining means for again reversing the direction of current in said motor by re-selecting said first drive current path and for applying said reduced current to said motor so as to drive said motor in said second predetermined low speed drive state until said desired carrier destination position is reached.

14. The improved carrier positioning system of claim 13 wherein said means for maintaining speed control during said first predetermined high speed state so as to maintain a relatively constant drive speed comprises:

means coupled to said motor for generating carrier speed pulses at a rate which is indicative of the speed of the motor;

counter means resettable by said carrier speed pulses for counting clock pulses at a predetermined rate between subsequent resets by said carrier speed pulses;

means for generating an overspeed error signal when said counter means is reset before reaching a predetermined overspeed indicative count and for generating an underspeed error signal when said counter means is reset after having attained a predetermined underspeed count; and logic means coupled to said means for selectively energizing or de-energizing at least one of said selected motor current paths for de-energizing said selected motor current path in response to said overspeed error signal so as to slow down the speed of the motor and for energizing said selected motor current path in response to said underspeed error signal for speeding up said motor.

15. In a carrier positioning system having a D.C. motor for driving a print element carrier at a predetermined speed and a motor driver means for driving said motor, an improved speed control system for maintaining said predetermined speed relatively constant comprising:

electro-optical tachometer means associated with said D.C. motor for generating pulses at a rate indicative of the actual speed of said motor;

binary counter means presettable in response to said generated pulses with a predetermined count indicative of said predetermined level of speed for counting clock pulses after being so preset to increment the preset count until the arrival of the next successively generated speed indicative pulse;

means responsive to the count having been attained by said binary counter means when said next successively generated speed indicative pulse arrives to again preset said binary counter means for generating an overspeed signal when said binary counter means has not been incremented beyond a predetermined overspeed count when said next successive speed indicative pulse is generated thereby indicating that an overspeed condition exists, and for generating an underspeed signal when said binary counter means has been incremented beyond a predetermined underspeed count when said next successive speed indicative pulse is generated thereby indicating that an underspeed condition exists; and means responsive to said overspeed signal for temporarily stopping the flow of current through said D.C. motor until said count responsive means indicates that an underspeed condition exists once more, and responsive to said underspeed signal for initiating a flow of current through said D.C. motor until said count responsive means indicates that an overspeed condition exists, thereby insuring that said predetermined speed remains relatively constant.

* * * * *

UNITED STATES PATENT OFFICE
CERTIFICATE OF CORRECTION

Patent No. 3,986,091 Dated October 12, 1976

Inventor(s) Virgilio J. Quiogue et al

It is certified that error appears in the above-identified patent and that said Letters Patent are hereby corrected as shown below:

Col. 2, line 29, should read --on the--.
Col. 5, line 1, should read --an end--,
line 37, should read --it in--.
Col. 10, line 3, should read --CRDLAA--.
Col. 15, line 68, should read --counter 309--.
Col. 17, line 32, should read --The "Q" output--.
Col. 18, line 16, should read --counter 309--,
line 32, should read --off-the-shelf--.
Col. 19, line 24, should read --Node 413--.
Col. 20, line 28, should read --input PE/--.
Col. 32, line 38, should read --the circuit--.
Col. 33, line 40, should read --CRHS/--.
Col. 35, line 36, should read --now in--.
Col. 36, line 14, should read --the CRHS/--.
Col. 37, line 2, should read --not at zero--.
Col. 40, line 38, should read --Since--.
Col. 42, line 65, should read --described--.

Signed and Sealed this

Twenty-eighth Day of December 1976

[SEAL]

*Attest:*

RUTH C. MASON
*Attesting Officer*

C. MARSHALL DANN
*Commissioner of Patents and Trademarks*